(12) United States Patent
Hoda et al.

(10) Patent No.: US 9,106,834 B2
(45) Date of Patent: Aug. 11, 2015

(54) IMAGE DISPLAY CONTROLLER CAPABLE OF PROVIDING EXCELLENT VISIBILITY OF DISPLAY AREA FRAMES, IMAGE PICKUP APPARATUS, METHOD OF CONTROLLING THE IMAGE DISPLAY CONTROLLER, AND STORAGE MEDIUM

(75) Inventors: Saori Hoda, Tokyo (JP); Yoshinobu Sato, Yokohama (JP); Yasushi Ohwa, Machida (JP); Yusuke Takeuchi, Kawasaki (JP); Hiroshi Yamazaki, Machida (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 13/367,535

(22) Filed: Feb. 7, 2012

(65) Prior Publication Data

US 2012/0200729 A1    Aug. 9, 2012

(30) Foreign Application Priority Data

Feb. 7, 2011    (JP) ................................. 2011-023867

(51) Int. Cl.
*H04N 5/222*    (2006.01)
*H04N 5/232*    (2006.01)
(Continued)

(52) U.S. Cl.
CPC ....... *H04N 5/23293* (2013.01); *H04N 5/23219* (2013.01)

(58) Field of Classification Search
CPC ..... H04N 1/409; H04N 1/58; H04N 5/23212; H04N 5/23293; H04N 5/235; H04N 2101/00; H04N 5/23219; H04N 2201/0013; H04N 2201/325; G06K 9/00228; G06K 9/00281; G06K 9/4671; G06K 9/0026

USPC .................. 348/222.1, 208.1, 208.12, 231.6, 348/333.11, 333.12
See application file for complete search history.

(56) References Cited

U.S. PATENT DOCUMENTS 7,929,042 B2    4/2011    Terashima
2005/0041156 A1*    2/2005    Kondo et al. ................. 348/700
(Continued)

FOREIGN PATENT DOCUMENTS

CN    101149462 A    3/2008
CN    101399915 A    4/2009
(Continued)

OTHER PUBLICATIONS

Chinese Office Action cited in Chinese counterpart application No. CN201210026638.3, dated Feb. 8, 2014 English translation provided.

(Continued)

*Primary Examiner* — Twyler Haskins
*Assistant Examiner* — Padma Haliyur
(74) *Attorney, Agent, or Firm* — Rossi, Kimms & McDowell LLP

(57) ABSTRACT

An image display controller capable of providing excellent visibility of a face display frame and a human display frame associated with an object. The image display controller detects an object in an image, and identifies a face area of the object distinguishably from a human body area exclusive of the face area. Further, the image display controller generates a face display frame for enclosing the face area and a human body display frame for enclosing the human body area. Then, the image display controller displays the face display frame and the human body display frame on a screen together with the image.

29 Claims, 35 Drawing Sheets

(51) Int. Cl.
*H04N 7/18* (2006.01)
*G03B 3/10* (2006.01)
*G06K 9/40* (2006.01)
*G06K 9/20* (2006.01)

(56) References Cited

U.S. PATENT DOCUMENTS

| | | | |
|---|---|---|---|
| 2005/0219395 A1 | 10/2005 | Sugimoto | |
| 2007/0242861 A1 | 10/2007 | Misawa et al. | |
| 2007/0263997 A1* | 11/2007 | Hirai et al. | 396/123 |
| 2007/0266312 A1* | 11/2007 | Ayaki et al. | 715/526 |
| 2008/0232693 A1* | 9/2008 | Guan et al. | 382/190 |
| 2009/0324023 A1* | 12/2009 | Tian et al. | 382/118 |
| 2010/0073546 A1* | 3/2010 | Mori | 348/333.12 |
| 2010/0097515 A1* | 4/2010 | Ishii | 348/349 |
| 2011/0254971 A1* | 10/2011 | Saito | 348/222.1 |

FOREIGN PATENT DOCUMENTS

| | | |
|---|---|---|
| JP | 2005-286940 A | 10/2005 |
| JP | 2007-274207 A | 10/2007 |
| JP | 2008-109552 A | 5/2008 |
| JP | 2008-283379 A | 11/2008 |

OTHER PUBLICATIONS

Office Action issued in corresponding Japanese Patent Application No. 2011-023867, dated Dec. 2, 2014.

* cited by examiner

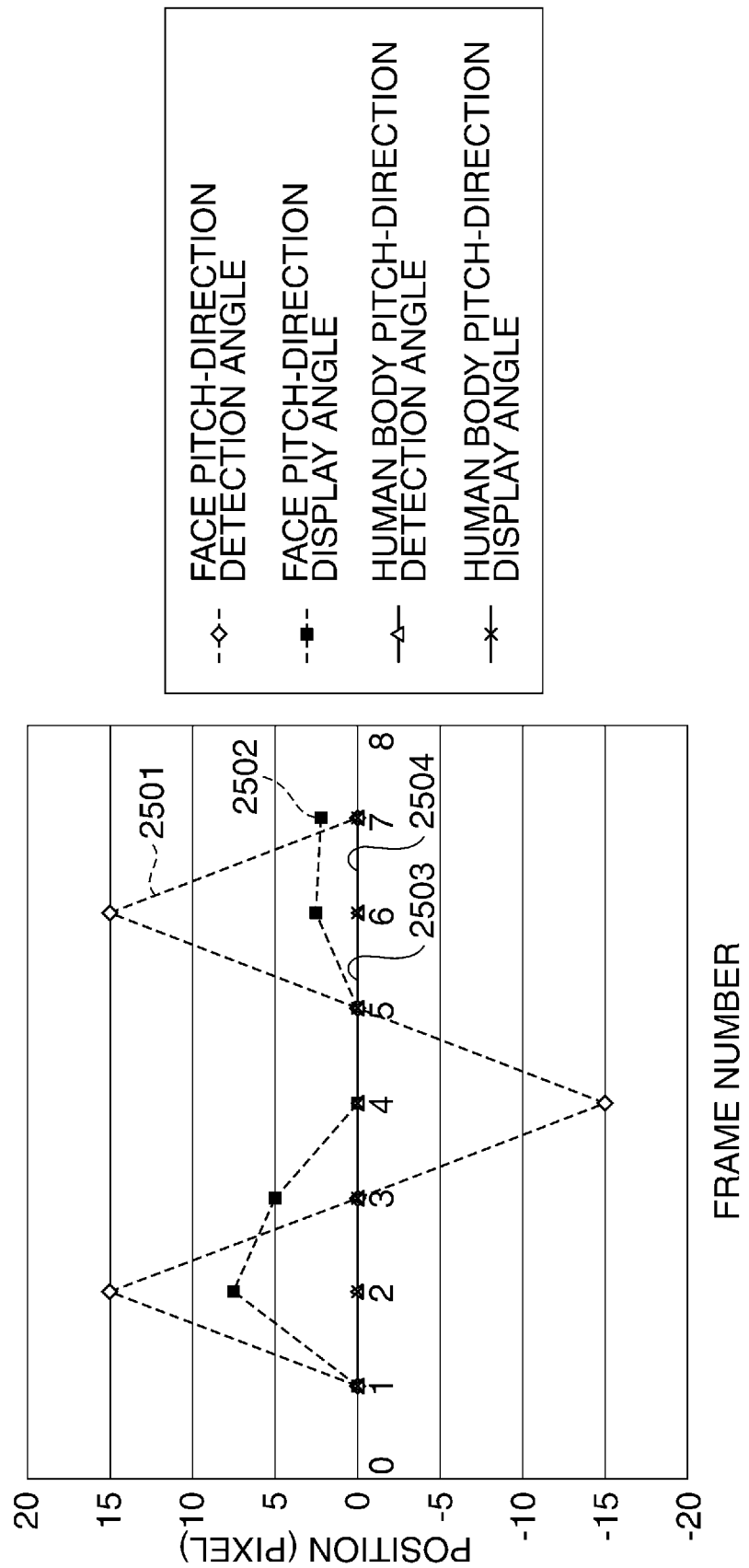

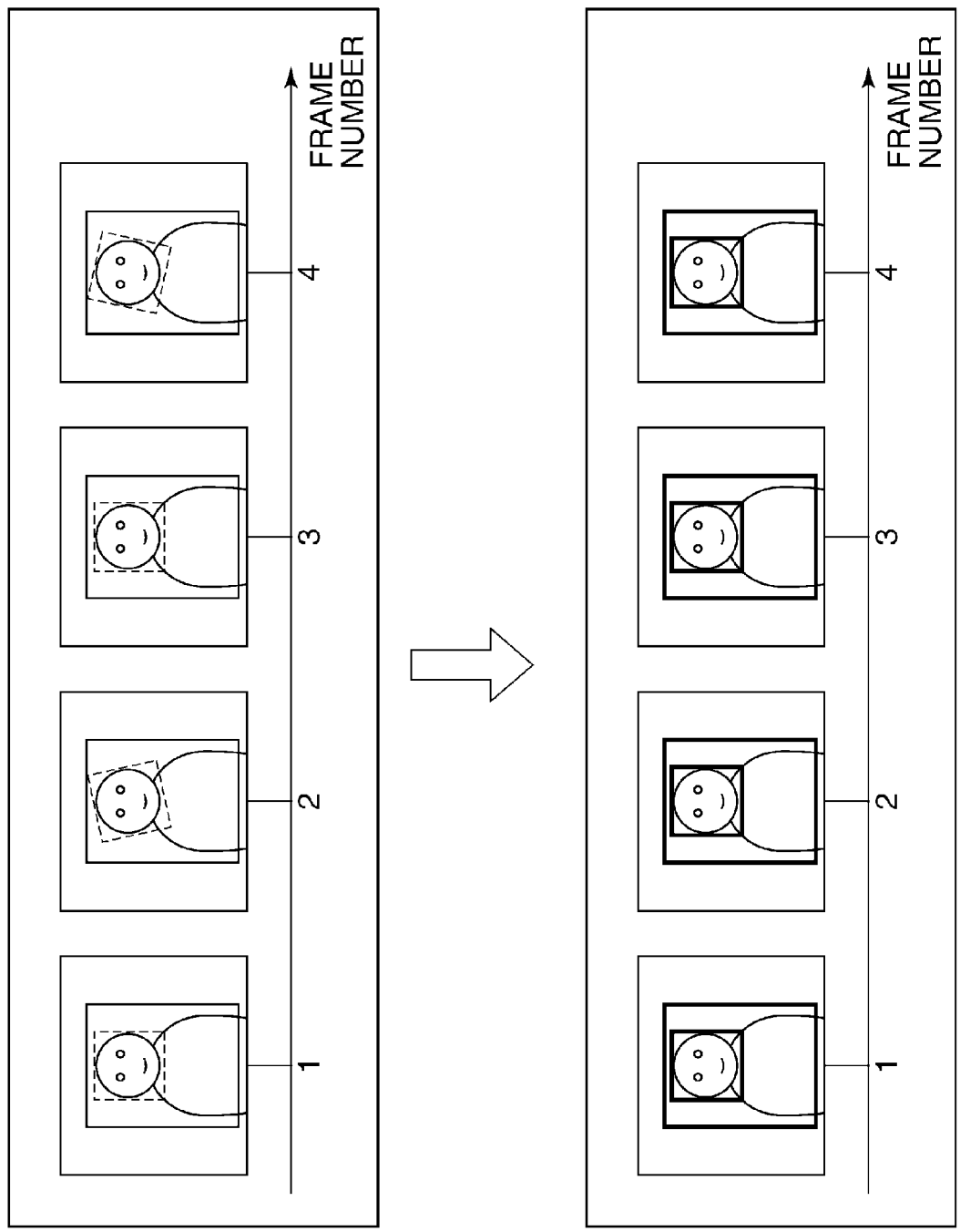

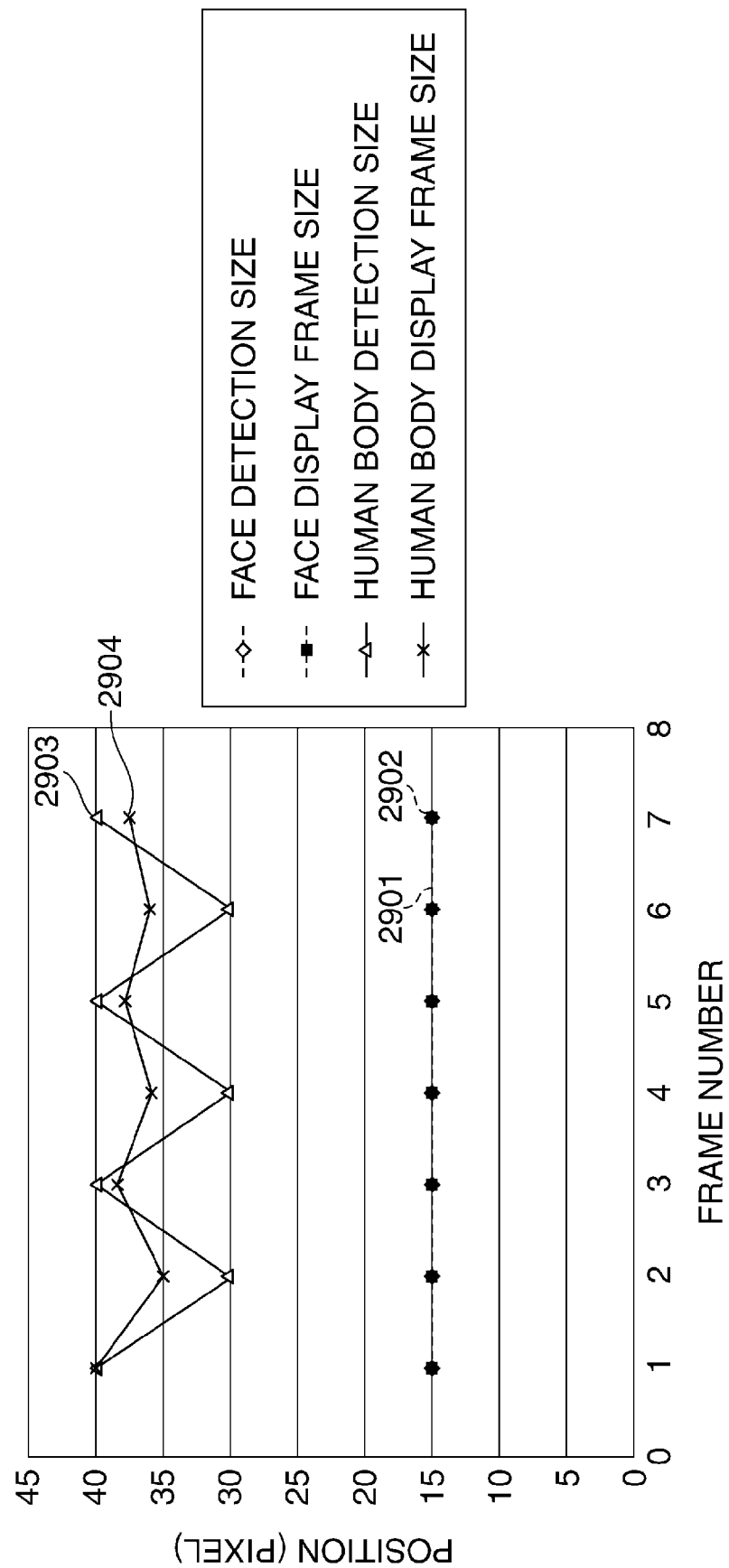

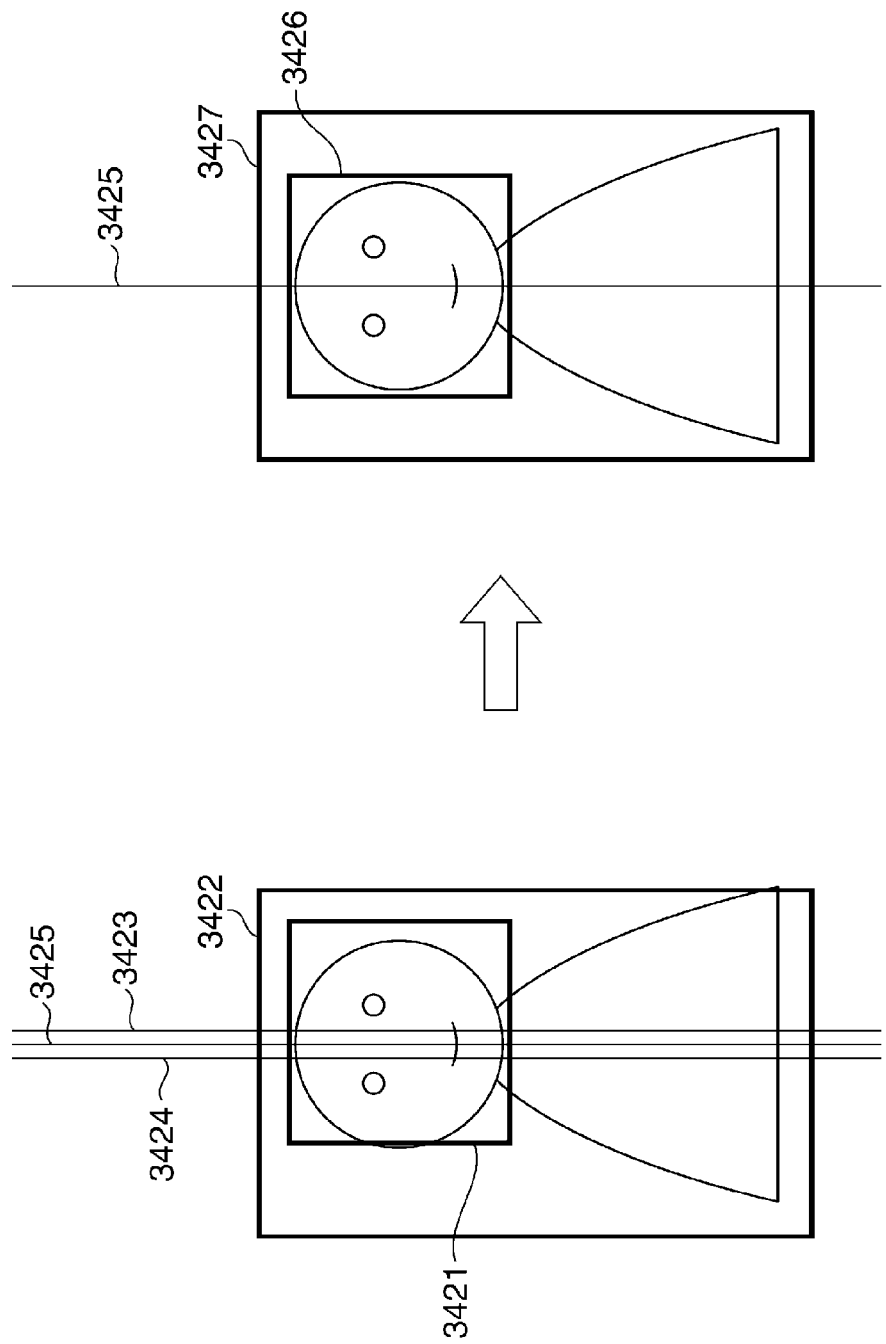

FIG.30

| FACE SIZE | Hf * Vf > A | Hf * Vf ≤ A | Hf * Vf ≤ A | Hf * Vf ≤ A | UNDETECTABLE | UNDETECTABLE |
|---|---|---|---|---|---|---|
| HUMAN BODY DISPLAY FRAME | (IRRESPECTIVE OF DETECTION RESULT OR SIZE) | Hb * Vb > B | Hb * Vb ≤ B | UNDETECTABLE | (IRRESPECTIVE OF SIZE) | UNDETECTABLE |
| FRAME TO BE DISPLAYED | FACE DISPLAY FRAME | FACE DISPLAY FRAME + HUMAN BODY DISPLAY FRAME | HUMAN BODY DISPLAY FRAME | NON-DISPLAY | HUMAN BODY DISPLAY FRAME | NON-DISPLAY |

IMAGE DISPLAY CONTROLLER CAPABLE OF PROVIDING EXCELLENT VISIBILITY OF DISPLAY AREA FRAMES, IMAGE PICKUP APPARATUS, METHOD OF CONTROLLING THE IMAGE DISPLAY CONTROLLER, AND STORAGE MEDIUM

BACKGROUND OF THE INVENTION

1. Field of the Invention

The present invention relates to an image display controller, an image pickup apparatus, a method of controlling the image display controller, and a storage medium storing a control program for implementing the method, and more particularly to a technique for displaying information indicative of a specific area of an image.

2. Description of the Related Art

In general, an image pickup apparatus, such as a digital camera, is configured to detect a specific area of an image (e.g. a specific area of an object) for image pick up. Further, this type of image pickup apparatus is provided with an image display controller for displaying information (specific area information) indicative of a specific area of an image on a display device.

For example, there is proposed an image pickup apparatus which is provided with a face detecting section for detecting a face area (specific area) of an object and causes the image display controller to display a display frame (display information) indicative of the face area detected by the face detecting section on the display device (see Japanese Patent Laid-Open Publication No. 2007-274207).

In Japanese Patent Laid-Open Publication No. 2007-274207, the image display controller changes attributes (e.g. display frame color and shape) of the display frame indicative of the detected face area according to a feature value (e.g. a face angle) of the face of the object, and then displays the changed display frame on the display device. This enables the user to intuitively perceive the face feature of the object.

Further, there has been proposed an image pickup apparatus, such as a monitoring camera, provided with a human body-detecting section for detecting a human body portion (human body area) of an object, in addition to a face detecting section for detecting the face area of an object.

FIG. 35 is a view illustrating how a face display frame and a human body display frame are displayed in the conventional image pickup apparatus provided with the face detecting section and the human body-detecting section. As shown in FIG. 35, a face display frame 2010 corresponding to the face area of an object and a human body display frame 2020 corresponding to the object are displayed on a screen 2000 of a display device. The human body display frame 20200 contains the face display frame 20100 as shown in FIG. 35.

In the conventional image pickup apparatus provided with the face detecting section and the human body-detecting section, however, a face display frame and a human body display frame are displayed on the display device independently of each other. For this reason, when the human body-detecting section is configured to detect an area having a human figure shape including a head portion, the face display frame is displayed in a manner included in the area of the human body display frame (i.e. in a manner overlapping the area of the human body display frame).

When the face display frame is displayed in a manner overlapping the area of the human body display frame as mentioned above, the visibility of the face display frame and the human body display frame for the user, particularly the visibility of the human body display frame lowers.

FIG. 36 is a view illustrating how the face display frame 2010 and the human body display frame 2020 change in the conventional image pickup apparatus when zoom magnification is changed in a state where the face display frame 2010 and the human body display frame 2020 are consecutively displayed.

As shown in FIG. 36, when zoom magnification is changed from the telephoto end to the wide-angle end, the face display frame 2010 and the human body display frame 2020 both become smaller as the size of the object is reduced. As a consequence, particularly in a wide-angle state, the object is hidden by the frames, and the visibility of the frames and the object lowers.

Now, a description will be given of a case where a plurality of frames are consecutively displayed.

FIG. 37 is a view illustrating how the face display frame and the human body display frame of the object in the image shown in FIG. 35 are displayed as frames of image data are changed.

In FIG. 37, it is assumed that the face display frame 2010 and the human body display frame 2020 are displayed on the display device as described with reference to FIG. 35. For example, when a difference (change) occurs in a feature value of the human body display frame 2020 as the frame of image data is changed, the face display frame 2010 contained in the human body display frame 2020 is sometimes displayed in a manner shifted in one direction though there is no change in the relative position between the face and the human body.

SUMMARY OF THE INVENTION

The present invention provides an image display controller which is capable of providing excellent visibility of a face display frame and a human display frame associated with an object for the user in the case of displaying these area frames, an image pickup apparatus, a method of controlling the image display controller, and a storage medium storing a control program for implementing the method.

Further, the present invention provides an image display controller which is capable of stably displaying a face display frame and a human display frame even when at least one of feature values of a face area and a human body area changes along with changes in the frame number of image data, an image pickup apparatus, a method of controlling the image display controller, and a storage medium storing a control program for implementing the method.

In a first aspect of the present invention, there is provided an image display controller for displaying an image obtained by photographing an object, comprising a detection unit configured to detect the object in the image, an identification unit configured to identify a predetermined specific area of the object distinguishably from a remaining area exclusive of the specific area, a first generation unit configured to generate a first display frame for enclosing the specific area, a second generation unit configured to generate a second display frame for enclosing the remaining area, and a display control unit configured to display the first and second display frames on a screen together with the image.

In a second aspect of the present invention, there is provided an image display controller for displaying an image obtained by photographing an object, on a frame-by-frame basis, comprising a detection unit configured to identify a predetermined specific area of the object in association with each frame of the image, distinguishably from an area of the object, and obtain specific area information indicative of at least one of an angle, a size, and a position of the specific area and object area information indicative of at least one of an angle, a size, and a position of the object area, a storage unit configured to store the specific area information and the object area information as history information, a first generation unit configured to generate a first display frame for enclosing the specific area, a second generation unit configured to generate a second display frame for enclosing the object area, and a display control unit configured to correct at least one of the angle, size, and position of the first or second display frame before displaying the first and second display frames on a screen, and then display the first and second display frames together with the image.

In a third aspect of the present invention, there is provided an image display controller for displaying an image obtained by photographing an object, comprising a detection unit configured to detect the object in the image, an identification unit configured to identify a predetermined specific area of the object distinguishably from an area of the object area, a first generation unit configured to generate a first display frame for enclosing the specific area, a second generation unit configured to generate a second display frame for enclosing the remaining area, and a display control unit configured to display the first and second display frames on a screen together with the image, wherein the display control unit determines, according to an area of the specific area, whether or not to display each of the first and second display frames.

In a fourth aspect of the present invention, there is provided an image pickup apparatus comprising one of the above-described image display controllers, an image pickup section configured to receive an optical image including the object, a first shooting control unit configured to be operable when a shooting preparation instruction is received, to control the image display controller to display the first and second display frames on the screen, and a second shooting control unit configured to be operable when a shooting instruction is received, to record an image read from the image pickup section, as image data.

In a fifth aspect of the present invention, there is provided a method of controlling an image display controller for displaying an image obtained by photographing an object, comprising detecting the object in the image, identifying a predetermined specific area of the object distinguishably from a remaining area exclusive of the specific area, generating a first display frame for enclosing the specific area, generating a second display frame for enclosing the remaining area, and displaying the first and second display frames on a screen together with the image.

In a sixth aspect of the present invention, there is provided a method of controlling an image display controller for displaying an image obtained by photographing an object, on a frame-by-frame basis, comprising identifying a predetermined specific area of the object in association with each frame of the image, distinguishably from an area of the object, and obtaining specific area information indicative of an angle, a size, and a position of the specific area and object area information indicative of an angle, a size, and a position of the object area, storing the specific area information and the object area information as history information in a memory, generating a first display frame for enclosing the specific area according to the specific area information, generating a second display frame for enclosing the object area according to the object area information, and correcting the angle, size, and position of the first or second display frame before displaying the first and second display frames on a screen, and then displaying the first and second display frames together with the image.

In a seventh aspect of the present invention, there is provided a method of controlling an image display controller for displaying an image obtained by photographing an object, comprising detecting the object in the image, identifying a predetermined specific area of the object distinguishably from an area of the object area, generating a first display frame for enclosing the specific area, generating a second display frame for enclosing the remaining area, and determining, before displaying the first and second display frames on a screen together with the image, according to an area of the specific area, whether or not to display each of the first and second display frames.

In an eighth aspect of the present invention, there is provided a non-transitory computer-readable storage medium storing a computer-executable control program for causing a computer to execute a method of controlling an image display controller for displaying an image obtained by photographing an object, wherein the method comprises detecting the object in the image, detecting the object in the image, identifying a predetermined specific area of the object distinguishably from a remaining area exclusive of the specific area, generating a first display frame for enclosing the specific area, generating a second display frame for enclosing the remaining area, and displaying the first and second display frames on a screen together with the image.

In a ninth aspect of the present invention, there is provided a non-transitory computer-readable storage medium storing a computer-executable control program for causing a computer to execute a method of controlling an image display controller for displaying an image obtained by photographing an object, wherein the method comprises identifying a predetermined specific area of the object in association with each frame of the image, distinguishably from an area of the object, and obtaining specific area information indicative of an angle, a size, and a position of the specific area and object area information indicative of an angle, a size, and a position of the object area, storing the specific area information and the object area information as history information in a memory, generating a first display frame for enclosing the specific area according to the specific area information, generating a second display frame for enclosing the object area according to the object area information, and correcting the angle, size, and position of the first or second display frame before displaying the first and second display frames on a screen, and then displaying the first and second display frames together with the image.

In a tenth aspect of the present invention, there is provided a non-transitory computer-readable storage medium storing a computer-executable control program for causing a computer to execute a method of controlling an image display controller for displaying an image obtained by photographing an object, wherein the method comprises detecting the object in the image, identifying a predetermined specific area of the object distinguishably from an area of the object area, generating a first display frame for enclosing the specific area, generating a second display frame for enclosing the remaining area, and determining, before displaying the first and second display frames on a screen together with the image, according to an area of the specific area, whether or not to display each of the first and second display frames.

According to the present invention, in the case of displaying the first and second display frames, it is possible to provide excellent visibility of these area frames for the user.

Further, according to the present invention, it is possible to stably display the first and second display frames even when at least one of the feature values of the specific area, such as a face area, and the remaining area, such as a human body area, along with changes in the frame number of image data.

The features and advantages of the invention will become more apparent from the following detailed description taken in conjunction with the accompanying drawings.

BRIEF DESCRIPTION OF THE DRAWINGS

FIGS. 14A and 14B are views illustrating a still another example of how the face display frame and the human body display frame generated by the system controller appearing in FIG. 1 are displayed in the second embodiment, in which FIG. 14A illustrates how the face display frame and the human body display frame are displayed when a human body is oriented leftward and a face is oriented upward, and FIG. 14B illustrates how the face display frame and the human body display frame are displayed when the human body is oriented rightward and the face is oriented downward.

FIGS. 16A to 16C are views illustrating examples of the face display frame displayed by the face display frame generation process in FIG. 15, in which FIG. 16A illustrates an example of the face display frame displayed when the face is oriented backward, FIG. 16B illustrates another example of the face display frame displayed when the face is oriented backward, and FIG. 16C illustrates still another example of the face display frame displayed when the face is oriented backward.

FIG. 19 is a diagram showing changes in the relationship between respective detection angles of the face and the human body and respective display angles of the face display frame and the human body display frame, occurring with changes in the frame number of image data.

FIGS. 20A and 20B are views showing changes in the respective detection angles of the face and the human body and the respective display angles of the face display frame and the human body display frame, occurring with changes in the frame number of image data, in which FIG. 20A illustrates changes in the face detection angle and the human body detection angle, and FIG. 20B illustrates changes in the display angle of the face display frame and that of the human body display frame.

FIGS. 21A and 21B are views illustrating a face display frame and a human body display frame having respective display angles thereof corrected such that the display angle of the face display frame and that of the human body display frame become equal to each other, in which FIG. 21A illustrates the face display frame and the human body display frame before the angle correction, and FIG. 21B illustrates the face display frame and the human body display frame after the angle correction.

FIG. 23 is a diagram showing changes in the respective detections sizes of the face and the human body and the respective display sizes of the face display frame and the human body display frame, occurring with changes in the frame number of image data.

FIGS. 24A and 24B are views illustrating changes in the respective detections sizes of the face and the human body and the respective display sizes of the face display frame and the human body display frame, occurring with changes in the frame number of image data, in which FIG. 24A illustrates changes in the respective detection sizes of the face and the human body, and FIG. 24B illustrates changes in the respective display sizes of the face display frame and the human body display frame.

FIGS. 27A and 27B are views illustrating changes in the respective detection positions of the face and the human body and the respective display positions of the face display frame and the human body display frame, occurring with changes in the frame number of image data, in which FIG. 27A illustrates changes in the respective detection positions of the face and the human body, and FIG. 27B illustrates the respective display positions of the face display frame and the human body display frame.

FIGS. 28A and 28B are views illustrating the face display frame and the human body display frame having respective display positions thereof corrected such that the display position of the face display frame and that of the human body display frame are arranged on the same axis, in which FIG. 28A illustrates the face display frame and the human body display frame before position correction, and FIG. 28B illustrates the face display frame and the human body display frame after the position correction.

FIG. 30 is a diagram showing display patterns each determined by the frame determination process in FIG. 29 according to the relationship between the face detection information and human body display detection information and respective associated threshold values.

FIGS. 32A and 32B are diagrams useful in explaining hysteresis characteristics related to display and non-display determined by the frame display determination process in FIG. 29, in which FIG. 32A shows a determination condition for determining display or non-display of each display frame based on the size of the face display frame, and FIG. 32B shows a determination condition for determining display or non-display of each display frame based on the size of the human body display frame.

FIGS. 33A and 33B are views useful in explaining an example of display and non-display of a display frame determined by the frame display determination process described with reference to FIGS. 32A and 32B, in which FIG. 33A illustrates display in a state where the human face of an object and the human body of the same have been detected, and FIG. 33B illustrates display in a state where the size of a face display frame is increased to become larger than the associated threshold value.

FIGS. 34A and 34B are views useful in explaining another example of display and non-display of the display frame(s) determined by the frame display determination process described with reference to FIGS. 32A and 32B, in which FIG. 34A illustrates display in a state where the size of the face display frame continues to be larger than the threshold value, and FIG. 34B illustrates display at a moment when the human body display frame is made complete non-display.

DESCRIPTION OF THE EMBODIMENTS

The present invention will now be described in detail below with reference to the accompanying drawings showing embodiments thereof.

Figure 1:
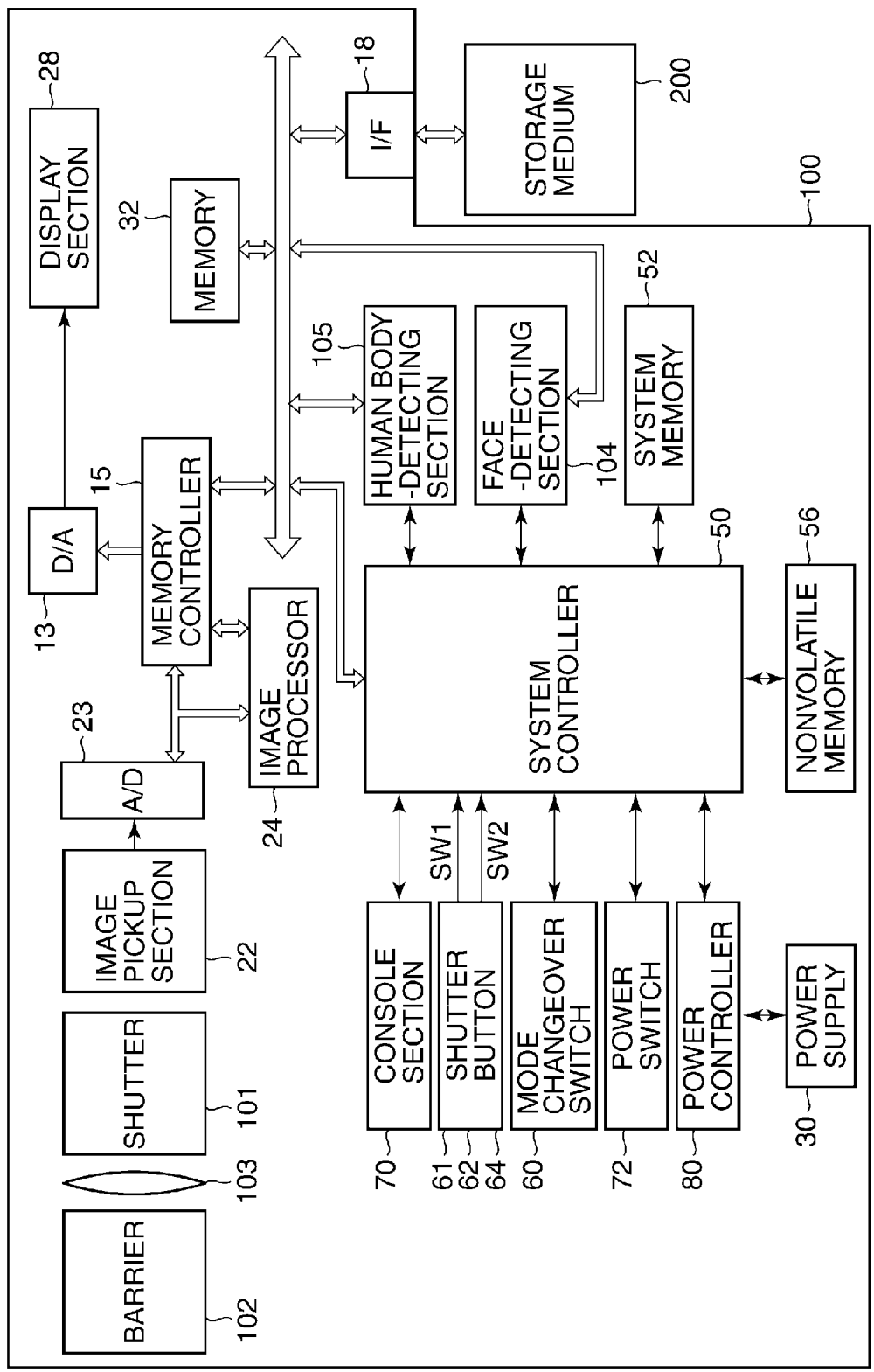
FIG. 1 is a block diagram of an image pickup apparatus according to a first embodiment of the present invention.

FIG. 1 is a block diagram of an image pickup apparatus according to a first embodiment of the present invention. The image pickup apparatus is provided with an image display controller described hereinafter.

Referring to FIG. 1, the image pickup apparatus shown in FIG. 1 is e.g. a digital camera 100. The digital camera (hereinafter simply referred to "the camera") 100 has a photographic lens 103 including a focus lens, and a barrier 102 disposed in the front of the photographic lens 103. Further, a shutter 101 provided with a stop function is disposed downstream of the photographic lens 103.

The photographic lens 103 causes an optical image to be formed on an image pickup section 22. The image pickup section 22 is implemented e.g. by a CCD or a CMOS. The image pickup section 22 converts the optical image to an electric signal (analog signal). The analog signal is converted to a digital signal by an analog-to-digital converter 23. Note that the barrier 102 covers an image pickup system including the photographic lens 103 to thereby prevent the photographic lens 103, the shutter 101, and the image pickup section 22 from being soiled or damaged.

The digital signal output from the analog-to-digital converter 23 is input to a memory controller 15 and an image processor 24. The image processor 24 performs resizing processing including pixel interpolation and size reduction and color conversion, on the digital signal from the analog-to-digital converter 23 or image data from the memory controller 15.

Further, the image processor 24 performs predetermined computation processing according to the digital signal, and then a system controller 50 performs exposure control and distance measurement control based on computation results obtained by the computation processing. With these controls, the system controller 50 executes TTL (through-the-lens) AF (autofocus) processing, AE (auto exposure) processing, and EF (electronic flash pre-emission) processing. Furthermore, the image processor 24 carries out TTL AWB (auto white balance) processing based on the computation results.

The digital signal output from the analog-to-digital converter 23 is written as image data in a memory 32 via the image processor 24 and the memory controller 15 or via the memory controller 15 alone. Note that the memory 32 has a sufficiently large storage capacity for storing a predetermined number of still images, or a moving image and sound recorded for a predetermined time period.

The memory 32 is also used as an image display memory (video memory). More specifically, the memory 32 stores image data to be displayed on a display section 28, as image display data. The image display data stored in the memory 32 is delivered to a digital-to-analog converter 13 via the memory controller 15 and is converted to an analog signal (analog image signal) by the digital-to-analog converter 13. The display section 28 displays an image according to the analog signal. Note that the display section 28 is e.g. a display device, such as an LCD.

The camera 100 is provided with a nonvolatile memory 56. The nonvolatile memory 56 stores data in an electrically erasable and recordable manner, and is implemented e.g. by an EEPROM (electrically erasable programmable read-only memory). The nonvolatile memory 56 stores constants for use in operation of the system controller 50, programs, and so forth. In the example illustrated herein, the programs are programs that execute various processes described hereinafter with reference to drawings.

The system controller 50 controls the overall operation of the camera 100. The system controller 50 executes the programs stored in the nonvolatile memory 56 to thereby perform the various processes described hereinafter. A system memory 52 is e.g. a RAM. The constants and variables for use in operation of the system controller 50, the programs read from the nonvolatile memory 56, and so forth are loaded in the system memory 52. Further, the system controller 50 controls the memory 32, the digital-to-analog converter 13, the display section 28, and so forth to thereby control image display in the display section 28.

Connected to the system controller 50 are a mode changeover switch 60, a shutter button 61, a first shutter switch 62, a second shutter switch 64, and a console section 70. The system controller 50 receives various operation instructions from the mode changeover switch 60, the shutter button 61, the first shutter switch 62, the second shutter switch 64, and the console section 70.

The shutter button 61 is used to give a shooting instruction. The shutter button 61 includes the first shutter switch 62 and the second shutter switch 64.

The mode changeover switch 60 is used to switch the operation mode of the system controller 50 between a still image recording mode, a moving image recording mode, a reproduction mode, and so forth.

The first shutter switch 62 is turned on by half operation of the shutter button 61, i.e. when the shutter button 61 is brought to a half pressed state (shooting preparation instruction state). As a consequence, a first shutter switch signal SW1 is delivered to the system controller 50. In response to the first shutter switch signal SW1, the system controller 50 starts AF processing, AE processing, AWB (auto white balance) processing, and EF (electronic flash pre-emission) processing or the like for a shooting process.

The second shutter switch 64 is turned on by complete operation of the shutter button 61, i.e. when the shutter button 61 is brought to a fully pressed state (shooting instruction state). As a consequence, a second shutter switch signal SW2 is delivered to the system controller 50. In response to the second shutter switch signal SW2, the system controller 50 starts a sequence of shooting processing from reading of an analog signal from the image pickup section 22 to writing of image data in a storage medium 200.

For example, when one of various function icons displayed on the display section 28 is selectively pressed, functions are assigned to the console section 70 on a screen-by-screen basis as required and act as respective function buttons. The function buttons include a stop button, a return button, an image scroll button, a jump button, a narrow-down button, and an attribute change button, for example.

For example, when a menu button is pressed, a menu screen including various menu options is displayed on the display section 28, and a user can intuitively configure various settings, using the menu screen displayed on the display section 28 and a four-way button and a set button.

The camera 100 has a power controller 80. Connected to the power controller 80 is a power supply 30. The power supply 30 includes e.g. a primary battery, such as an alkaline battery or a lithium battery, or a secondary battery, such as an NiCd battery, an NiMH battery, or an Li battery, as well as an AC adapter.

The power controller 80 includes a battery detection circuit, a DC-DC converter, and a switch circuit for use in switching between blocks to be supplied with electric power (none of which is shown). Further, the power controller 80 detects whether the power supply (battery) 30 is mounted, a type of the battery, and a remaining charge of the battery.

The power controller 80 controls the DC-DC converter based on detection results and instructions from the system controller 50 to supply a necessary voltage to each of the components including the storage medium 200 over a required time period.

The nonvolatile storage medium 200 is connected to the camera 100 via an interface (I/F) 18. The nonvolatile storage medium 200 is implemented e.g. by a memory card (semiconductor memory) or a hard disk (magnetic disk). Note that a power switch 72 is connected to the system controller 50, and the power is turned on or off by operating the power switch 72.

As shown in FIG. 1, the system controller 50 is connected to a face detecting section 104 and a human body-detecting section 105. The face detecting section 104 detects face information on an object from image data stored in the memory 32. The human body-detecting section 105 detects human body information on the object from the image data stored in the memory 32.

By the way, the camera 100 is capable of shooting using so-called central one-point AF or face AF. The central one-point AF is a method in which auto focus (AF) is performed on one point in the central part of an image pickup screen. On the other hand, the face AF is performed on the face of an object detected by a face-detecting function in the image pickup screen.

Now, a description will be given of the face-detecting function. The face detecting section 104 causes a horizontal band-pass filter to process image data under the control of the system controller 50. Then, the face detecting section 104 causes a vertical band-pass filter to process the image data having undergone the horizontal band-pass filtering process. The face detecting section 104 detects edge components of the image data by the horizontal and vertical band-pass filtering processes.

Thereafter, the face detecting section 104 performs pattern matching on the detected edge components under the control of the system controller 50 and extracts candidate groups of eyes, a nose, a mouth, and ears. The face detecting section 104 selects, from the extracted eye candidate group, candidates satisfying predetermined conditions (e.g. distance between two eyes, inclination of each eye, etc.), and determines the selected candidates to be a pair of eyes. Then, the face detecting section 104 narrows down the eye candidate group to candidates each determined as a pair of eyes.

Further, under the control of the system controller 50, the face detecting section 104 associates each candidate (a pair of eyes) of the thus narrowed-down eye candidate group with other parts (a nose, a mouth, and ears) that form a face together with the pair of eyes. Then, the face detecting section 104 performs a predetermined non-face condition filtering process to thereby detect a human face (face area: specific area).

After having performed the face detection as described above, the face detecting section 104 outputs face information according to the result of the face detection, followed by terminating the face detection processing. The face information is stored in the system memory 52. Note that face information will be described hereinafter.

Next, a description will be given of a human body-detecting function. The human body-detecting section 105 causes the horizontal band-pass filter process image data under the control of the system controller 50. Then, the human body-detecting section 105 causes the vertical band-pass filter to process the image data having undergone the horizontal band-pass filtering process. The human body-detecting section 105 detects edge components of the image data by the horizontal and vertical band-pass filtering processes.

Thereafter, the human body-detecting section 105 performs pattern matching on the detected edge components under the control of the system controller 50 and determines whether or not the edge components correspond to a contour shape of a human body including a head portion, to thereby detect a human body (body area: remaining area). After having performed the human body detection as described above, the human body-detecting section 105 outputs human body information according to the result of the human body detection, followed by terminating the human body detection processing. The human body information is stored in the system memory 52. Note that human body information will be described hereinafter.

Figure 2:
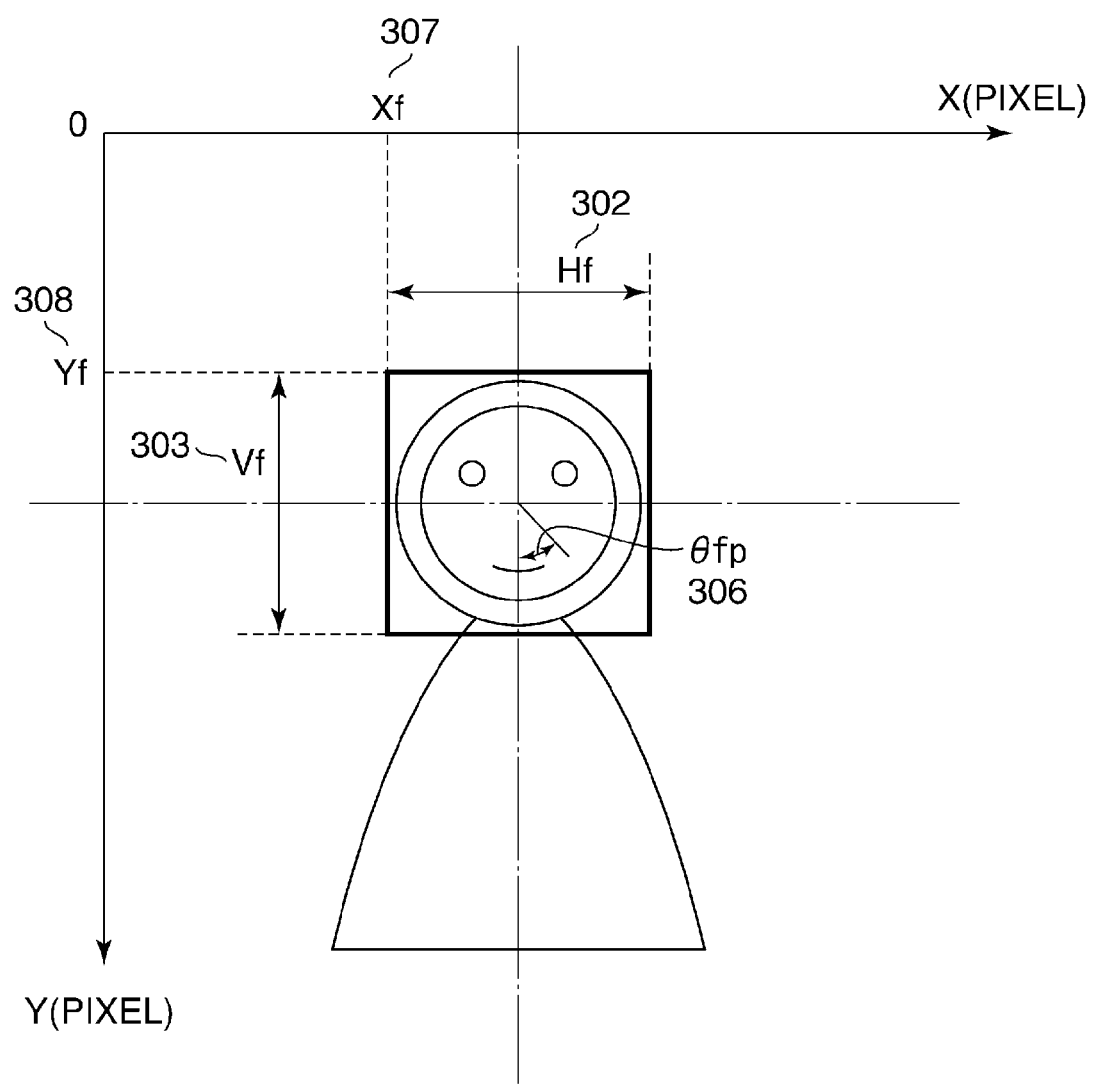
FIG. 2 is a view illustrating a first example of face information (face detection information) on a face detected by a face detecting section appearing in FIG. 1.

FIG. 2 is a view illustrating an example of face information (face detection information) on a face detected by the face detecting section 104 appearing in FIG. 1.

As shown in FIG. 2, the face detection information (also referred to as "the face detection area") has a face horizontal detection position (Xf) 307. The face horizontal detection position (Xf) 307 represents pixel information as a horizontal start point of a face in image data as a target for face detection (hereinafter referred to as "the face detection target"). Further, the face detection information has a face vertical detection position (Yf) 308. The face vertical detection position (Yf) 308 represents pixel information as a vertical start point of the face in the image data as the face detection target.

A face horizontal detection size (Hf) 302 represents pixel information indicative of the horizontal size of the face in the image data as the face detection target. A face vertical detection size (Vf) 303 represents pixel information indicative of the vertical size of the face in the image data as the face detection target. Further, a face pitch-direction detection angle ($\theta$fp) 306 represents angle information indicative of an inclination of the face with respect to the vertical direction.

Figure 3:
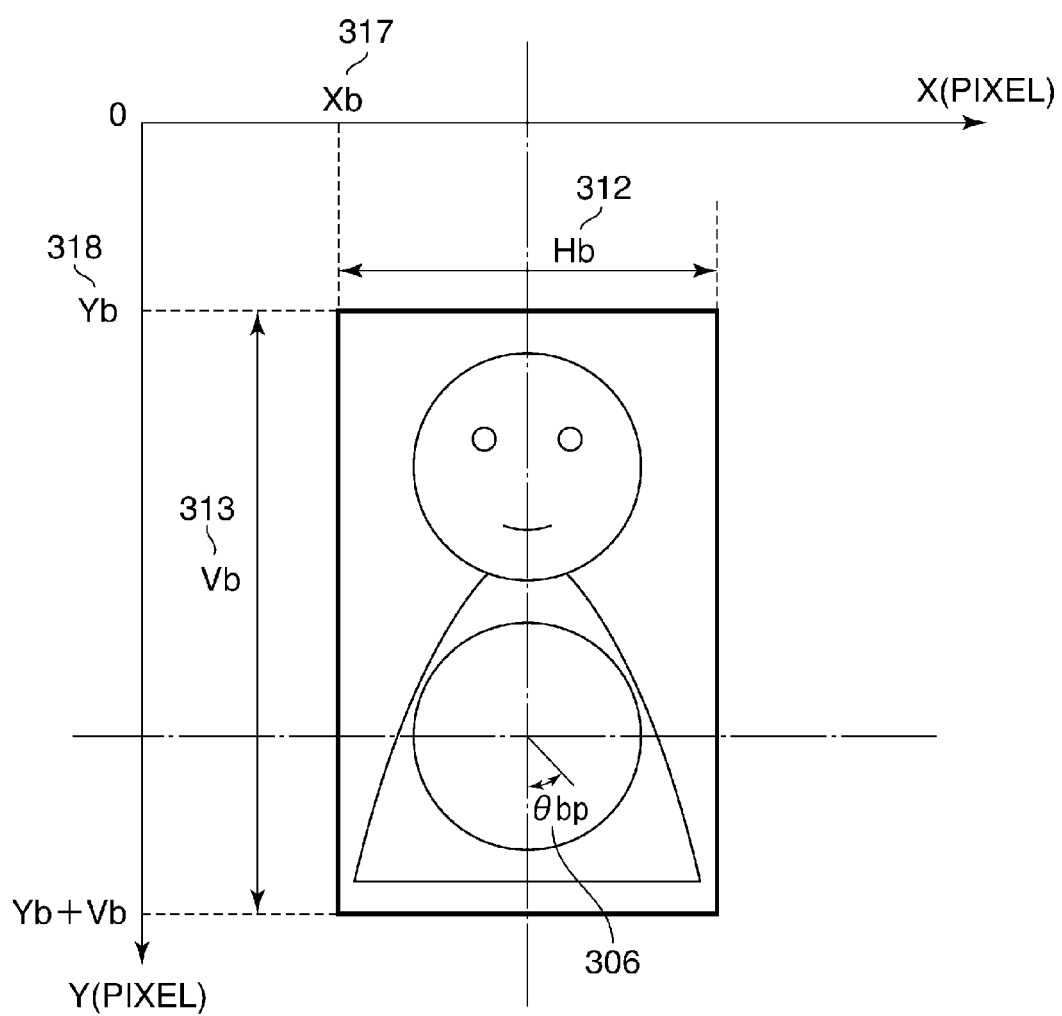
FIG. 3 is a view of a first example of human body information (human body detection information) on a human body detected by a human body-detecting section appearing in FIG. 1.

FIG. 3 is a view of a first example of human body information (human body detection information) on a human body detected by the human body-detecting section 105 appearing in FIG. 1.

As shown in FIG. 3, the human body detection information (also referred to as "the human body detection area") has a human body horizontal detection position (Xb) 317. The human body horizontal detection position (Xb) 317 represents pixel information as a horizontal start point of a human body in image data as a target from which a human body is to be detected (hereinafter referred to as "the human body detection target"). Further, the human body detection information has a human body vertical detection position (Yb) 318. The human body vertical detection position (Yb) 318 represents pixel information as a vertical start point of the human body in the image data as the human body detection target.

A human body horizontal detection size (Hb) 312 represents pixel information indicative of the horizontal size of the human body in the image data as the human body detection target. A human body vertical detection size (Vb) 313 represents pixel information indicative of the vertical size of the human body in the image data as the human body detection target.

Further, a human body pitch-direction detection angle ($\theta$bp) 316 represents angle information indicative of an inclination of the human body with respect to the vertical direction.

Figure 4:
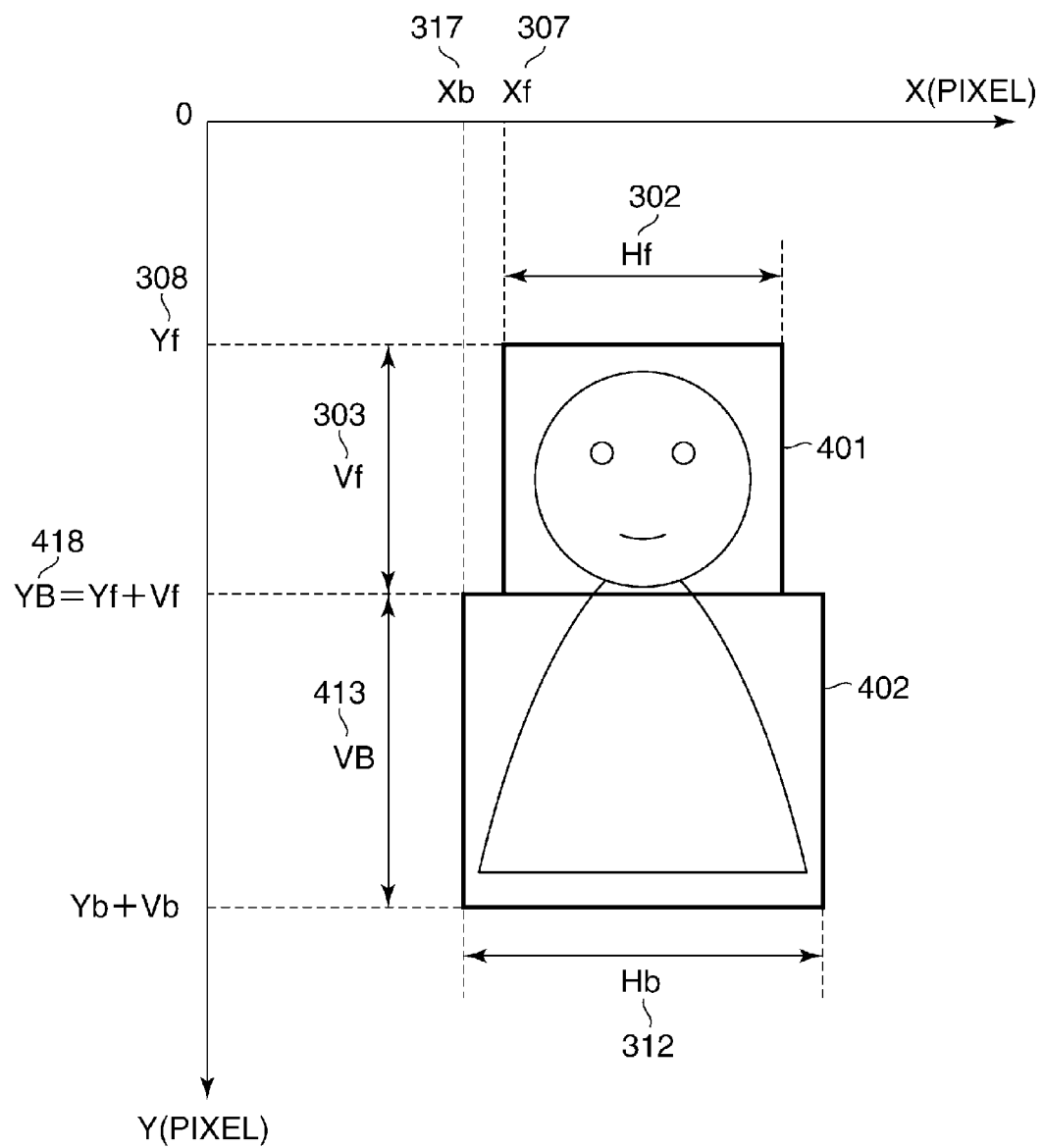
FIG. 4 is a view illustrating an example of a face display frame and a human body display frame displayed on a display section appearing in FIG. 1.

FIG. 4 is a view illustrating an example of a face display frame and a human body display frame displayed on the display section 28 appearing in FIG. 1. Note that in FIG. 4, component elements identical to those in FIGS. 2 and 3 are denoted by the same reference numerals as those in FIGS. 2 and 3.

Referring to FIGS. 2 to 4, in the case of displaying a face display frame 401, coordinates (Xf, Yf) represented by the face horizontal detection position (Xf) 307 and the face vertical detection position (Yf) 308 appearing in FIG. 2 are set as a starting point. Then, pixels within a range defined from the starting point by the number of pixels corresponding to the face horizontal detection size (Hf) 302 in the horizontal direction and the number of pixels corresponding to the face vertical detection size (Vf) 303 in the vertical direction are enclosed in a frame. In short, the face display frame 401 is displayed on the display section 28 such that the face display frame 401 matches the face detection information.

On the other hand, a human body display frame 402 is displayed on the display section 28 after the human body detection information is partially changed as follows:

In displaying the human body display frame 402, the human body horizontal detection position (Xb) 317 is set as a horizontal starting point. On the other hand, a human body vertical display position (YB) 418 is set as a vertical starting point of the human body display frame 402. The human body vertical display position (YB) 418 is obtained by adding the value Vf of the face vertical detection size (Vf) 303 to the face vertical detection position (Yf) 308. In short, the human body vertical display position (YB) 418 is expressed by YB=Yf+Vf.

Further, a position obtained by addition of the human body vertical detection position (Yb) 318 and human body vertical detection size (Vb) 313 both appearing in FIG. 3, i.e. a vertical coordinate (Yb+Vb) is set as an end point of the human body display frame 402. A human body vertical display size (VB) 413 is obtained by subtracting the human body vertical display position (YB) 418 from the vertical coordinate (Yb+Vb) as the end point of the human body display frame 402. In short, the human body vertical display size (VB) 413 is expressed by VB=(Yb+Vb)−YB.

Thus, in displaying the human body display frame 402, coordinates (Xb, YB) represented by the human body horizontal detection position (Xb) 317 and the human body vertical display position (YB) 418 are set as a starting point, and pixels within a range defined from the starting point by the number of pixels corresponding to the human body horizontal detection size (Hb) 312 in the horizontal direction and the number of pixels corresponding to the human body vertical display size (VB) 413 in the vertical direction are enclosed in a frame.

Figure 5:
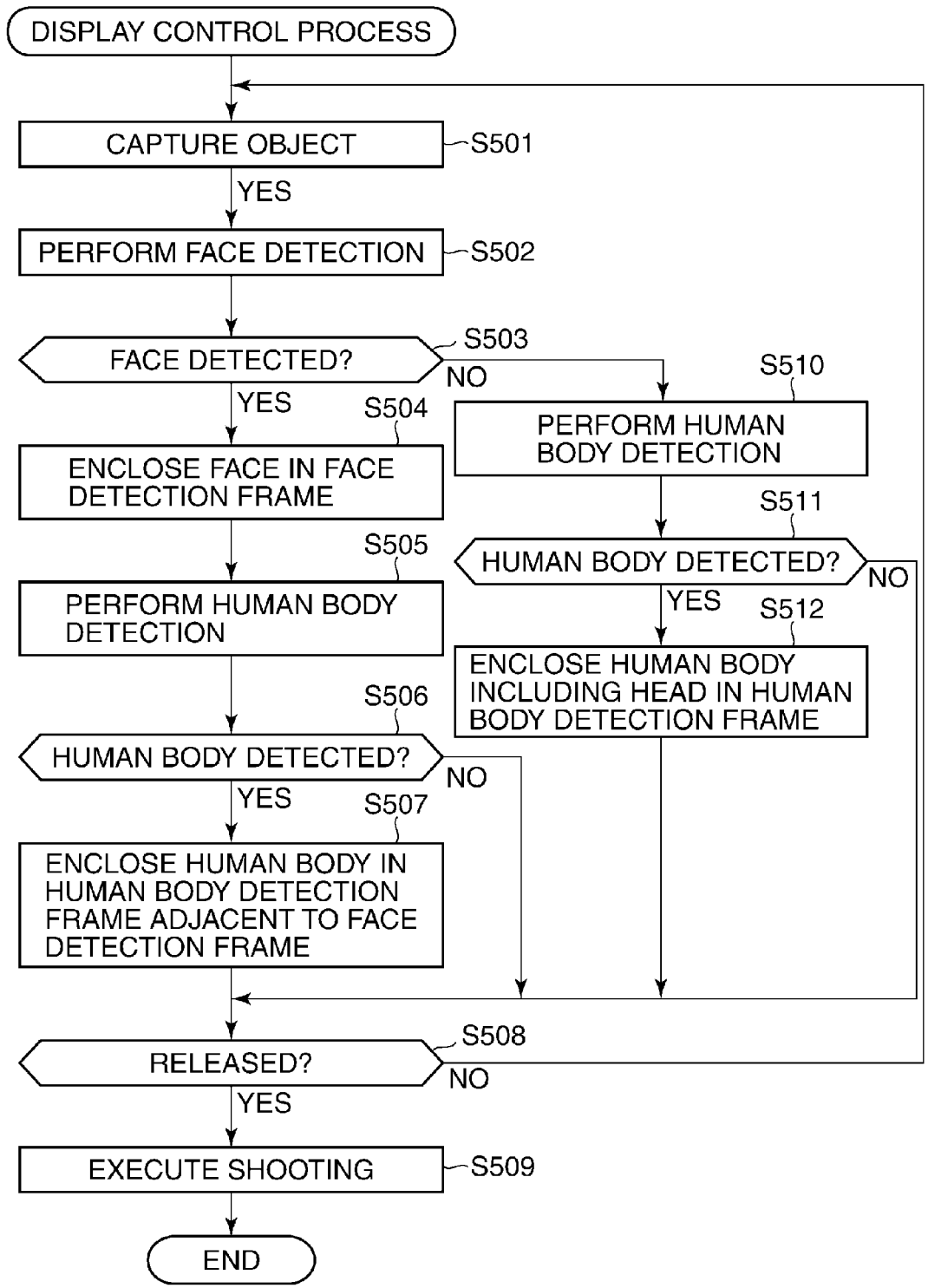
FIG. 5 is a flowchart of a display control process for displaying the face display frame and the human body display frame illustrated in FIG. 4.

FIG. 5 is a flowchart of a display control process for displaying the face display frame 401 and the human body display frame 402 illustrated in FIG. 4.

Referring to FIGS. 1 and 5, first, when the first shutter switch 62 is turned on, the system controller 50 reads image data from the memory 32 and captures an object from the image data (step S501). Then, the face detecting section 104 performs face detection on the object as described hereinbefore (step S502).

The system controller 50 determines, based on results obtained by the face detection, whether or not a human face (face area) has been detected (step S503). If a human face has been detected (YES to the step S503), the system controller 50 encloses the face in the face display frame 401 as described with reference to FIG. 4 (step S504).

Then, the human body-detecting section 105 performs human body detection on the object as described hereinbefore (step S505). The system controller 50 determines, based on results obtained by the human body detection, whether or not a human body (body area) has been detected (step S506). If it is determined that a human body has been detected (YES to the step S506), the system controller 50 encloses the human body (exclusive of the face) in the human body display frame 402, as described with reference to FIG. 4, such that the human body display frame 402 is disposed adjacent to the face display frame 401 (step S507).

Then, the system controller 50 determines whether or not the shutter 101 has been released by fully pressing the shutter button 61, in other words whether or not the second shutter switch 64 has been turned on (step S508). If it is determined that the shutter 101 has been released (YES to the step S508), the system controller 50 executes shooting (step S509), followed by terminating the present process. On the other hand, if it is determined that the shutter 101 has not been released (NO to the step S508), the process returns to the step S501, and the system controller 50 continues the present process.

If it is determined in the step S506 that no human body has been detected (NO to the step S506), the system controller 50 proceeds to the step S508.

If it is determined in the step S503 that no face has been detected (NO to the step S503), the system controller 50 controls the human body-detecting section 105 to perform human body detection (step S510). Then, the system controller 50 determines, based on results of the human body detection, whether or not a human body has been detected (step S511).

If it is determined that a human body has been detected (YES to the step S511), the system controller 50 encloses the human body including the head portion in the human body display frame 402 (step S512). In other words, the human body display frame 402 is displayed on the display section 28 such that the human body display frame 402 matches human body detection information on the detected human body as described with reference to FIG. 4. Thereafter, the system controller 50 proceeds to the step S508.

If it is detected that no human body has been detected (NO to the step S511), the system controller 50 proceeds to the step S508.

Figure 6:
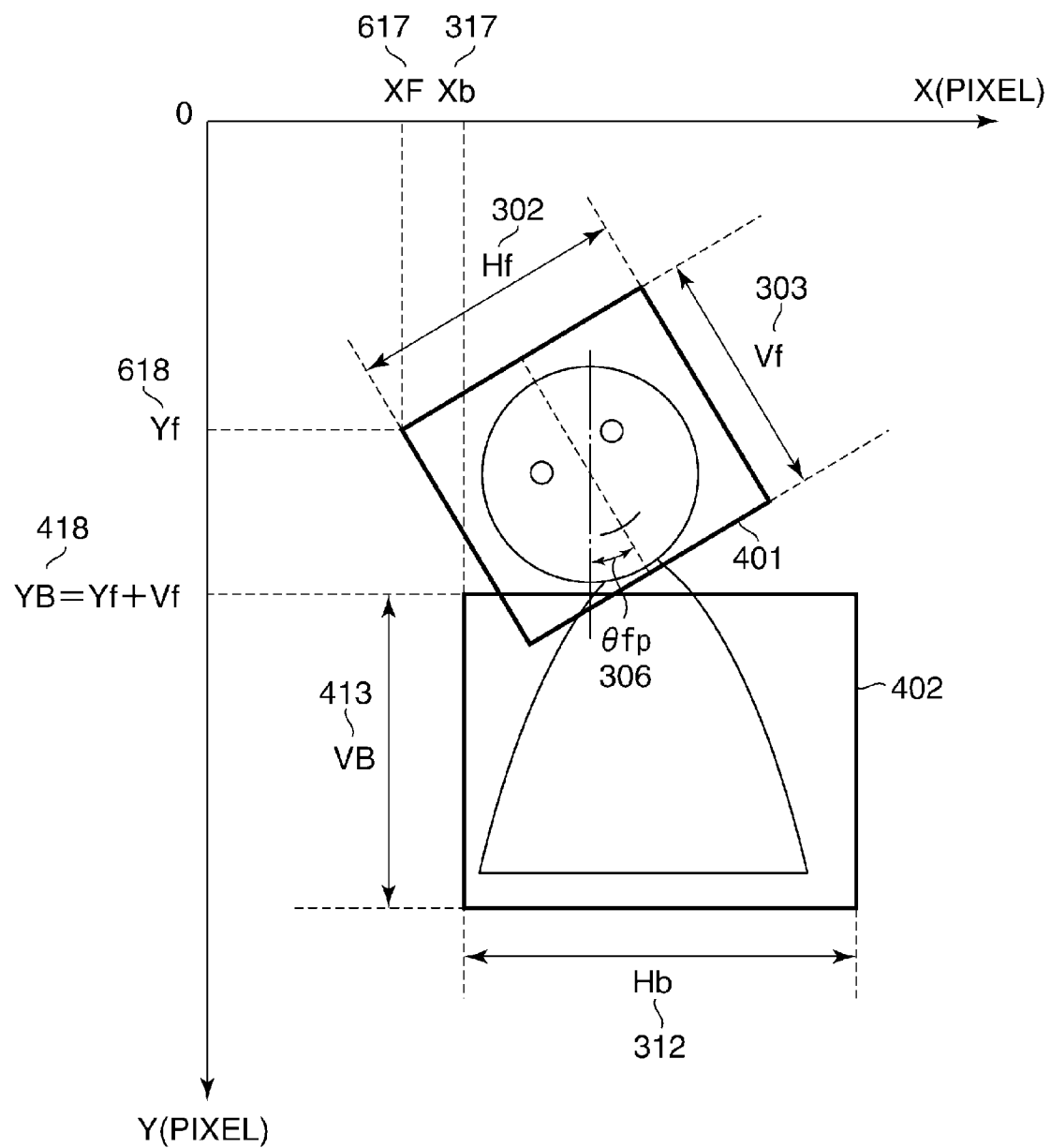
FIG. 6 is a view illustrating an example of how the face display frame and the human body display frame are displayed on the display section appearing in FIG. 1 when the human face is inclined with respect to the human body in a pitch direction.

FIG. 6 is a view illustrating an example of how the face display frame 401 and the human body display frame 402 are displayed on the display section 28 appearing in FIG. 1 when a human face is inclined with respect to a human body in the pitch direction. Note that the display position of the human body display frame 402 in FIG. 6 is identical to that in the example shown in FIG. 4.

As shown in FIG. 6, when a human body is inclined through the face pitch-direction detection angle (θfp) 306, the system controller 50 displays the face display frame 401 on the display section 28 in a manner tilted through the face pitch-direction detection angle (θfp) 306. In this case, the face display frame 401 partially overlaps the human body display frame 402, and the overlapping portion of the face display frame 401 is not displayed. Thus, when a face display frame is inclined in the pitch direction relative to a human body display frame, the overlapping portion of the face display frame is not displayed.

More specifically, a point of coordinates (XF, YF) defined by a face horizontal display position (XF) 617 and a face vertical display position (YF) 618 is set as a starting point. Then, pixels within a range defined from the starting point by the number of pixels corresponding to the face horizontal detection size (Hf) 302 in a direction inclined through the face pitch-direction detection angle (θfp) 306 with respect to the horizontal direction and the number of pixels corresponding to the face vertical detection size (Vf) 303 in a direction inclined through the face pitch-direction detection angle (θfp) 306 with respect to the vertical direction are enclosed in a frame. Then, the frame is displayed as the face display frame 401 on the display section 28. In this case, a portion of the face display frame 401 in a vertical coordinate range larger than the vertical coordinate of the human body vertical display position (YB=Yf+Vf) 418 is not displayed.

In the above description, when the face display frame 401 and the human body display frame 402 partially overlap each other, a portion of the face display frame 401 which overlaps the human body display frame 402 is not displayed, but the corresponding portion of the human body display frame 402 may not be displayed.

As described above, according to the first embodiment, a face display frame representing results of face detection and a human body display frame representing results of detection of a human body exclusive of a head portion can be displayed in a manner easily perceivable by a user.

Next, a description will be given of an image pickup apparatus according to a second embodiment of the present invention. Note that the construction of a camera as the image pickup apparatus according to the second embodiment is identical to that of the camera in FIG. 1, and therefore description thereof is omitted.

Figure 7:
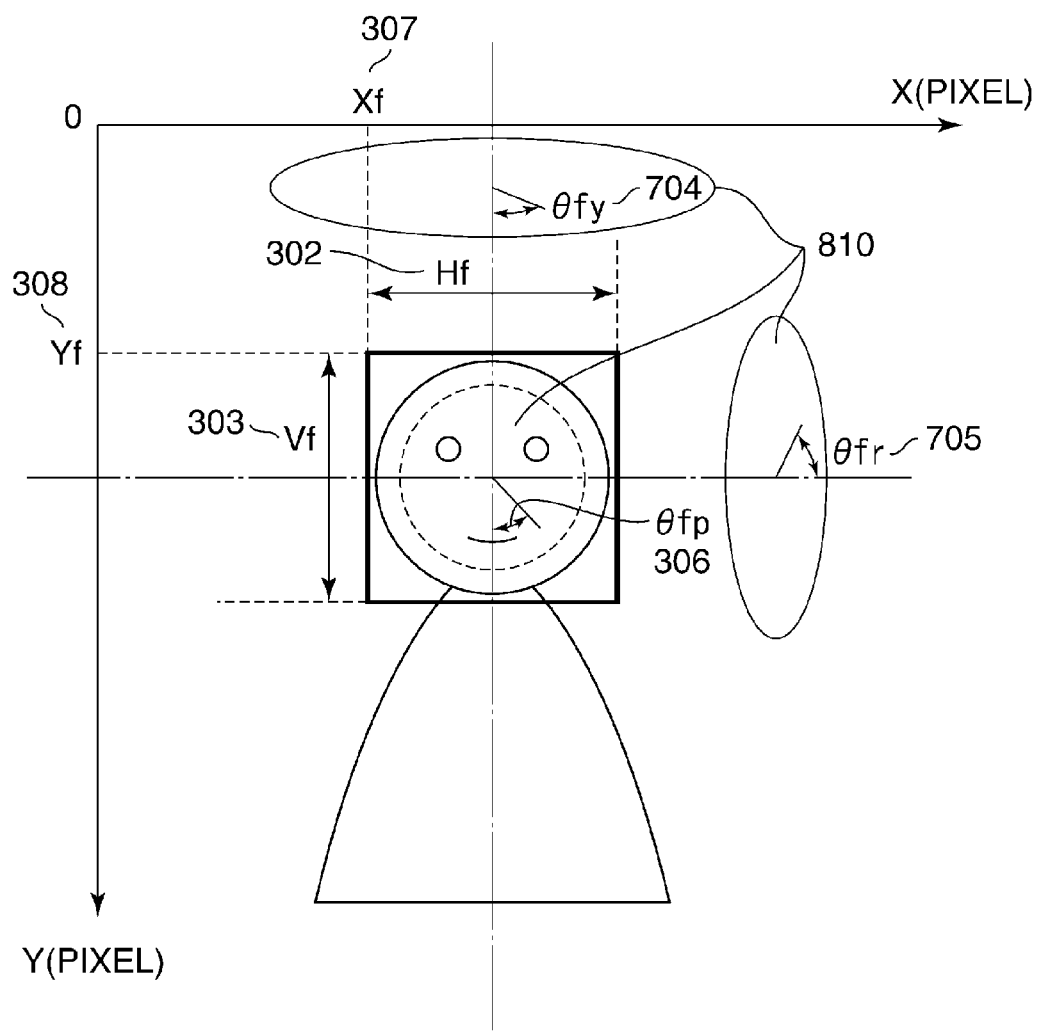
FIG. 7 is a view illustrating an example of face information (face detection information) on a face detected by the face detecting section appearing in FIG. 1 in a second embodiment of the present invention.

FIG. 7 is a view illustrating face information (face detection information) on a face detected by the face detecting section 104 appearing in FIG. 1. In FIG. 7, component elements identical to those shown in FIG. 2 are denoted by identical reference numerals, and description thereof is omitted. In the present embodiment, the image pickup apparatus detects a yaw-direction angle, a roll-direction angle, and a pitch-direction angle of each of a face area and a human body area.

Referring to FIG. 7, a face yaw-direction detection angle (θfy) 704 represents angle information indicative of the rotational angle (also simply referred to "rotation") of a face in a horizontal direction (yaw direction) about a vertical axis thereof. A face roll-direction detection angle (θfr) 705 represents angle information indicative of the rotational angle of the face in a vertical direction (roll direction) about a horizontal axis thereof. The face yaw-direction detection angle (θfy) 704, the face roll-direction detection angle (θfr) 705, and the face pitch-direction detection angle (θfp) 306 are collectively referred to as "face detection angle information 810".

Figure 8:
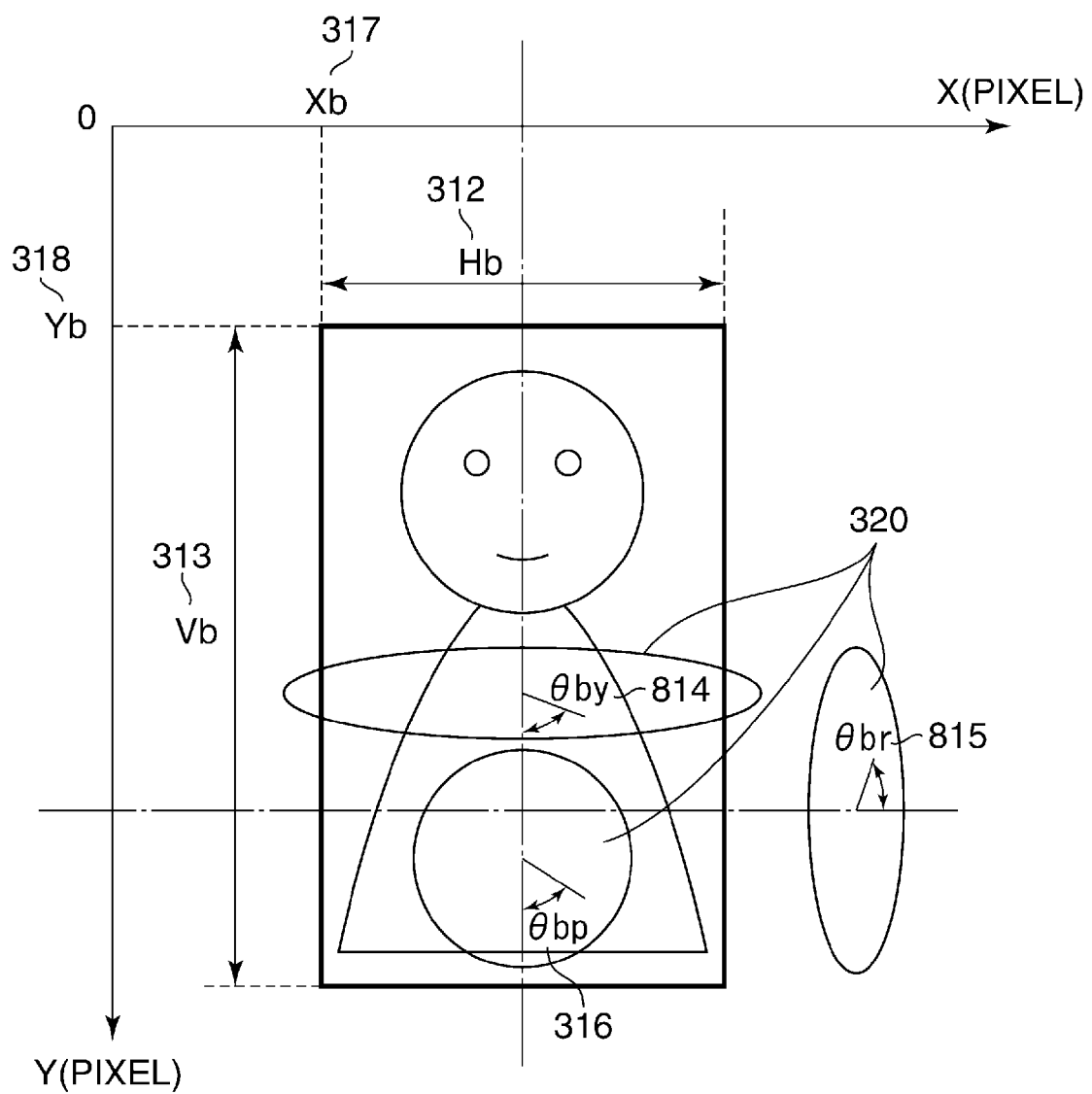
FIG. 8 is a view illustrating an example of human body information (human body detection information) on a human body detected by the human body-detecting section appearing in FIG. 1 in the second embodiment of the present invention.

FIG. 8 is a view illustrating human body information (human body detection information) on a human body detected by the human body-detecting section 105 appearing in FIG. 1. In FIG. 8, component elements identical to those shown in FIG. 3 are denoted by identical reference numerals, and description thereof is omitted.

Referring to FIG. 8, a human body yaw-direction detection angle 814 represents angle information indicative of the rotation of a human body in the horizontal direction (yaw direction). A human body roll-direction detection angle 815 represents angle information indicative of the rotation of the human body in the vertical direction (roll direction). The human body yaw-direction detection angle 814, the human body roll-direction detection angle 815, and the human body pitch-direction detection angle 316 are collectively referred to as "human body detection angle information 320".

In the second embodiment, the camera 100 can perform a tracking process for tracking an object, by detecting the motion vector of a face area detected by a face detection function, on an image pickup screen.

In the case of performing time-series continuous shooting, the camera 100 detects the motion vector of an object area (face area) in consecutive images of the current frame and the immediately preceding frame. Then, the camera 100 sets a result of the motion vector detection as a movement amount of the object area, and sequentially corrects the position of the object area to thereby execute the tracking process for tracking the object.

Thus, for example, even when a face gradually turns backward and comes into an undetectable state, it is possible to track the face as an area where a head exists. The system controller 50 obtains a motion vector amount by performing correlation calculation, such as block matching, on object area data between the current frame and the immediately preceding frame.

Figure 9:
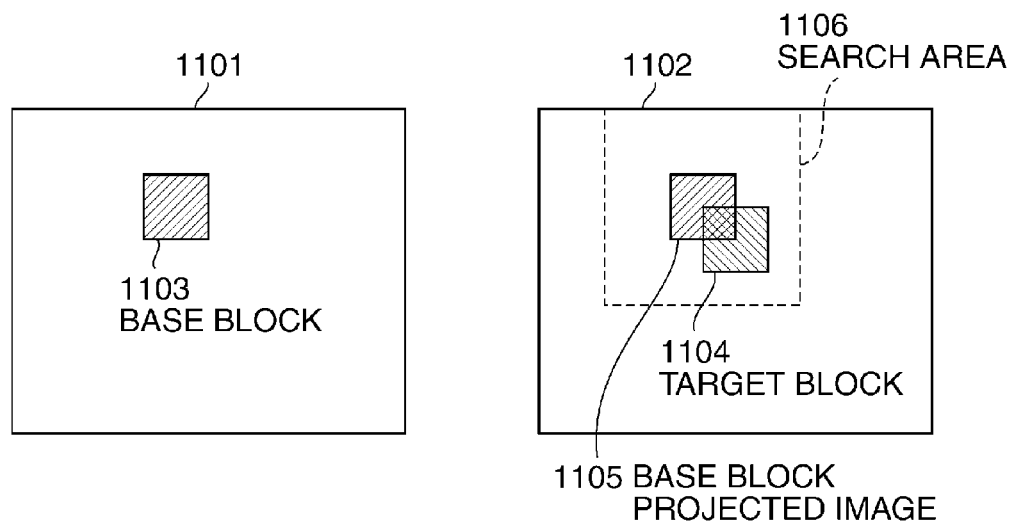
FIG. 9 is a view useful in explaining block matching as an example of correlation calculation processing performed by a system controller appearing in FIG. 1 in the second embodiment.

FIG. 9 is a view useful in explaining block matching as an example of the correlation calculation processing performed by the system controller 50 appearing in FIG. 1.

Referring to FIG. 9, two images as a block matching target are denoted by respective reference numerals 1101 and 1102. A search area 1106 defined in the image 1102 is searched for a position (most analogous position) of an area which is analogous to an image area represented as a base block 1103 in the image 1101. The most analogous position is where as a result of SAD operation performed on all pixels in the search area 1106, a minimum value (SAD value) is obtained. In the illustrated example, the SAD value represents the sum of absolute differences. A difference between the coordinates of the position (imaging position) obtained by the above-described search and the coordinates of the base block 1103 is determined as a motion vector.

In a case where the search is performed, for example, when a projected image obtained by projecting the base block 1103 onto the image 1102 is represented as a base block projected image 1105, the search area 1106 is defined within a predetermined range surrounding the base block projected image 1105. Then, a target block 1104 located within the search area 1106 and having the same size as the base block 1103 is determined.

The target block 1104 and the base block 1103 are cut out to thereby obtain the SAD value. In doing this, the sad value is obtained between each of all possible target blocks 1104 and the base block 1103. Then, the position of a target block 1104 associated with the smallest one of the obtained SAD values is determined, and the coordinates of the position are set as imaging position coordinates. The difference between the imaging position coordinates and the coordinates of the base block 1103 is the motion vector.

Next, a description will be given of generation of a face display frame and a human body display frame by the system controller 50 appearing in FIG. 1.

Figure 10:
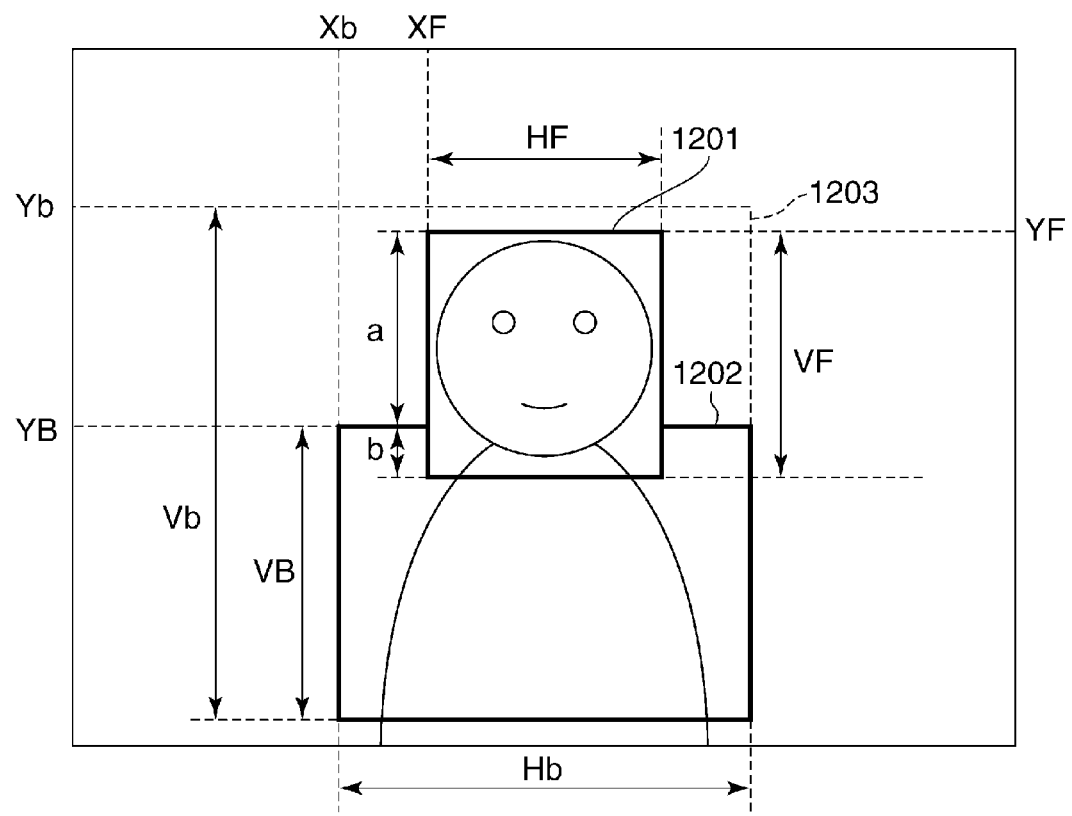
FIG. 10 is a view useful in explaining an example of how a face display frame and a human body display frame are generated by the system controller appearing in FIG. 1 in the second embodiment.

FIG. 10 is a view useful in explaining an example of how a face display frame and a human body display frame are generated by the system controller 50 appearing in FIG. 1.

Referring to FIG. 10, a face horizontal display position XF and a face vertical display position YF and a face horizontal display size HF and a face vertical display size VF of the face display frame 1201 are determined based on a face horizontal detection position Xf and a face vertical detection position Yf and a face horizontal detection size Hf and a face vertical detection size Vf. In the present example, it is assumed that XF=Xf, YF=Yf, HF=Hf, and VF=Vf.

A human body detection area 1203 indicated by broken lines is obtained based on a human body horizontal detection position Xb and a human body vertical detection position Yb and a human body horizontal detection size Hb and a human body vertical detection size Vb. As shown in FIG. 10, the lower left position, lower right position, and width of a human body display frame 1202 are equal to those of the human body detection area 1203. The height of the human body display frame 1202 is determined based on the height of a face size.

As shown in FIG. 10, for example, values "a" and "b" that satisfy a predetermined fixed ratio C=a/b are determined from the face-size height (face vertical display size VF). Then, a position YB of the upper side of the human body display frame 1202 is determined according to the values "a" and "b", whereby a height VB of the human body display frame 1202 is determined. In short, the position YB and the height VB are determined such that YB=Yf+a and VB=(Yb+Vb)−YB. Further, processing is performed to prevent the human body display frame 1202 from being displayed in a manner overlapping the face display frame 1201. In the FIG. 10 example, the face display frame 1201 is disposed on a side of the human body display frame 1202 toward the viewer.

The system controller 50 generates the face display frame 1201 and the human body display frame 1202 as described above and displays these on the display section 28 together with the object.

Figure 11:
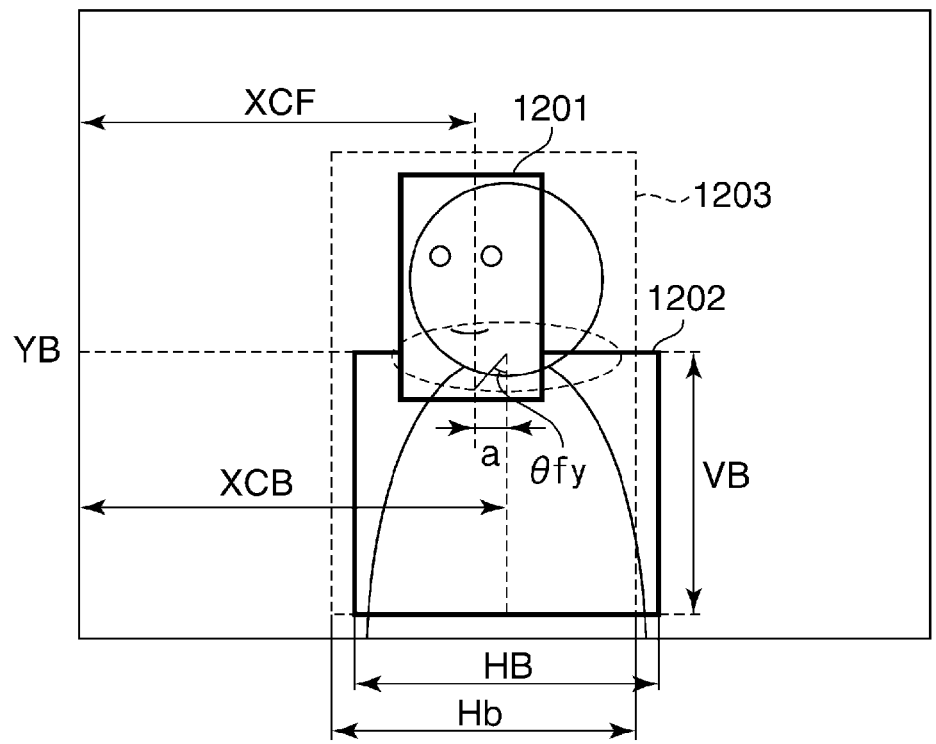
FIG. 11 is a view useful in explaining another example of how a face display frame and a human body display frame are generated by the system controller appearing in FIG. 1 in the second embodiment.

FIG. 11 is a view useful in explaining another example of how a face display frame and a human body display frame are generated by the system controller 50 appearing in FIG. 1.

In the example shown in FIG. 11, the system controller 50 generates a face display frame and a human body display frame using the yaw-direction angle θfy indicative of an orientation of a face.

As described hereinbefore, the system controller 50 generates the face display frame 1201 based on face detection information and determines the human body display frame 1203 based on human body detection information. A width HB of the human body display frame 1202 is equal to a width Hb of the human body display frame 1203 (HB=Hb). The vertical position YB of the human body display frame 1202 and the height VB are determined as described with reference to FIG. 10.

Further, the system controller 50 determines the horizontal position XB of the human body display frame 1202 through the process described hereinbefore (XB=Xb). Then, the system controller 50 calculates a=R×sin(θfy) according to the yaw-direction angle θfy. The value R is determined according to the width Hf of the face detection information. For example, the value R is set to be equal to ½ of a width obtained from the face detection information (R=½×Hf).

In the human body display frame 1202, a horizontal central position XCB is positioned rightward, as viewed in FIG. 11, of a horizontal central position XCF of the face display frame 1201 by a distance "a" (XCB=XCF+a). In the present example, XCF=XF+HF/2 holds. Further, the system controller 50 determines the position XB of the human body display frame 1202 by XB=XCB−HB/2.

Then, the system controller 50 displays the face display frame 1201 and the human body display frame 1202 generated as above, on the display section 28 together with the image. In the present example, the face faces (is oriented) leftward, but when the face faces rightward, the horizontal central position XCB is positioned leftward, as viewed in FIG. 11, of the horizontal central position XCF of the face display frame 1201 by a distance "a" (XCB=XCF−a). A direction in which the face is oriented can be determined by comparison between the central position of the human body detection area and that of the face detection area. When the central position of the face detection area is located leftward of that of the human body detection area, it is possible to determine that the face is oriented leftward, whereas when the central position of the face detection area is located rightward of that of the human body detection area, it is possible to determine that the face is oriented rightward.

Although in the above-described example, a face display frame is generated based on face detection information and a human body display frame is generated based on the face detection information and human body detection information, the face display frame may also be generated using not only the face detection information but the human body detection information as well.

Figure 12:
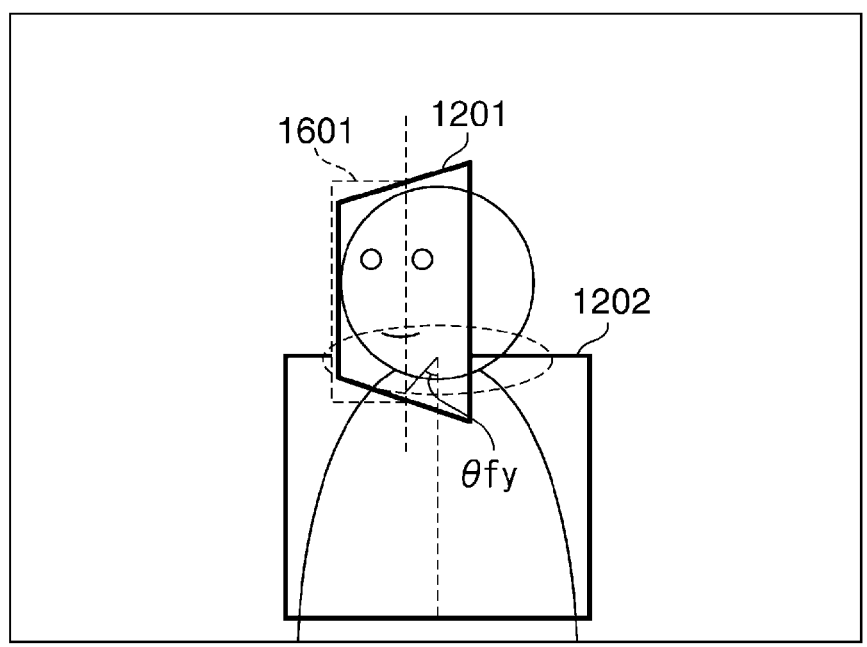
FIG. 12 is a view useful in explaining still another example of how a face display frame and a human body display frame are generated by the system controller appearing in FIG. 1 in the second embodiment.

FIG. 12 is a view useful in explaining still another example of how a face display frame and a human body display frame are generated by the system controller 50 appearing in FIG. 1.

In the example shown in FIG. 12, the system controller 50 generates a face display frame and a human body display frame using the yaw-direction angle θfy indicative of an orientation f a face.

The system controller 50 determines a face detection area 1601 according to face detection information, and generates the human body display frame 1202 according to human body detection information as described with reference to FIG. 10 or 11. The system controller 50 rotates the frame of the face detection area 1601 in a three-dimensional space based on the yaw-direction angle θfy determined from the face detection information, and then two-dimensionally maps the determined frame to thereby generate the face display frame 1201. Then, the system controller 50 displays the face display frame 1201 and the human body display frame 1202 generated as above, on the display section 28 together with the image.

Figure 13:
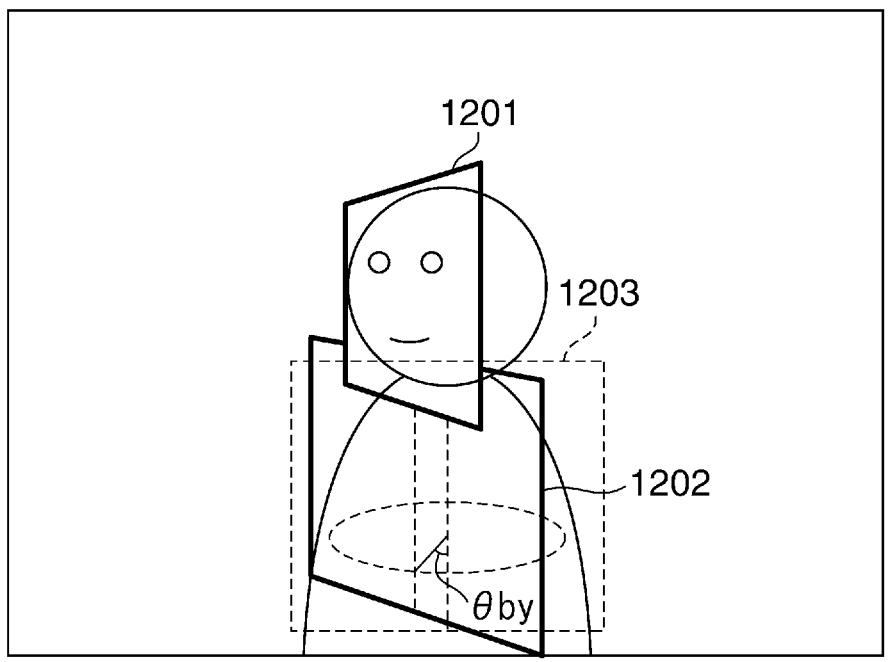
FIG. 13 is a view useful in explaining still another example of how a face display frame and a human body display frame are generated by the system controller appearing in FIG. 1 in the second embodiment.

FIG. 13 is a view useful in explaining still another example of how a face display frame and a human body display frame are generated by the system controller 50 appearing in FIG. 1.

In the example shown in FIG. 13, the system controller 50 generates a face display frame and a human body display frame using the yaw-direction angle θfy indicative of an orientation of a face and the yaw-direction angle θby indicative of an orientation of a human body.

The system controller 50 generates the face display frame 1201 as described with reference to FIG. 12. Further, the system controller 50 generates the human body detection area 1203 as described with reference to FIG. 10. The system controller 50 rotates the human body detection area 1203 in a three-dimensional space based on the yaw-direction angle θby determined from the human body detection information, to thereby generate a frame. Then, the system controller 50 two-dimensionally maps the generated frame to thereby generate the human body display frame 1202.

In this case, the system controller 50 performs control such that a portion of the human body display frame 1202 which overlaps the face display frame 1201 is not displayed. As a consequence, the face display frame 1201 is displayed on a side of the human body display frame 1202 toward the viewer.

Then, the system controller 50 displays the face display frame 1201 and the human body display frame 1202 generated as above, on the display section 28 together with the image.

In the above-described example, a face display frame and a human body display frame are generated based on the position, size, and yaw-direction angle θfy of a face and the position, size, and yaw-direction angle θby of a human body. Similarly, it is possible to generate a face display frame using the roll-direction and pitch-direction angles θfr and θfp of a face. Further, it is possible to generate a human body display frame using the roll-direction and pitch-direction angles θbr and θbp of a human body.

Figure 14A:
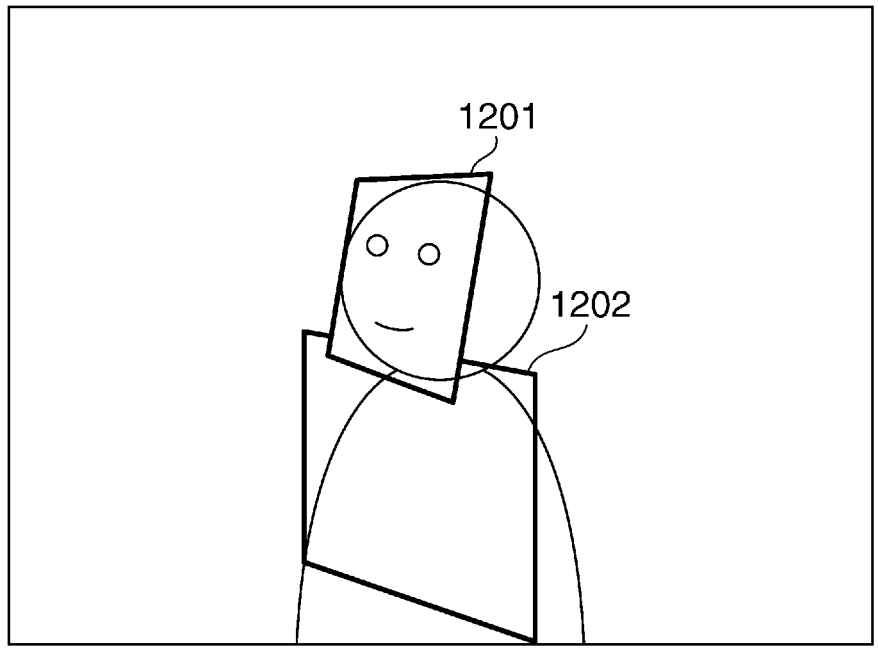
Figure 14B:
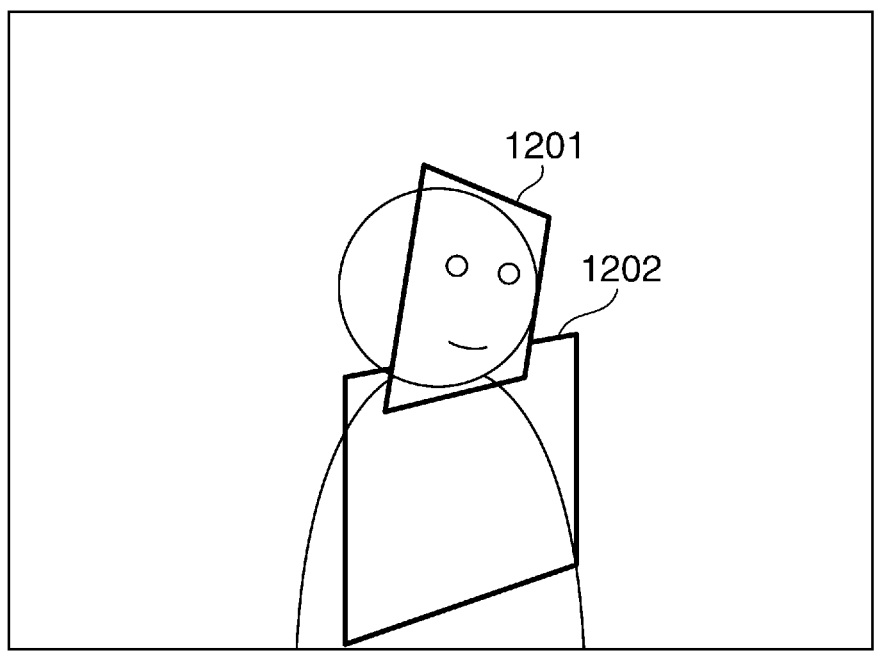

FIGS. 14A and 14B are views illustrating a still another example of how are displayed a face display frame and a human body display frame generated by the system controller 50 appearing in FIG. 1. FIG. 14A illustrates how the face display frame and the human body display frame are displayed when a human body is oriented leftward and a face is oriented upward, and FIG. 14B illustrates how the face display frame and the human body display frame are displayed when the human body is oriented rightward and the face is oriented downward.

Referring to FIGS. 14A and 14B, the system controller 50 generates the face display frame 1201 and the human body display frame 1202 based on the horizontal detection position Xf, the vertical detection position Yf, the horizontal detection size Hf, the vertical detection size Vf, the yaw-direction angle θfy, the roll-direction angle θfr, and the pitch-direction angle θfp of the face, and the horizontal detection position Xb, the vertical detection position Yb, the horizontal detection size Hb, the vertical detection size Vb, the yaw-direction angle θby, the roll-direction angle θbr, and the pitch-direction angle θbp of the human body. Then, the system controller 50 displays the face display frame 1201 and the human body display frame 1202 generated as above, on the display section 28 together with the image.

In this case, when the human body is oriented leftward and the face is oriented upward, the face display frame 1201 and the human body display frame 1202 are displayed as illustrated in FIG. 14A. On the other hand, when the human body is oriented rightward and the face is oriented downward, the face display frame 1201 and the human body display frame 1202 are displayed as illustrated in FIG. 14B.

By thus generating and displaying a face display frame and a human body display frame, it is possible to provide a display that enables a user to easily and intuitively perceive the position, size, and angle of the face of an object and those of the human body of the same.

Now, a description will be given of a face display frame generated when a face is gradually oriented backward.

Even after the face has been oriented backward, which makes it impossible to detect a face, it is possible to detect a head area where the face is oriented backward, by performing the tracking process using motion vector detection, on the face detection area, as described hereinbefore.

Figure 15:
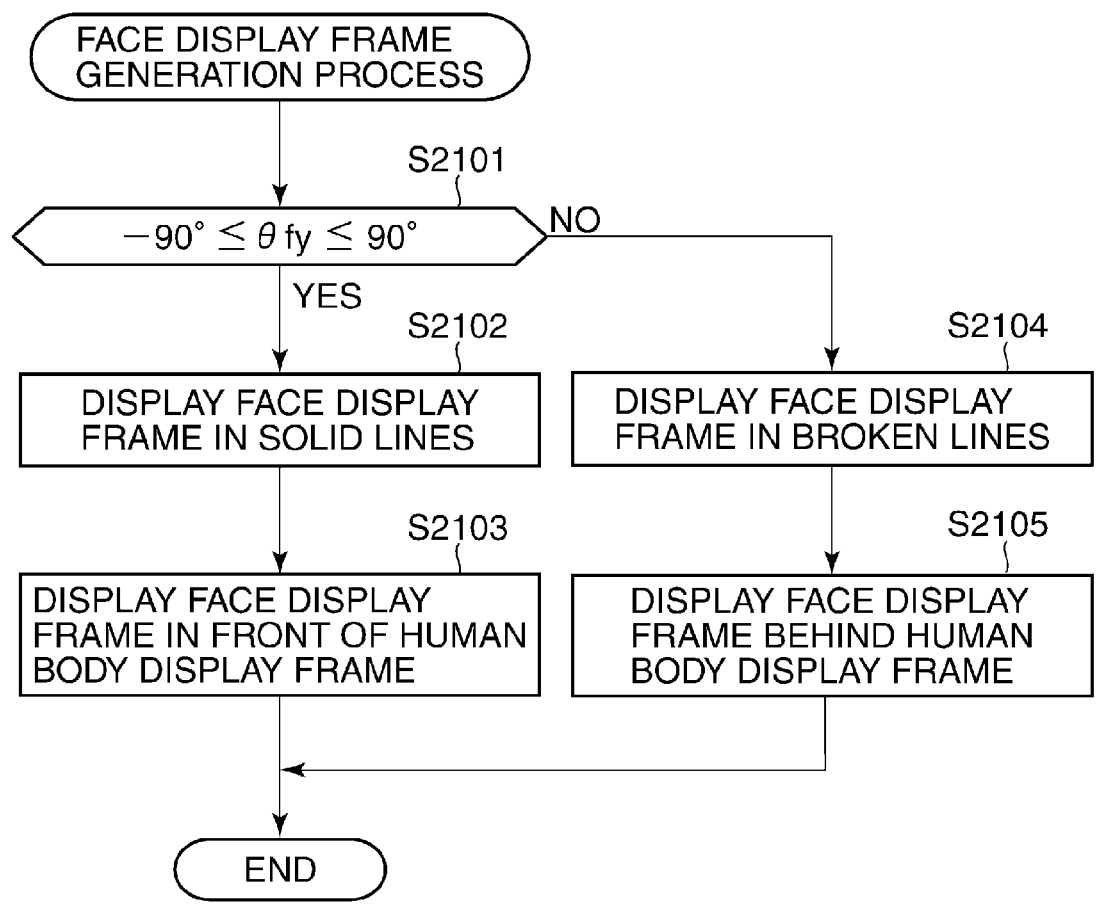
FIG. 15 is a flowchart of a face display frame generation process executed by the system controller appearing in FIG. 1, according to the second embodiment.

FIG. 15 is a flowchart of a face display frame generation process executed by the system controller 50 appearing in FIG. 1. In the present example, a description will be given of a generation process executed when a face is oriented backward.

Referring to FIGS. 1 and 15, when generation of a face display frame is started, the system controller 50 determines whether or not the yaw-direction angle θfy of a face is within a range (predetermined angle range) between −90 degrees and 90 degrees (step S2101). If the yaw-direction angle θfy is within the range between −90 degrees and 90 degrees (YES to the step S2101), the system controller 50 determines that solid lines are to be used to display the face display frame (first display form) (step S2102). Then, the system controller 50 determines that the face display frame is to be displayed on a side of a human body display frame toward the viewer and the human body display frame is not to be displayed in the area of the face display frame (step S2103), followed by terminating the present process.

On the other hand, if the yaw-direction angle θfy is not within the range between −90 degrees and 90 degrees (NO to the step S2101), the system controller 50 determines that broken lines are to be used to display the face display frame (second display form different from the first display form) (step S2104). Then, the system controller 50 determines that the face display frame is to be displayed on a side of the human body display frame remote from the viewer and the human body display frame is to be displayed in the face display frame area as well (step S2105), followed by terminating the present process.

In the above-described example, the face display frame is displayed using either the solid lines or the broken lines so as to indicate whether a face is oriented forward or backward. However, for example, whether a face is oriented forward or backward may be indicated by changing line thickness, line density (dark or light), or line color of the face display frame.

Figure 16A:
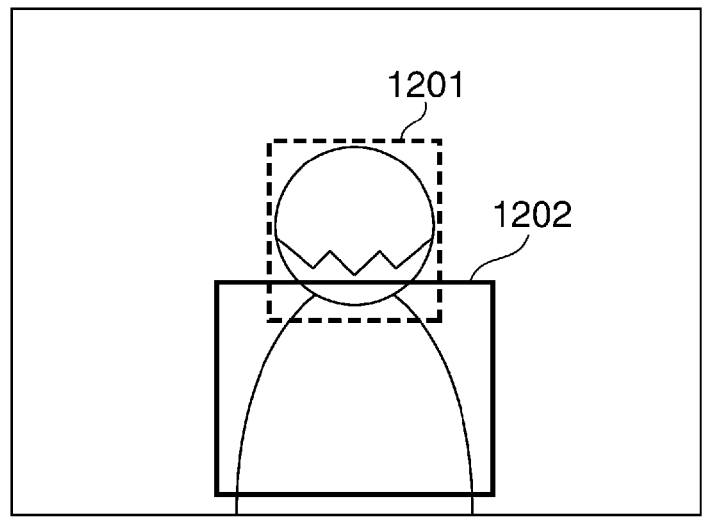
Figure 16B:
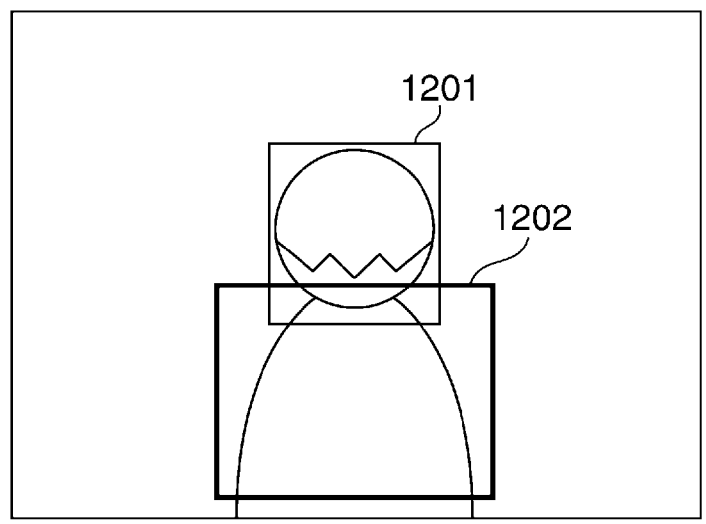
Figure 16C:
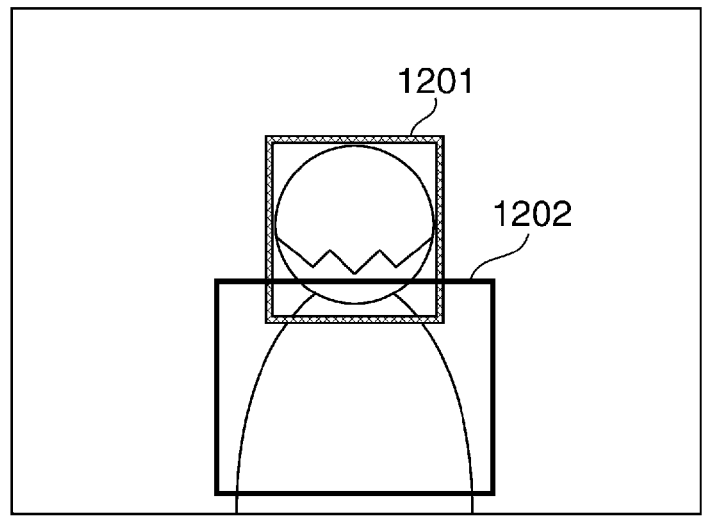

FIGS. 16A to 16C are views illustrating examples of the face display frame displayed by the process shown in FIG. 15. FIG. 16A illustrates an example of the face display frame displayed when the face is oriented backward. FIG. 16B illustrates another example of the face display frame displayed when the face is oriented backward. FIG. 16C illustrates still another example of the face display frame displayed when the face is oriented backward.

In FIG. 16A, the face display frame 1201 is indicated by broken lines when the face is oriented backward. In FIG. 16B, the face display frame 1201 is indicated by thinner lines than lines indicating the human body display frame 1202, when the face is oriented backward. Further, in FIG. 16C, the face display frame 1201 is indicated by lines different in color from lines indicating the human body display frame 1202, when the face is oriented backward. For example, the human body display frame 1202 is drawn with dark color lines, and the face display frame 1201 is drawn with light color lines. In this case, the dark color is used where the human body display frame 1202 and the face display frame 1201 intersect each other.

The display form of a face display frame displayed when a face is oriented backward is thus changed to a form different from that of a face display frame displayed when the face is oriented forward, so that even when an object image is small, a user can easily discriminate whether the face is oriented forward or backward.

As described above, according to the second embodiment, a face display frame and a human body display frame are displayed according to the position, size, and angle of a face, and the position, size, and angle of a human body, and therefore it is possible to improve the visibility of the frames so that the user can intuitively perceive the face and the human body.

Next, a description will be given of an image pickup apparatus according to a third embodiment of the present invention. The construction of a camera as the image pickup apparatus of the third embodiment is identical to that of the camera in FIG. 1, and therefore description thereof is omitted.

In the camera of the third embodiment, the system controller 50 obtains face detection information and human body detection information as described with reference to FIGS. 7 and 8. Then, in the camera of the third embodiment, a face display frame and a human body display frame are displayed based on face display information and human body display information obtained from the face detection information and the human body detection information.

Note that in the third embodiment, the face display frame is a rectangular frame enclosing a face (face area) of an object, and the human body display frame is a frame enclosing the entire object including the face area.

Now, a description will be given of the operation of the camera 100 as the image pickup apparatus of the third embodiment.

Figure 17:
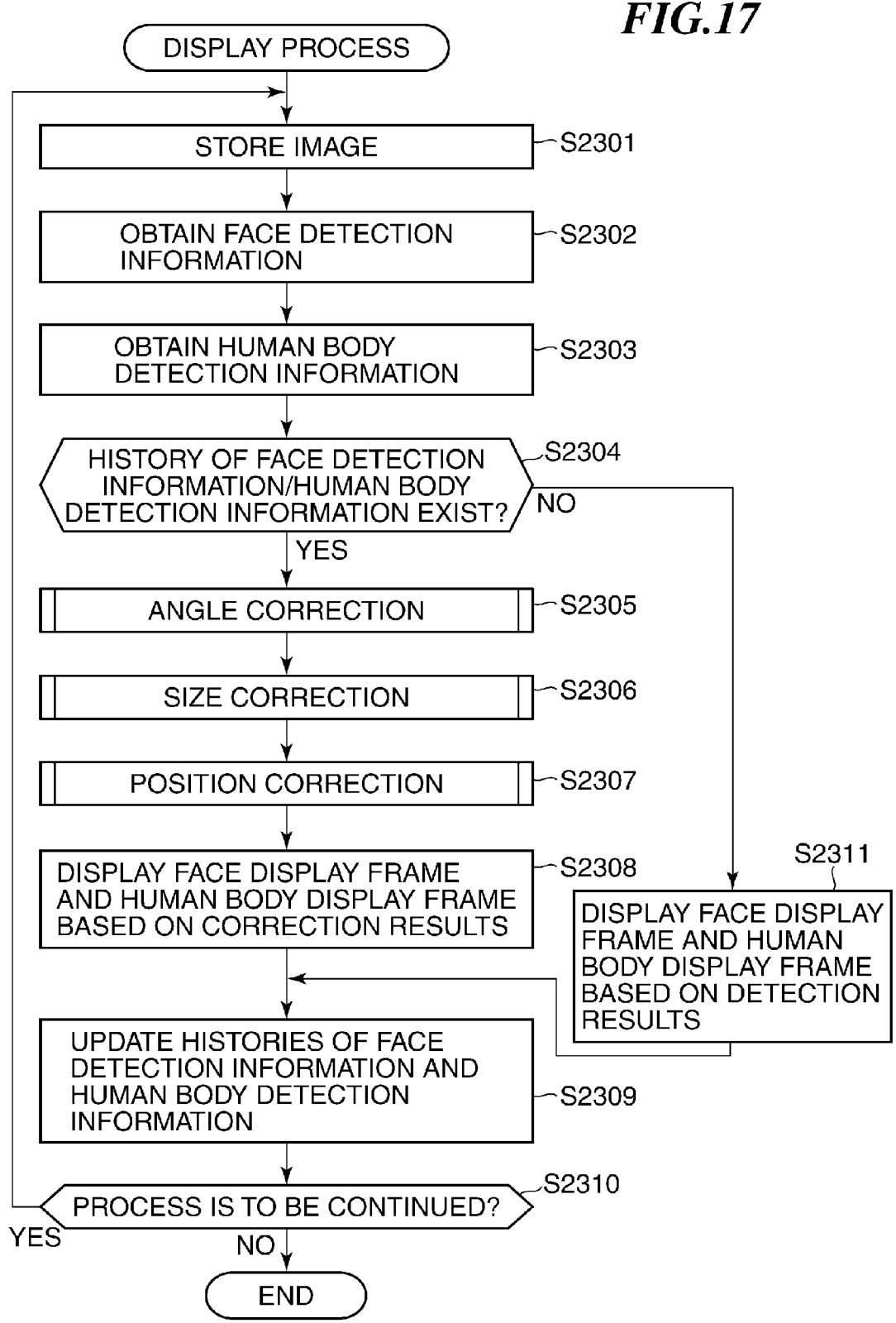
FIG. 17 is a flowchart of a display process executed by a camera implementing an image pickup apparatus according to a third embodiment of the present invention.

FIG. 17 is a flowchart of a display process executed by the camera 100.

Referring to FIGS. 1 and 17, when shooting is performed, the system controller 50 stores a digital signal input from the analog-to-digital converter 23, as image data, in the memory 32 via the memory controller 15 (step S2301). Then, the system controller 50 reads out the image data from the memory 32 and transfers the same to the face detecting section 104. The face detecting section 104 performs face detection on an object in the image data as described hereinbefore, and then delivers face detection information to the system controller 50 (step S2302). The system controller 50 stores the face detection information in the system memory (storage unit) 52.

Then, the system controller 50 reads out the image data from the memory 32 and transfers the same to the human body-detecting section 105. The human body-detecting section 105 performs human body detection on the object in the image data as described hereinbefore, and then delivers human body detection information to the system controller 50 (step S2303). The system controller 50 stores the human body detection information in the system memory 52 in association with the face detection information.

Then, the system controller 50 determines whether or not history information indicative of history related to the face detection information and the human body detection information is stored in the system memory 52 (step S2304). If the history information is stored in the system memory 52 (YES to the step S2304), the system controller 50 executes a correction process on face detection angle information and human body detection angle information using the history information, as described hereinafter (angle correction process: step S2305).

When the angle correction process is terminated, the system controller 50 executes a correction process on face detection size information and human body detection size information using the history information, as described hereinafter (size correction process: step S2306). When the size correction process is terminated, the system controller 50 executes a correction process on face detection position information and human body detection position information using the history information, as described hereinafter (position correction process: step S2307).

The system controller 50 obtains face display information and human body display information according to correction results and temporarily stores them as corrected face display information and corrected human body display information in the system memory 52.

Then, the system controller 50 reads out the corrected face display information and corrected human body display information from the system memory 52. The system controller 50 generates a face display frame and a human body display frame (object display frame) based on the corrected face display information and corrected human body display information and displays them on the display section 28 together with the image (step S2308).

Thereafter, the system controller 50 sets the face detection information obtained in the step S2302 as a record of history of face detection information (face history) and sets the human body detection information obtained in the step S2303 as a record of history of human body detection information (human body history). Then, the system controller 50 stores these records of face history and human body history as new records of the history information in the system memory 52 to thereby update the history information (step S2309).

Then, the system controller 50 determines whether or not to continue the present display process, based on an operation on the console section 70 or the power switch 72 by the user (step S2310). If it is determined that the present display process is to be continued (YES to the step S2310), the system controller 50 returns to the step S2301 to continue the process. On the other hand, if it is determined that the present display process is not to be continued (NO to the step S2310), the system controller 50 terminates the present display process.

If it is determined in the step S2304 that history information is not stored in the system memory 52 (NO to the step S2304), the system controller 50 generates a face display frame and a human body display frame according to the face detection information and the human body detection information obtained in the respective steps S2302 and S2303. Then, the system controller 50 displays the face display frame and the human body display frame together with the image (step S2311). Thereafter, the system controller 50 proceeds to the step S2309, wherein the system controller 50 stores records of the face detection information (face history) obtained in the step S2302 and the human body detection information (human body history) obtained in the step S2303 in the system memory 52, as the history information.

Figure 18:
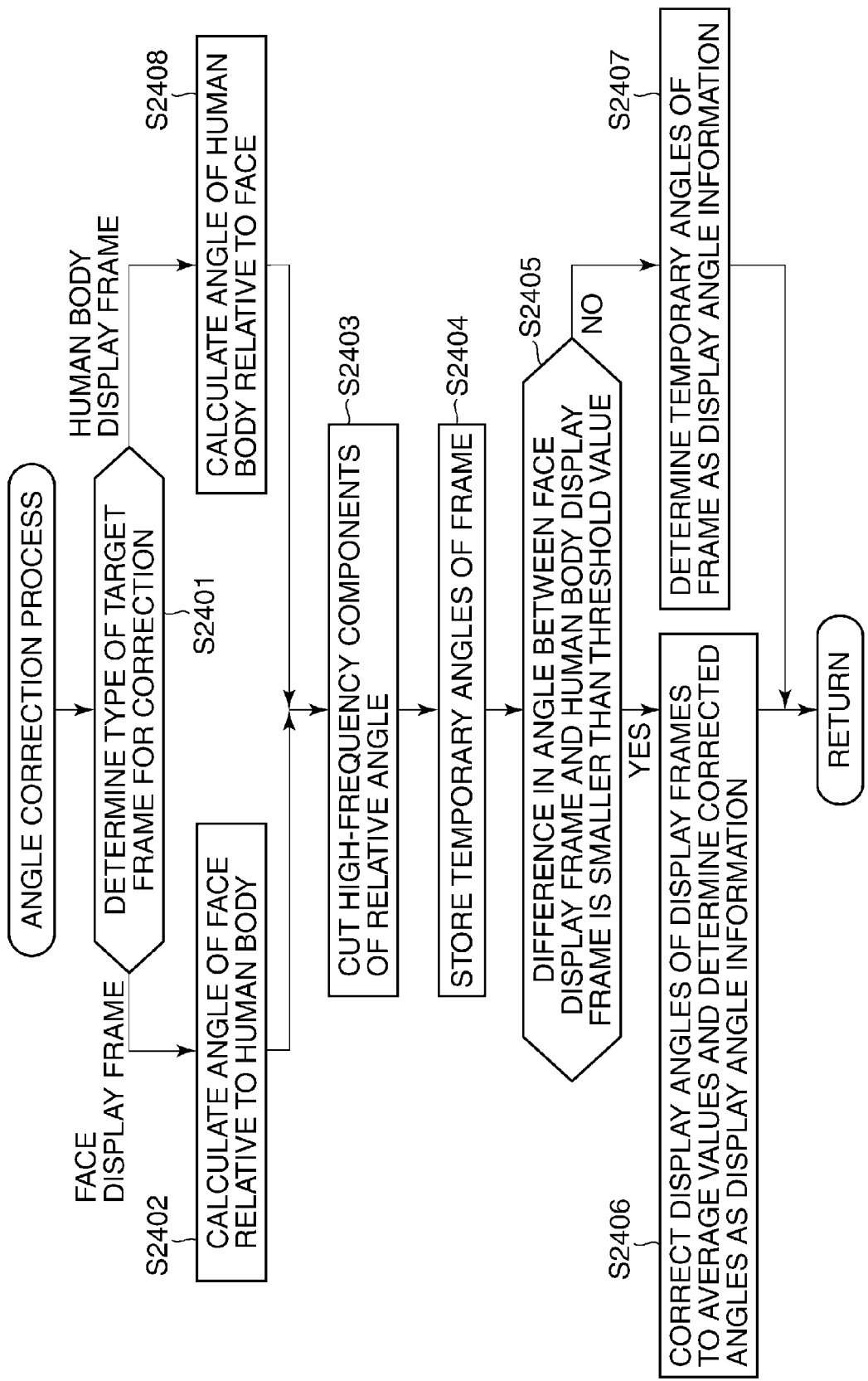
FIG. 18 is a flowchart useful in explaining in detail an angle correction process executed in a step of the display process in FIG. 17.

FIG. 18 is a flowchart useful in explaining in detail the angle correction process executed in the step S2305 of the display process in FIG. 17.

Referring to FIGS. 1 and 18, when the angle correction process is started, the system controller 50 determines a type of a frame as a target for angle correction based on the history information (step S2401). The system controller 50 refers to the history information and selects one, which is determined to be the larger in difference between the latest detection angle information and the immediately preceding detection angle information, of the face display frame and the human body display frame as a target for angle correction. If the frame selected as the angle correction target is the face display frame (face display frame in the step S2401), the system controller 50 calculates relative angles $(R\theta y_n, R\theta r_n, R\theta p_n)$ of the face (hereinafter referred to as "the face relative angles") with respect to the respective corresponding angles of the human body by the following equation (1) (step S2402):

$$(R\theta y_n, R\theta r_n, R\theta p_n) = (\theta fy_n - \theta by_n, \theta fr_n - \theta br_n, \theta fp_n - \theta bp_n) \qquad (1)$$

In the equation (1), the symbol $\theta fy_n$ represents a face yaw-direction detection angle in an n-th (n: integer≥1) frame (current frame) image data item, which is detected by the face detecting section 104 in the step S2302 in FIG. 17.

Similarly, the symbol $\theta fr_n$ represents a face roll-direction detection angle in the n-th frame (current frame) image data item, which is detected by the face detecting section 104. Further, the symbol $\theta fp_n$ represents a face pitch-direction detection angle in the n-th frame (current frame) image data item, which is detected by the face detecting section 104.

The symbol $\theta by_n$ represents a human body yaw-direction detection angle in the n-th frame (current frame) image data item, which is detected by the human body-detecting section 105 in the step S2303. Similarly, the symbol $\theta br_n$ represents a human body roll-direction detection angle in the n-th frame (current frame) image data item, which is detected by the human body-detecting section 105. Further, the symbol $\theta bp_n$ represents a human body pitch-direction detection angle in the n-th frame (current frame) image data item, which is detected by the human body-detecting section 105.

Then, the system controller 50 averages each of the face relative angles obtained in the step S2402 based on the records of the history of the associated angle to thereby remove the high-frequency components of the face relative angle (step S2403). In the n-th frame image data, the face relative angles $(Temp\theta fy_n, Temp\theta fr_n, Temp\theta fp_n)$ each having high-frequency components removed therefrom are calculated by the following equation (2):

$$(Temp\theta fy_n, Temp\theta fr_n, Temp\theta fp_n) = \qquad (2)$$
$$\left(\theta by_n + \frac{\sum_{i=1}^{n}(R\theta y_i)}{n}, \theta br_n + \frac{\sum_{i=1}^{n}(R\theta r_i)}{n}, \theta bp_n + \frac{\sum_{i=1}^{n}(R\theta p_i)}{n}\right)$$

Although in the above-described example, the high-frequency components of each face relative angle are removed by averaging values of history thereof, any other method may be employed insofar as high-frequency components are removed using the history of the face relative angle.

Then, the system controller 50 stores the face relative angles $(Temp\theta fy_n, Temp\theta fy_n, Temp\theta fy_n)$ each having high-frequency components removed therefrom in the system memory 52 as temporary angles of the face display frame (step S2404).

The system controller 50 calculates respective differences between each value of the human body detection angle information obtained in the step S2303 in FIG. 17 and an associated one of the temporary angles of the face display frame stored in the system memory 52. Then, the system controller 50 compares each difference with an associated threshold value (predetermined threshold value) stored in the nonvolatile memory 56. In this case, the system controller 50 determines whether or not the difference (relative angle) is smaller than the threshold value (angle threshold value) (step S2405).

If the difference is smaller than the threshold value (YES to the step S2405), the system controller 50 determines the face display angle information and the human body display angle information such that the display angle of the face display frame and that of the human display frame become equal to each other. In short, the face display angle information and the human body display angle information are corrected to the average value of each value of the human body detection angle information and the associated one of the temporary angles of the face display frame (step S2406). Then, the system controller 50 stores the determined face display angle information and human body display angle information as correction results in the system memory 52, followed by the process proceeding to the step S2306 in FIG. 17.

In correcting the face display angle information and the human body display angle information to the average value of each value of the human body detection angle information and the associated one of the temporary values of the face display frame, the face display angle information $(\theta Fy_n, \theta Fr_n, \theta Fp_n)$ in the n-th frame image data and the human body display angle information $(\theta By_n, \theta Br_n, \theta Bp_n)$ in the n-th frame image data are calculated by the following equations (3) and (4):

$$(\theta Fy_n, \theta Fr_n, \theta Fp_n) = \qquad (3)$$
$$\left(\frac{Temp\theta fy_n + \theta by_n}{2}, \frac{Temp\theta fr_n + \theta br_n}{2}, \frac{Temp\theta fp_n + \theta bp_n}{2}\right)$$

$$(\theta By_n, \theta Br_n, \theta Bp_n) = \qquad (4)$$
$$\left(\frac{Temp\theta fy_n + \theta by_n}{2}, \frac{Temp\theta fr_n + \theta br_n}{2}, \frac{Temp\theta fp_n + \theta bp_n}{2}\right)$$

Although in the above-described example, the face display angle information and the human body display angle information are corrected to the average value of each value of the human body detection angle information and the associated one of the temporary angles of the face display frame, any other method may be employed insofar as the face display angle information and the human body display angle information are corrected such that the display angle of the face display frame and that of the human display frame become equal to each other.

If the difference is not smaller than the associated threshold value (NO to the step S2405), the system controller 50 determines the human body detection angle information obtained in the step S2303 in FIG. 17, as the human body display angle information, and determines absolute angles corresponding to the temporary angles of the face display frame as the face display angle information (step S2407). Then, the system controller 50 stores the determined face display angle information and human body display angle information as correction results in the system memory 52, followed by the process proceeding to the step S2306 in FIG. 17.

The face display angle information ($\theta Fy_n$, $\theta Fr_n$, $\theta Fp_n$) in the n-th frame image data and the human body display angle information ($\theta By_n$, $\theta Br_n$, $\theta Bp_n$) in the n-th frame image data are calculated by the following equations (5) and (6):

$$(\theta Fy_n, \theta Fr_n, \theta Fp_n) = (\text{Temp}\theta fy_n, \text{Temp}\theta fr_n, \text{Temp}\theta fp_n) \quad (5)$$

$$(\theta By_n, \theta Br_n, \theta Bp_n) = (\theta by_n, \theta br_n, \theta bp_n) \quad (6)$$

If it is determined in the step S2401 that the type of a frame selected as the angle correction target is the human body display frame (human body display frame in the step S2401), the system controller 50 calculates relative angles of the human body with respect to respective corresponding angles of the face by the same method as described in the step S2402 (step S2408). Thereafter, the system controller 50 proceeds to the step S2403, wherein the system controller 50 removes high-frequency components.

Now, a comparison is made between changes in the respective detection angles of the face and the human body and changes in the respective display angles of the face display frame and the human body display frame, occurring with changes in the frame number of image data.

FIG. 19 is a diagram showing changes in the respective detection angles of the face and the human body and changes in the respective display angles of the face display frame and the human body display frame, occurring with changes in the frame number of image data.

In FIG. 19, a chart line (broken line) indicated by reference numeral 2501 represents changes in the face pitch-direction detection angle obtained in the step S2302 in FIG. 17. A chart line (broken line) indicated by reference numeral 2502 represents changes in the face pitch-direction display angle corrected in the step S2406 or S2407 in FIG. 18. On the other hand, a chart line (solid lines) indicated by reference numeral 2503 represents changes in the human body pitch-direction detection angle 316 obtained in the step S2303 in FIG. 17. A chart line (solid line) indicated by reference numeral 2504 represents changes in the human body pitch-direction display angle corrected in the step S2406 or S2407 in FIG. 18.

As shown in FIG. 19, the amount of change, apparent from the chart line 2502, in the face pitch-direction display angle is smaller than the amount of change, apparent from the chart line 2501, in the face pitch-direction detection angle. That is, variation in the face pitch-direction display angle to be caused by variation in the face pitch-direction detection angle is suppressed. Note that the same effect can be obtained in the face yaw-direction display angle and the face roll-direction display angle as well.

FIGS. 20A and 20B are views showing changes in the respective detection angles of the face and the human body and the respective display angles of the face display frame and the human body display frame, occurring with changes in the frame number. FIG. 20A illustrates changes in the respective detection angles of the face and the human body, and FIG. 20B illustrates changes in the respective display angles of the face display frame and human body display frame.

FIG. 20B shows changes in respect of display angle between the respective states of the face display frame and the human body display frame displayed on the display section 28 in the step S2308 in FIG. 17, occurring with changes in the frame number. From FIGS. 20A and 20B, it is understood that the respective display angles of the face display frame and the human body display frame are stable compared with the respective detection angles of the face and the human body.

Figure 21B:
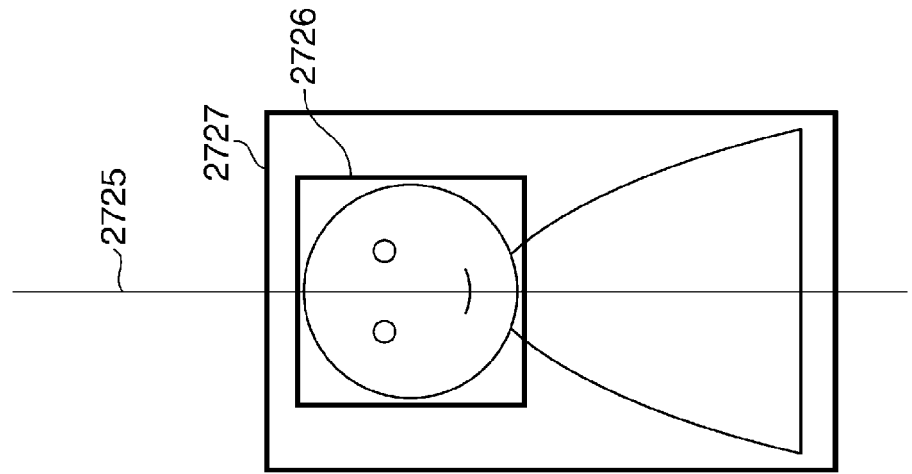
Figure 21A:
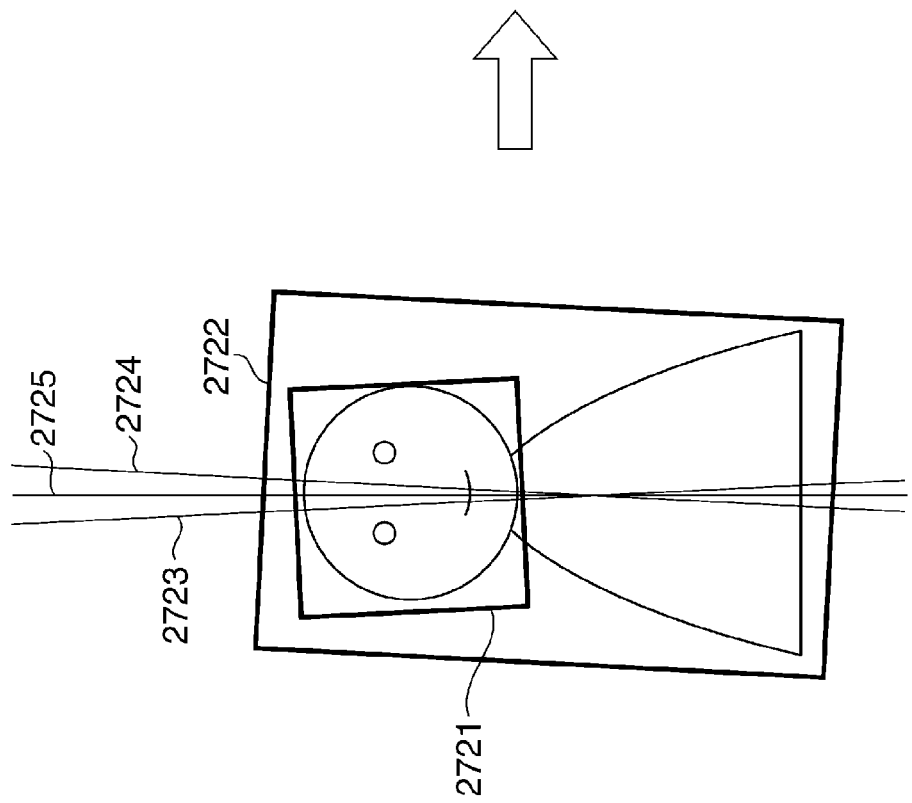

FIGS. 21A and 21B are views illustrating a face display frame and a human body display frame having respective display angles thereof corrected such that the display angle of the face display frame and that of the human body display frame become equal to each other. FIG. 21A illustrates the face display frame and the human body display frame before the angle correction, and FIG. 21B illustrates the face display frame and the human body display frame after the angle correction.

In FIG. 21A, an object is oriented generally forward, and the difference (angle difference) between a pitch-direction detection angle 2723 of the face display frame 2721 before the angle correction and a pitch-direction detection angle 2724 of the human body display frame 2722 before the angle correction is small. However, the angle difference causes a displacement in display (deviation in the frame angle) between the face display frame 2721 before the angle correction and the human body display frame 2722 before the angle correction. For this reason, the visibility of the frames for the user lowers.

When the angle difference is small, the average value of the pitch-direction detection angle 2723 of the face display frame 2721 before the angle correction and the pitch-direction detection angle 2724 of the human body display frame 2722 before the angle correction is set as a pitch-direction correction angle 2725 of the face/human body display frame. Then, with reference to the pitch-direction correction angle 2725 of the face/human body display frame, a face display frame 2726 and a human body display frame 2727 after the angle correction are arranged on a screen. As a consequence, when the angle difference is small, it is possible to prevent deviation in the frame angle, as shown in FIG. 21B, to thereby improve visibility of the frames for the user.

Figure 22:
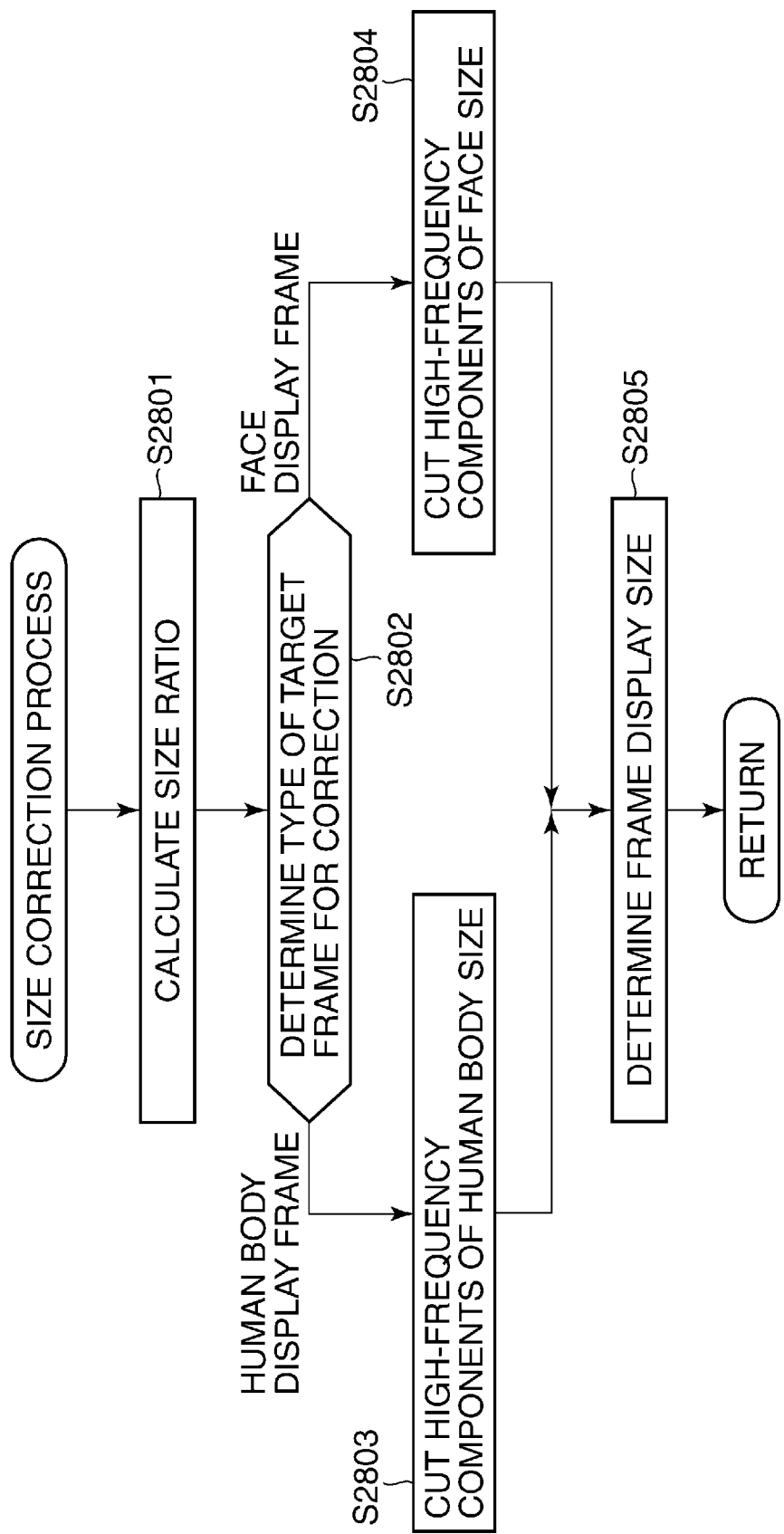
FIG. 22 is a flowchart of a size correction process executed in a step of the display process in FIG. 17.

FIG. 22 is a flowchart of the size correction process executed in the step S2306 of the display process in FIG. 17.

Referring to FIGS. 1 and 22, when the size correction process is started, the system controller 50 calculates the ratio ($PH_n$, $PV_n$) of the size of the human body to that of the face based on the following equation (7), using the face history and the human body history read from the system memory 52 (step S2801):

$$(PH_n, PV_n) = \left( \frac{Hb_n}{Hf_n}, \frac{Vb_n}{Vf_n} \right) \quad (7)$$

In the equation (7), the symbol $Hf_n$ represents the face horizontal detection size 302 in the n-th frame image data, which was obtained in the step S2302 in FIG. 17. The symbol $Vf_n$ represents the face vertical detection size 303 in the n-th frame image data.

On the other hand, the symbol $Hb_n$ represents the human body horizontal detection size 312 in the n-th frame image data, which was obtained in the step S2303 in FIG. 17. The symbol $Vb_n$ represents the human body vertical detection size 313 in the n-th frame image data.

Then, the system controller 50 discriminates the type of a frame as a target for correction based on the history information as in the angle correction process (step S2802). If the frame selected as the correction target is the human body display frame (human body display frame in the step S2802), the system controller 50 averages the ratio of the size of the human body to that of the face based on records of history thereof to thereby remove the high-frequency components associated with the size of the human body (step S2403). In the n-th frame image data, the human body sizes ($TempHb_n$, $TempVb_n$) each having high-frequency components removed therefrom are calculated by the following equation (8):

$$(TempHb_n, TempVb_n) = \left( Hf_n \times \frac{\sum_{i=1}^{n}(PH_i)}{n}, Vf_n \times \frac{\sum_{i=1}^{n}(PV_i)}{n} \right) \quad (8)$$

Although in the above-described example, the ratio of the size of the human body to that of the face is averaged between records of the history of the ratio to thereby remove the human body size-associated high-frequency components therefrom, any other method may be employed insofar as high-frequency components are removed by using records of the history of the ratio.

If the frame selected as the correction target is the face display frame (face display frame in the step S2802), the system controller 50 removes face size-associated high-frequency components by the same method as described in the step S2803 (step S2804).

Then, the system controller 50 determines the face detection size information as face display size information and determines the size of the human body having the high-frequency components removed therefrom as human body display size information (frame display size determination: step S2805). Further, the system controller 50 stores the face display size information and the human body display size information as correction results in the system memory 52, followed by the process proceeding to the step S2307 in FIG. 17.

The face display size information ($HF_n$, $VF_n$) in the n-th frame image data and the human body display size information ($HB_n$, $VB_n$) in the n-th frame image data are calculated by the following equations (9) and (10):

$$(HF_n, VF_n) = (Hf_n, Vf_n) \quad (9)$$

$$(HB_n, VB_n) = (TempHb_n, TempVb_n) \quad (10)$$

Now, a comparison is made between changes in the respective detection sizes of the face and the human body and changes in the respective display sizes of the face display frame and human body display frame, occurring with changes in the frame number of image data.

FIG. 23 is a diagram showing changes in the respective detections sizes of the face and the human body and the respective display sizes of the face display frame and the human body display frame, occurring with changes in the frame number of image data.

In FIG. 23, a chart line indicated by reference numeral 2901 represents changes in the face horizontal detection size. A chart line indicated by reference numeral 2902 represents changes in the face horizontal display size after correction. On the other hand, a chart line indicated by reference numeral 2903 represents changes in the human body horizontal detection size. A chart line indicated by reference numeral 2904 represents changes in the human body horizontal display size after correction.

As shown in FIG. 23, the amount of change, apparent from the chart line 2904, in the human body horizontal display size is smaller than the amount of change, apparent from the chart line 2903, in the human body horizontal detection size. That is, variation in the human body horizontal display size to be caused by variation in the human body horizontal detection size is suppressed. It is also possible to obtain the same advantageous effects in the human body vertical display size.

Figure 24A:
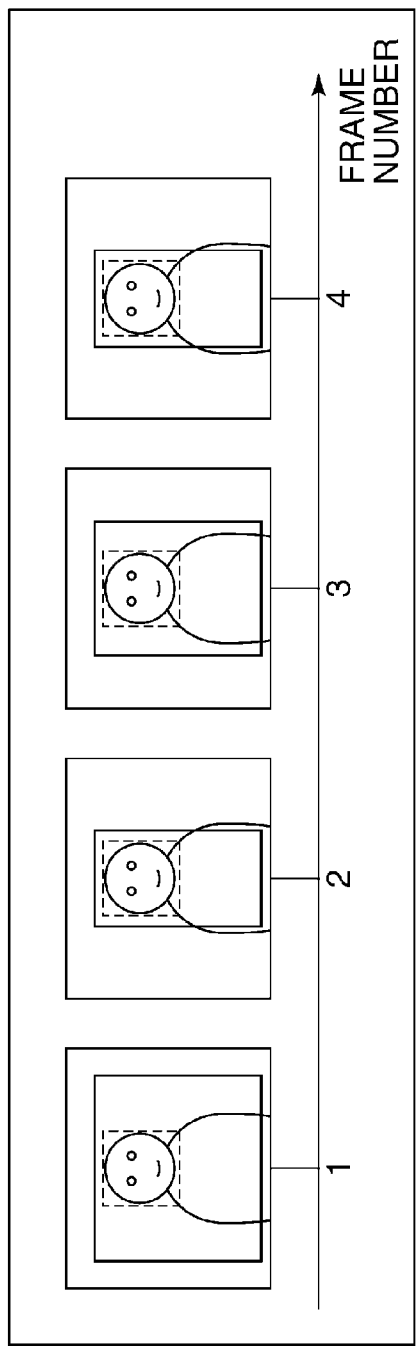
Figure 24B:
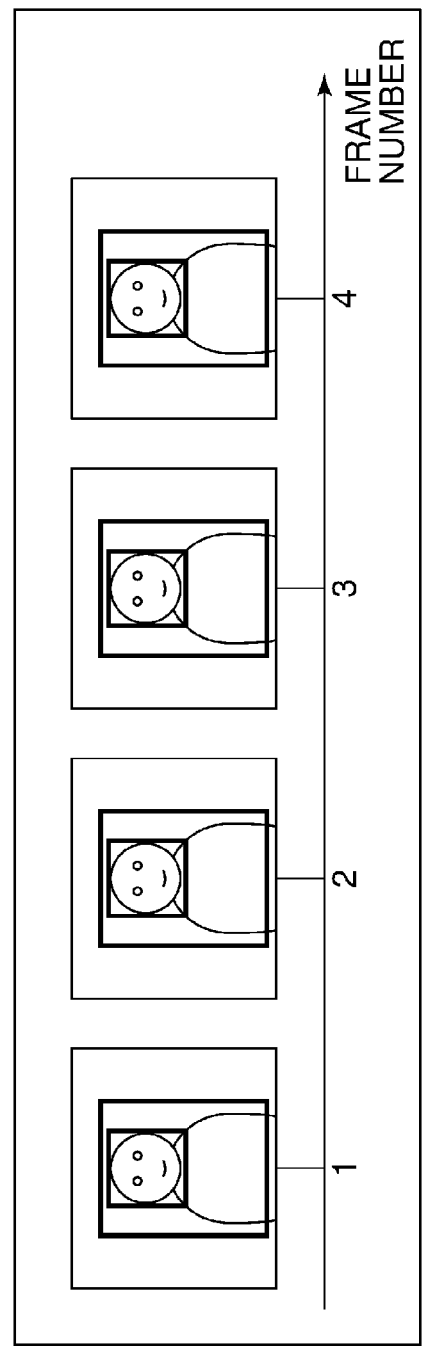

FIGS. 24A and 24B are views showing changes in the respective detection sizes of the face and the human body and the respective display sizes of the face display frame and human body display frame, occurring with changes in the frame number. FIG. 24A illustrates changes in the respective detection sizes of the face and the human body, and FIG. 24B illustrates changes in the respective display sizes of the face display frame and the human body display frame.

FIG. 24B shows changes in respect of display size between the respective states of the face display frame and the human body display frame displayed on the display section 28, occurring with changes in the frame number. From FIGS. 24A and 24B, it is understood that the respective display sizes of the face display frame and the human body display frame are stable compared with the respective detection sizes of the face and the human body.

Figure 25:
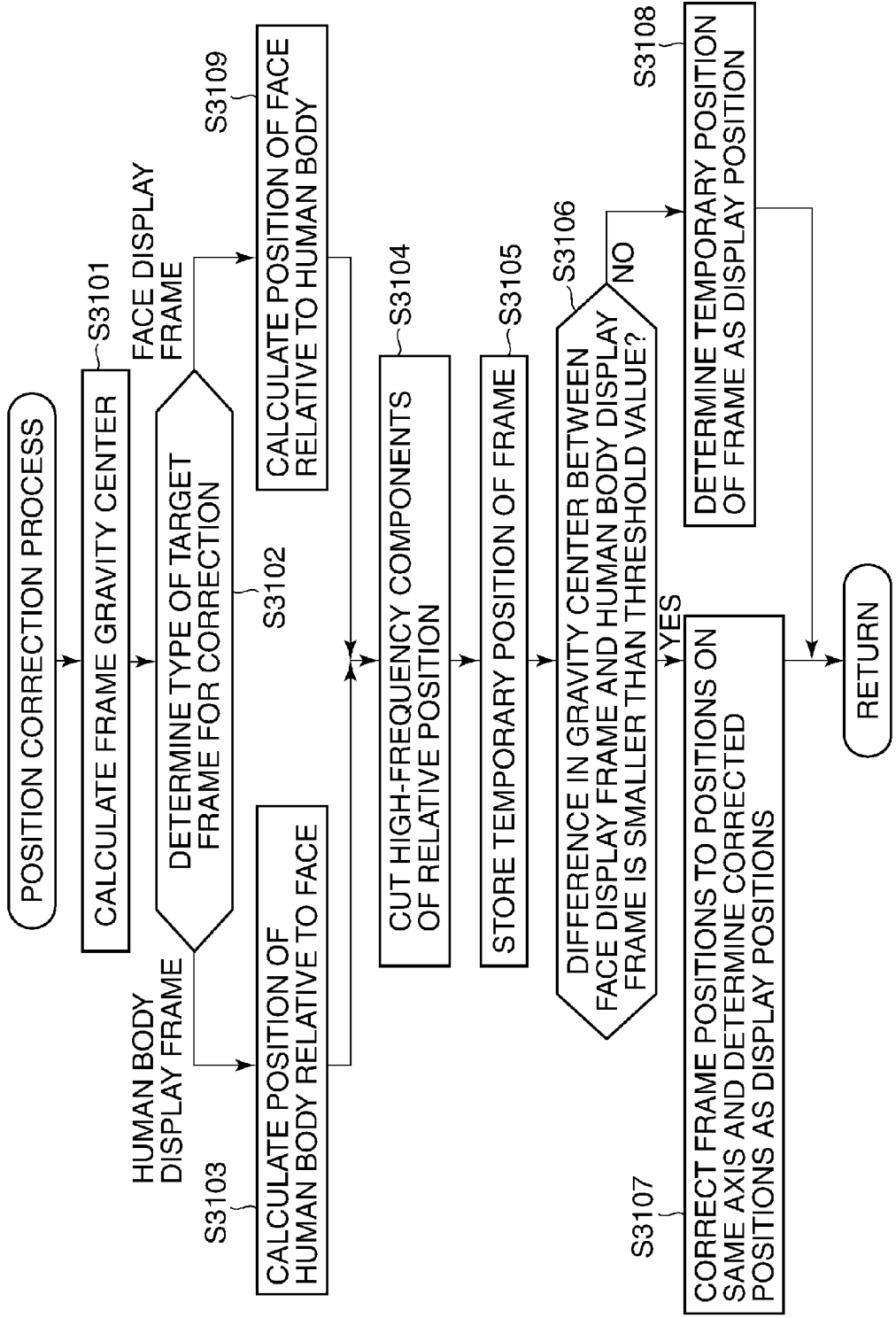
FIG. 25 is a flowchart of a position correction process executed in a step of the display process in FIG. 17.

FIG. 25 is a flowchart of the position correction process executed in the step S2307 of the display process in FIG. 17.

Referring to FIGS. 1 and 25, when the position correction process is started, the system controller 50 calculates the center of gravity of the face ($GXfn$, $GYfn$) based on the following equation (11), using the face history and the human body history read from the system memory 52 (step S3101):

$$(GXf_n, GYf_n) = \left( Xf_n + \frac{Hf_n}{2}, Yf_n + \frac{Vf_n}{2} \right) \quad (11)$$

In the equation (11), the symbol $Xf_n$ represents the face horizontal detection position in the n-th frame image data, which was obtained in the step S2302 in FIG. 17. The symbol $Yf_n$ represents the face vertical detection position in the n-th frame image data. Further, the symbol $Hf_n$ represents the face horizontal detection size in the n-th frame image data, and the symbol $Vf_n$ represents the face vertical detection size in the n-th frame image data.

Similarly, the center of gravity of the human body ($GXb_n$, $GYb_n$) is calculated based on the following equation (12):

$$(GXb_n, Gyb_n) = \left( Xb_n + \frac{Hb_n}{2}, Yb_n + \frac{Vb_n}{2} \right) \quad (12)$$

In the equation (12), the symbol $Xb_n$ represents the human body horizontal detection position in the n-th frame image data, which was obtained in the step S2303 in FIG. 17. The symbol $Yb_n$ represents the human body vertical detection position in the n-th frame image data. Further, the symbol $Hb_n$ represents the human body horizontal detection size in the n-th frame image data, and the symbol $Vb_n$ represents the human body vertical detection size in the n-th frame image data.

Then, the system controller 50 discriminates the type of a frame as a target for correction based on the history information as in the angle correction process (step S3102). If the frame selected as the correction target is the human body display frame (human body display frame in the step S3102), the system controller 50 calculates a human body relative position ($RX_n$, $RY_n$) as a position of the human body relative to the position of the face, based on the following equation (13), using the face gravity center ($GXf_n$, $GYf_n$) and the human body gravity center ($GXb_n$, $GYb_n$) obtained in the step S3101 (step S3103).

$$(RX_n, RY_n) = (GXb_n - GXf_n, GYb_n - GYf_n) \quad (13)$$

Then, the system controller 50 calculates the average of the human body relative position between records of history thereof to thereby remove high-frequency components from the human body relative position (step S3104). The human body relative position ($TempXb_n$, $TempYb_n$) in the n-th frame image data after removal of the high-frequency components is calculated by the following equation (14):

$$(TempXb_n, TempYb_n) = \left( GXf_u + \frac{\sum_{i=1}^{n}(RX_i)}{n}, GYf_u + \frac{\sum_{i=1}^{n}(RY_i)}{n} \right) \quad (14)$$

Although in the above-described example, the average of the human body relative position between the histories is used to remove the high-frequency components from the human body relative position, any other method may be employed insofar as high-frequency components are removed by using records of the history of the human body relative position.

Then, the system controller 50 stores the human body relative position ($TempXb_n$, $TempYb_n$) after removal of the high-frequency components in the system memory 52, as a temporary position of the human body display frame (step S3105).

Then, the system controller 50 calculates a difference between the center of gravity of the face and the temporary position of the human body display frame stored in the memory 52, and compares the difference with a threshold value (predetermined threshold value) stored in the nonvolatile memory 56. More specifically, the system controller 50 determines whether or not the difference is smaller than the threshold value (step S3106).

If the difference is smaller than the threshold value (YES to the step S3106), the system controller 50 determines face display position information and human body display position information such that the display position of the face display frame and that of the human body display frame are arranged on the same axis (step S3107). Then, the system controller 50 stores the face display position information and the human body display position information as correction results in the system memory 52, followed by the process proceeding to the step S2308 in FIG. 17.

In the case of performing the correction using the average value of the center of gravity of the face and the temporary position of the human body display frame such that the display position of the face display frame and that of the human body display frame are arranged on the same axis with respect to the horizontal direction, the face display position information ($XF_n$, $YF_n$) in the n-th frame image data and the human body display position information ($XB_n$, $YB_n$) in the n-th frame image data are calculated by the following equations (15) and (16):

$$(XF_n, YF_n) = \left( \frac{GXf_n + TempXb_n}{2} - \frac{Hf_n}{2}, Yf_n \right) \quad (15)$$

$$(XB_n, YB_n) = \left( \frac{GXf_n + TempXb_n}{2} - \frac{Hb_n}{2}, TempYb_n - \frac{Vb_n}{2} \right) \quad (16)$$

Although in the above-described example, the correction is performed using the average value of the center of gravity of the face and the temporary position of the human body display frame such that the display position of the face display frame and that of the human body display frame are arranged on the same axis with respect to the horizontal direction, any other method may be employed insofar as the face display frame and the human body display frame can be arranged on the same axis.

If the difference is not smaller than the threshold value (NO to the step S3106), the system controller 50 determines the face detection position information obtained in the step S2302 in FIG. 17 as face display position information and determines an absolute position corresponding to the temporary position of the human body display frame, which is stored in the system memory 52, as human body display position information (step S3108). Then, the system controller 50 stores the face display position information and the human body display position information as correction results in the system memory 52, followed by the process proceeding to the step S2308 in FIG. 17.

The face display position information ($XF_n$, $YF_n$) in the n-th frame image data and the human body display position information ($XB_n$, $YB_n$) in the n-th frame image data are calculated by the following equations (17) and (18):

$$(XF_n, YF_n) = (Xf_n, Yf_n) \quad (17)$$

$$(XB_n, YB_n) = \left( TempXb_n - \frac{Hb_n}{2}, TempYB_n - \frac{Vb_n}{2} \right) \quad (18)$$

If it is determined in the step S3102 that the type of frame selected as the correction target is the face display frame (face display frame in the step S3102), the system controller 50 calculates a face relative position as a position of the face relative to the position of the human body by the same method as described in the step S3103 (step S3109). Thereafter, the system controller 50 proceeds to the step S3105, wherein the system controller 50 removes high-frequency components.

Now, a comparison is made between changes in the respective detection positions of the face and the human body and changes in the respective display positions of the face display frame and human body display frame, occurring with changes in the frame number of image data.

Figure 26:
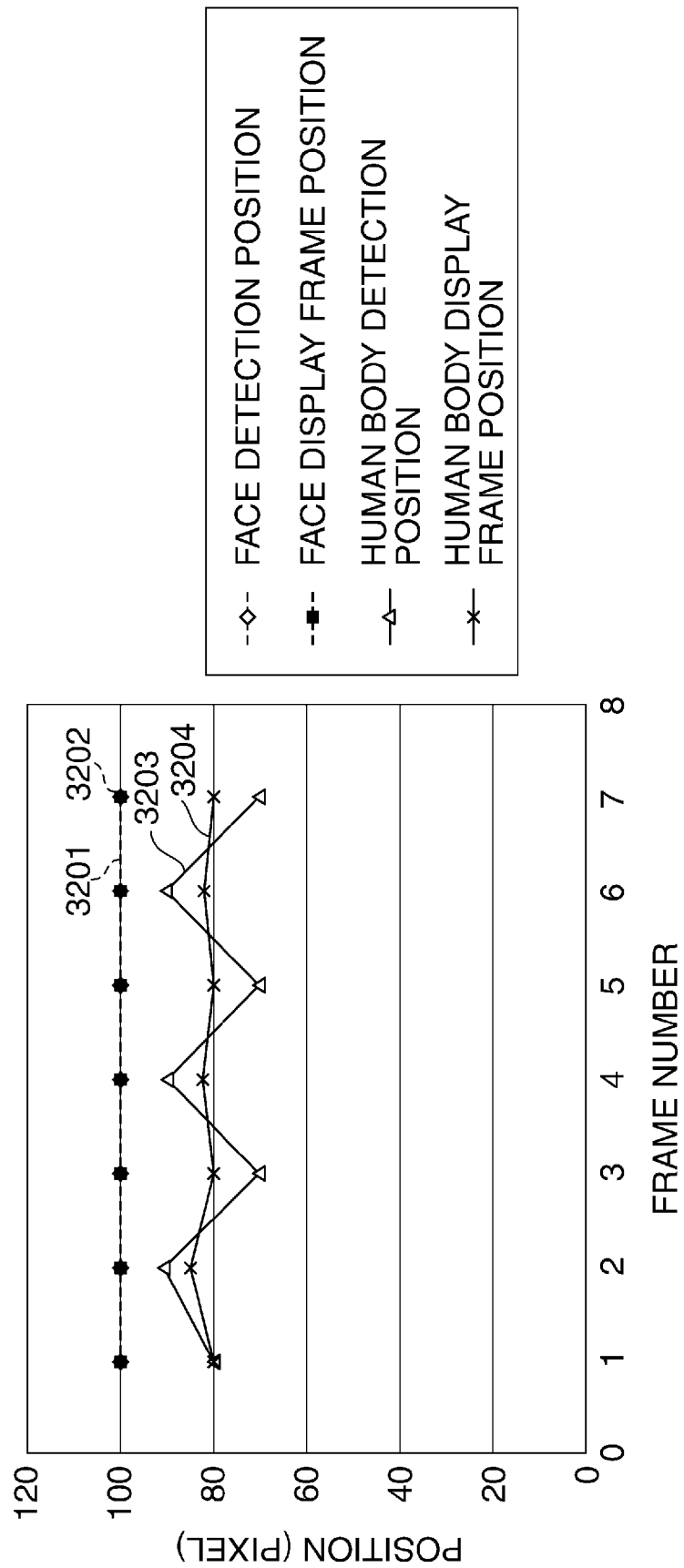
FIG. 26 is a diagram showing changes in the respective detection positions of the face and the human body and changes in the respective display positions of the face display frame and the human body display frame, occurring with changes in the frame number of image data.

FIG. 26 is a diagram showing changes in the respective detection positions of the face and the human body and changes in the respective display positions of the face display frame and human body display frame, occurring with changes in the frame number of image data.

In FIG. 26, a chart line indicated by reference numeral 3201 represents changes in the face horizontal detection position. A chart line indicated by reference numeral 3202 represents changes in the face horizontal display position after correction. On the other hand, a chart line indicated by reference numeral 3203 represents changes in the human body horizontal detection position. A chart line indicated by reference numeral 3204 represents changes in the human body horizontal display position after correction.

As shown in FIG. 26, the amount of change amount, apparent from the chart line 3204, of the human body horizontal display position is smaller than the change amount, apparent from the chart line 3203, of the human body horizontal detection position. That is, variation in the human body horizontal display position to be caused by variation in the human body horizontal detection position is suppressed. It is possible to obtain the same advantageous effects can be obtained in the human body vertical display position.

Figure 27A:
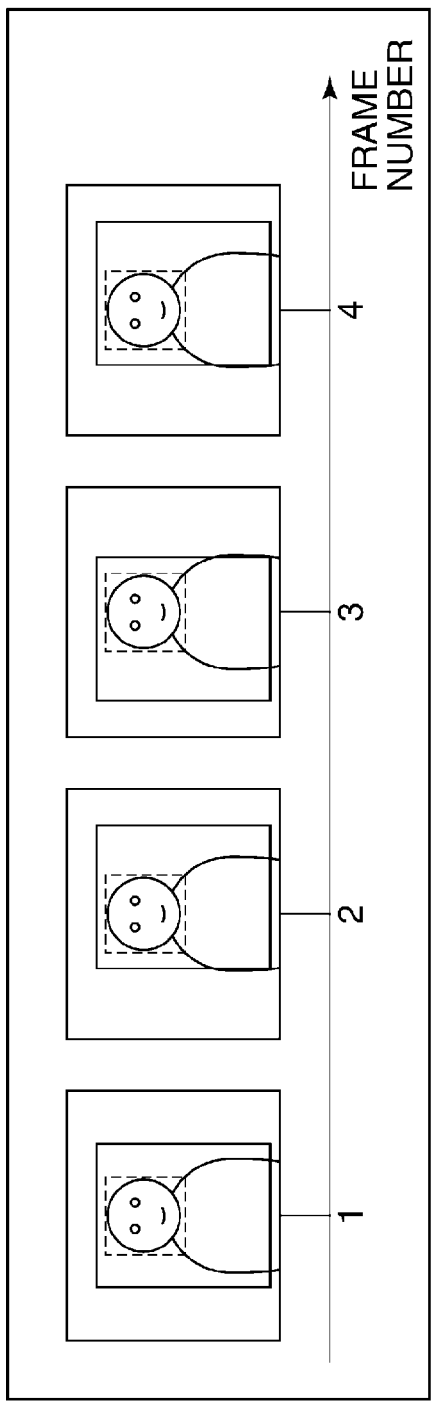
Figure 27B:
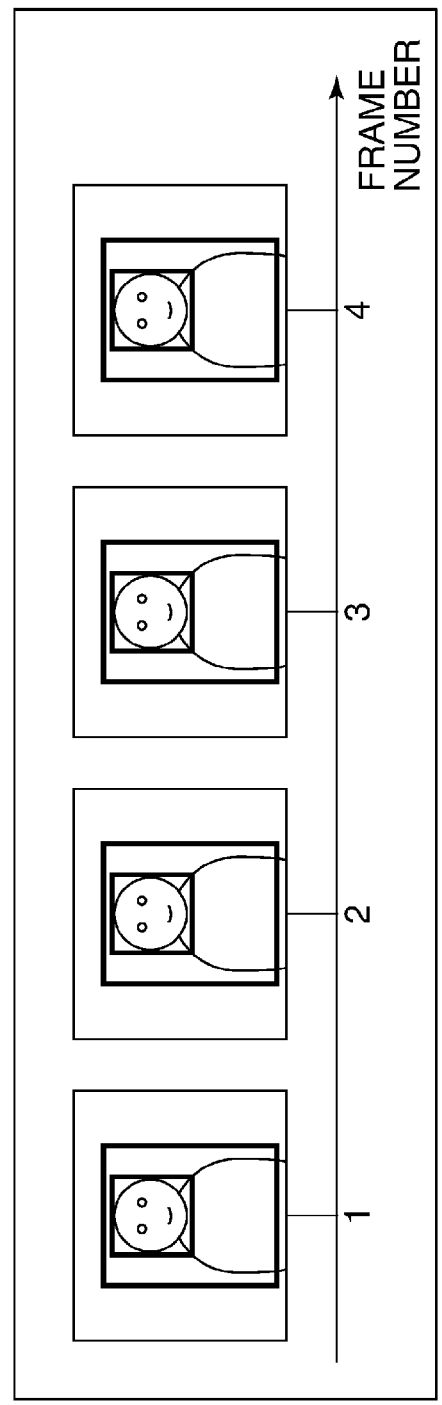

FIGS. 27A and 27B are views illustrating changes in the respective display positions of the face and the human body and the respective display positions of the face display frame and the human body display frame, occurring with changes in the frame number. FIG. 27A illustrates changes in the respective detection positions of the face and the human body, and FIG. 27B illustrates changes in the respective display positions of the face display frame and the human body display frame.

FIG. 27B shows changes in respect of display position between the respective states of the face display frame and the human body display frame displayed on the display section 28, occurring with changes in the frame number. From FIGS. 27A and 27B, it is understood that the respective display positions of the face display frame and the human body display frame are stable compared with the respective detection positions of the face and the human body.

FIGS. 28A and 28B are views illustrating the face display frame and the human body display frame in a case where position correction is performed such that the display position of the face display frame and that of the human body display frame are arranged on the same axis. FIG. 28A illustrates the face display frame and the human body display frame before the position correction, and FIG. 28B illustrates the face display frame and the human body display frame after the position correction.

In FIG. 28A, an object is generally in an erect posture, and the difference (difference in position) between a horizontal position 3423 of the gravity center of the face display frame 3421 before the position correction and a horizontal position 3424 of the gravity center of the human body display frame 3422 before the position correction is small. However, the difference in position causes a displacement in display (frame angle displacement) between the face display frame 3421 before the position correction and the human body display frame 3422 before the position correction. For this reason, the visibility of the frame for the user lowers.

When the position difference is small, the average value of the horizontal position 3423 of the gravity center of the face display frame 3421 before the position correction and the horizontal position 3424 of the gravity center of the human body display frame 3422 before the position correction is set as a corrected position 3425 of the gravity center of the face/human body display frame. Then, with reference to the corrected position 3425 of the gravity center of the face display frame/human body display frame, a face display frame 3426 and a human body display frame 3427 after the position correction are arranged on the screen. As a consequence, when the position difference is small, it is possible to prevent a frame position displacement as shown in FIG. 28B, to thereby improve the visibility of the frames for the user.

As described above, according to the third embodiment, a face display frame and a human body display frame are generated based on the history of face feature values corresponding to a predetermined number of frames and the history of human body feature values corresponding to the predetermined number of frames, so that even when the feature values change with changes in the frame number, the face display frame and the human body display frame can be displayed stably.

Although in the third embodiment, the description has been given based on the example in which the angle correction process, the size correction process, and the position correction process are performed on the face display frame and the human body display frame, it is possible to improve the visibility of the display frames by performing at least one of the processes.

Next, a description will be given of an image pickup apparatus according to a fourth embodiment of the present invention. The construction of a camera as the image pickup apparatus of the fourth embodiment is identical to that of the camera in FIG. 1, and therefore description thereof is omitted.

In the camera of the fourth embodiment, the system controller 50 obtains face display information and human body display information from face detection information and human body detection information, respectively, as described with reference to FIGS. 7 and 8, and displays a face display frame and a human body display frame based on the face display information and the human body display information.

Note that in the fourth embodiment, the face display frame is a rectangular frame enclosing a face (face area) of an object, and the human body display frame is a frame enclosing the entire object including the face area.

A description will be given of a frame display determination process executed by the camera 100 as the image pickup apparatus of the fourth embodiment.

Figure 29:
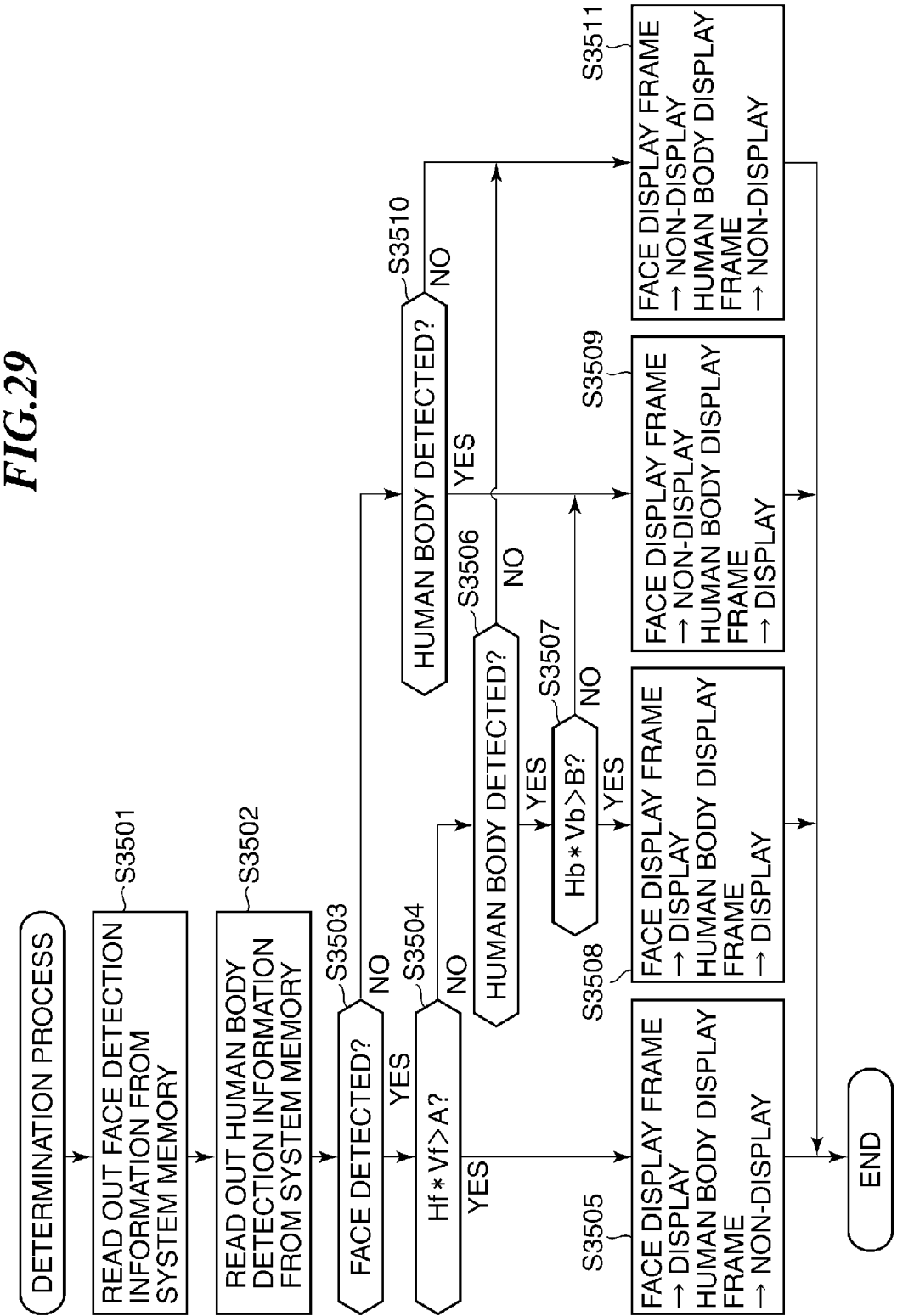
FIG. 29 is a flowchart of a frame display determination process executed by a camera implementing an image pickup apparatus according to a fourth embodiment of the present invention.

FIG. 29 is a flowchart of the frame display determination process executed by the camera 100.

Referring to FIGS. 1 and 29, when the frame display determination process is started, the system controller 50 reads the face detection information from the system memory 52 (step S3501). Then, the system controller 50 reads the human body detection information from the system memory 52 (step S3502).

The system controller 50 determines whether or not a face has been detected by the face detecting section 104, i.e. whether or not the face detection information read from the system memory 52 is valid (step S3503). In performing this determination, for example, when the face of the object cannot be detected by the face detecting section 104, the face detection information Hf and the face detection information Vf appearing in FIG. 8 are set to "0" (predetermined value). Therefore, when the face detection information Hf and the face detection information Vf are equal to "0", the system controller 50 determines that no face has been detected.

Alternatively, after executing detection of the face of the object, the system controller 50 may write in the system memory 52 a flag signal indicative of whether or not a face could be detected in addition to face detection information, and determine according to the flag signal whether or not the face of the object has been detected.

If the face of the object has been detected (YES to the step S3503), the system controller 50 make a comparison in magnitude between the product of the horizontal direction size Hf and the vertical direction size Vf contained in the face detection information and a predetermined threshold value A (first area threshold value) stored in advance in the nonvolatile memory 56. That is, the system controller 50 determines whether or not Hf×Vf>threshold value A (step S3504).

If Hf×Vf>threshold value A (YES to the step S3504), the system controller 50 determines that the face display frame is to be displayed on the display section 28 but the human body display frame is not (step S3505), followed by terminating the present process.

If Hf×Vf≤threshold value A, i.e. if the product of the horizontal direction size Hf and the vertical direction size Vf is not larger than the first threshold value (NO to the step S3504), the system controller 50 determines whether or not a body has been detected by the human body-detecting section 105 (step S3506), i.e. whether or not the human body detection information read from the system memory 52 is valid.

When this determination is performed, for example, if the human body cannot be detected, the human body-detecting section 105 sets the human body detection information Hb and the human body detection information Vb appearing in FIG. 8 to "0" (predetermined value). Therefore, when the human body detection information Hb and the human body detection information Vb are equal to "0", the system controller 50 determines that no human body has been detected.

Alternatively, the human body-detecting section 105 may write in the system memory 52 a flag signal indicative of whether or not a human body could be detected in addition to human body detection information, and then the system controller 50 may determine according to the flag information whether or not the human body of the object has been detected.

If the human body has been detected (YES to the step S3506), the system controller 50 makes a comparison in magnitude between the product of the horizontal direction size Hb and the vertical direction size Vb contained in the human body information and a predetermined threshold value B (second area threshold value) stored in advance in the nonvolatile memory 56. That is, the system controller 50 determines whether or not Hb×Vb>threshold value B (step S3507).

If Hb×Vb>threshold value B (YES to the step S3507), the system controller 50 determines that both the face display frame and the human body display frame are to be displayed on the display section 28 (step S3508), followed by terminating the present process.

On the other hand, if Hb×Vb threshold value B (NO to the step S3507), the system controller 50 determines that the face display frame is not to be displayed on the display section 28, but the human body display frame is (step S3509), followed by terminating the present process.

If it is determined in the step S3503 that the face of the object has not been detected (NO to the step S3503), the system controller 50 determines, as in the step S3506, whether or not a human body has been detected by the human body-detecting section 105, i.e. whether or not the human body detection information read from the system memory 52 is valid (step S3510).

If a human body has been detected (YES to the step S3510), the system controller 50 proceeds to the step S3509, wherein the system controller 50 determines that the face display frame is not to be displayed on the display section 28, but the human body display frame is. Then, the system controller 50 terminates the present process.

On the other hand, if no human body has been detected (NO to the step S3510), the system controller 50 determines that neither the face display frame nor the human body display frame is to be displayed (step S3511), followed by terminating the present process. Note that if it is determined in the step S3506 that no human body has been detected (NO to the step S3506), the system controller 50 proceeds to the step S3511.

Although in the above-described example, each of the size of the face display frame and that of the human body display frame is compared with the associated threshold value, and it is determined based on the comparison results that each of the face display frame and the human body display frame is to be displayed, other information than the size of the face display frame and that of the human body display frame may be used as a reference for determining whether or not to display the face display frame and/or the human body display frame.

Further, for example, when it is determined in the step S3506 in FIG. 29 that no human body has been detected, since the face has been detected, the system controller 50 may determine that only the face display frame is to be displayed. Furthermore, when it is determined in the step S3510 in FIG. 29 that a human body has been detected, a method may be employed in which the size of the human body display frame is compared with the threshold value B and then it is determined based on the comparison result whether or not the human body display frame is to be displayed.

FIG. 30 is a diagram showing display frame display patterns each determined by the frame display determination process in FIG. 29 according to the relationship between the face detection information and the human body detection information, and the respective associated threshold values.

Referring to FIG. 30, when the size (Hf×Vf) of a face display frame is larger than the threshold value A, only the face display frame is displayed on the display section 28 irrespective of the size of a human body display frame. On the other hand, in a case where Hf×Vf≤threshold value A holds, when the size (Hb×Vb) of the human body display frame is larger than the threshold value B, both the face display frame and the human body display frame are displayed on the display section 28.

When Hf×Vf≤threshold value A and Hb×Vb≤threshold value B, only the human body display frame is displayed on the display section 28. Further, when Hf×Vf≤threshold value A and no human body can be detected, neither the face display frame nor the human body display frame is displayed. On the other hand, in a case where no face can be detected, when a human body is detected, the human body display frame is displayed irrespective of the size of the human body display frame. When neither a face nor a human body can be detected, neither the face display frame nor the human body display frame is displayed.

Figure 31:
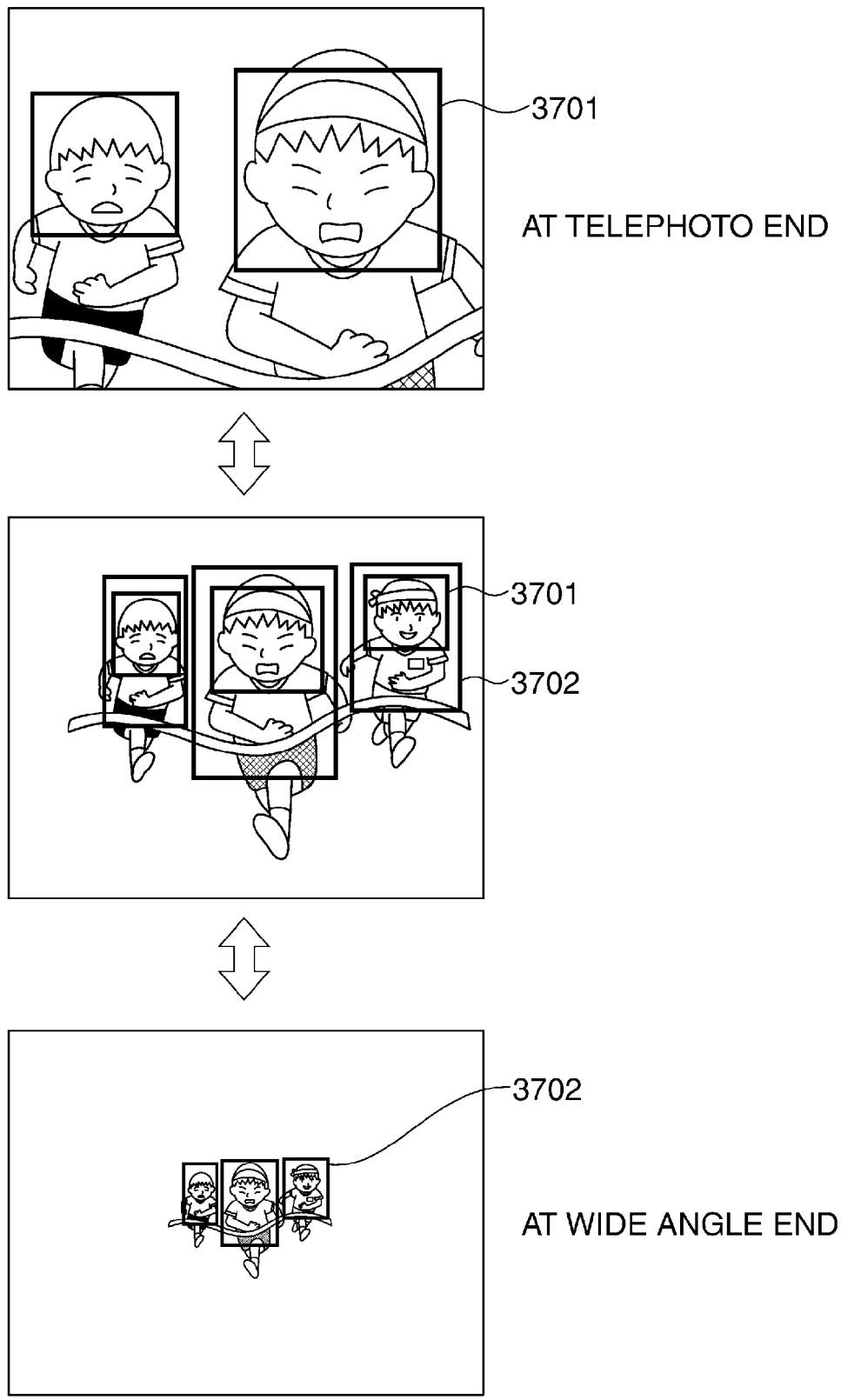
FIG. 31 is a view useful in explaining how the face display frame and the human body display frame are displayed on the display section by the frame display determination process in FIG. 29.

FIG. 31 is a view useful in explaining how a face display frame 3701 and a human body display frame 3702 are displayed on the display section 28 by the frame display determination process in FIG. 29.

Referring to FIG. 31, when the zoom is at the telephoto end, only the face display frame 3701 is displayed on the display section 28, and when the zoom shifts from the telephoto end to the wide angle end, both the face display frame 3701 and the human body display frame 3702 are displayed on the display section 28. Then, when the zoom shifts to the wide angle end, only the human body display frame 3702 is displayed on the display section 28.

Now, a description will be given of hysteresis characteristics related to display and non-display determined by the frame display determination process in FIG. 29.

Figure 32A:
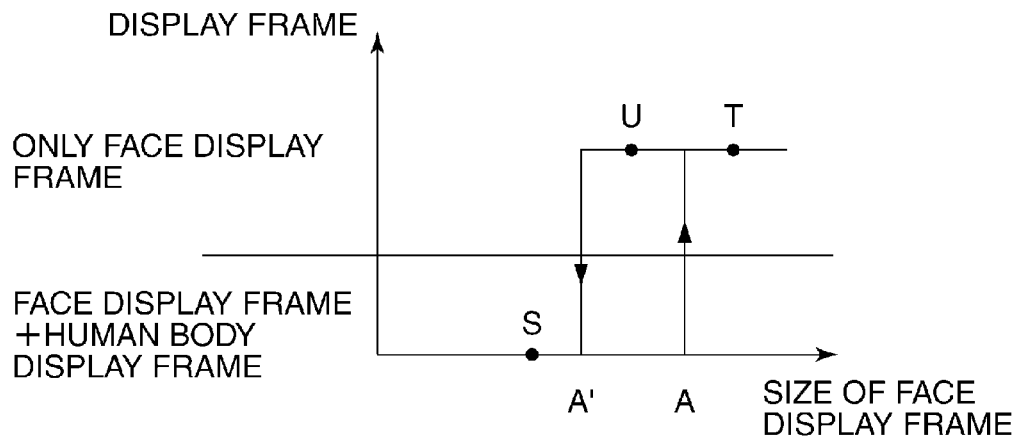
Figure 32B:
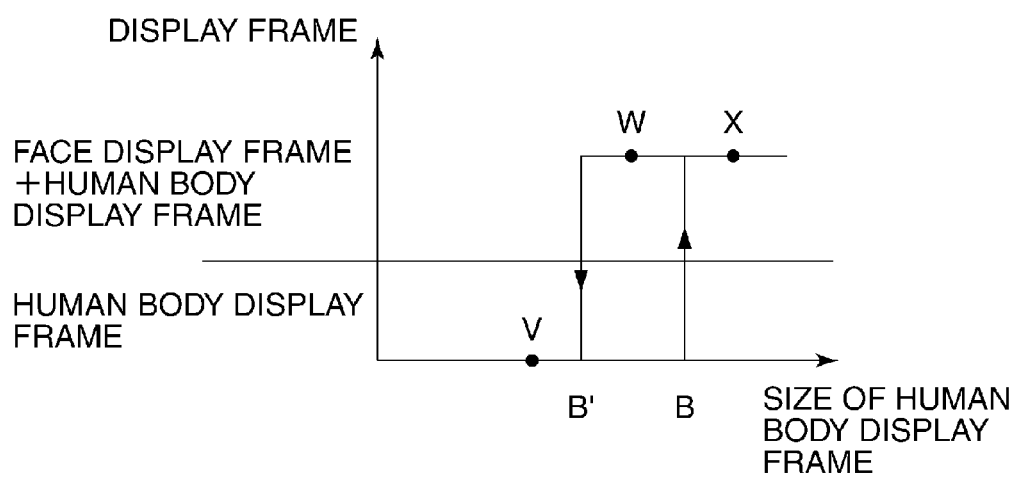

FIGS. 32A and 32B are diagrams useful in explaining the hysteresis characteristics related to display and non-display determined by the frame display determination process in FIG. 29. FIG. 32A shows a determination condition for determining display or non-display of each display frame based on the size of the face display frame, and FIG. 32B shows a determination condition for determining display or non-display of each display frame based on the size of the human body display frame.

As described hereinbefore, switching between display and non-display of a face display frame and a human body display frame is determined based on a comparison between the sizes of the face display frame and the human body display frame and the respective associated threshold values A and B. For example, when the size of the face display frame and that of the human body display frame fluctuate in the vicinity of the threshold values in a scene where a human figure as an object is moving vigorously e.g. in a sport, if a display frame determined based on one of the above-mentioned conditions is directly displayed on the display section 28, the display frame frequently and repeatedly flickers, which annoys the user.

To solve the above problem, two threshold values A and A' (A>A') are stored in advance in the nonvolatile memory 56, for example. In FIG. 32A, the horizontal axis represents the size of the face display frame, and the vertical axis represents the display frame(s) to be displayed on the display section 28. A point, associated with the size of the face display frame, for determining whether or not to display the face display frame and/or the human body display frame changes as the size of the face display frame indicated on the horizontal axis changes, as indicated by bold lines, and the display frame(s) indicated on the vertical axis corresponding to the point is/are determined to be displayed.

For example, it is assumed that the size of the face display frame at a certain time corresponds to a point S. At this time, the face display frame and the human body display frame are displayed on the display section 28. When the size of the face display frame is gradually increased to be larger than the threshold value A (to reach e.g. a point T), only the face display frame is displayed on the display section 28.

When the size of the face display frame is being changed around the threshold value A (i.e. repeatedly changed between the point T and a point U), only the face display frame is consecutively displayed on the display section 28. Further, when the size of the face display frame becomes smaller than the threshold value A' at a certain time (to reach e.g. the point S), the face display frame and the human body display frame are both displayed on the display section 28.

Similarly, two threshold values B and B' (B>B') are stored in advance in the nonvolatile memory 56. In FIG. 32B, the horizontal axis represents the size of the human body display frame, and the vertical axis represents the display frame(s) to be displayed on the display section 28. A point, associated with the size of the human body display frame, for determining whether or not to display the face display frame and/or the human body display frame changes as the size of the human body display frame indicated on the horizontal axis changes, as indicated by bold lines, and the display frame(s) indicated on the vertical axis corresponding to the point is/are determined to be displayed.

For example, it is assumed that the size of the human body display frame at a certain time corresponds to a point V. At this time, only the human body display frame is displayed on the display section 28. When the size of the face display frame is gradually increased to be larger than the threshold value B (to reach e.g. a point X), the face display frame and the human body display frame are both displayed on the display section 28.

When the size of the human body display frame is being changed around the threshold value B (i.e. repeatedly changed between a point W and the point X), the face display frame and the human body display frame are consecutively displayed on the display section 28. Further, when the size of the human body display frame becomes smaller than the threshold value B' at a certain time (to reach e.g. the point V), only the human body display frame is displayed on the display section 28.

Figure 33A:
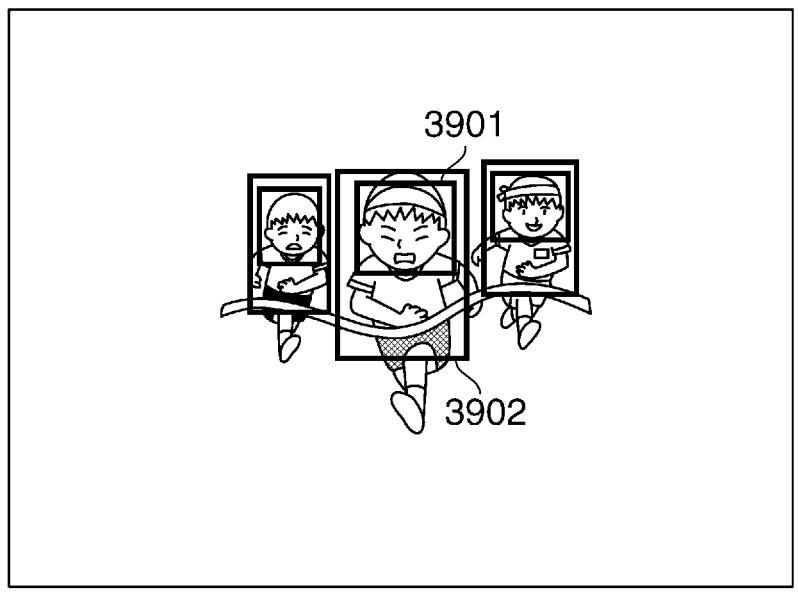
Figure 33B:
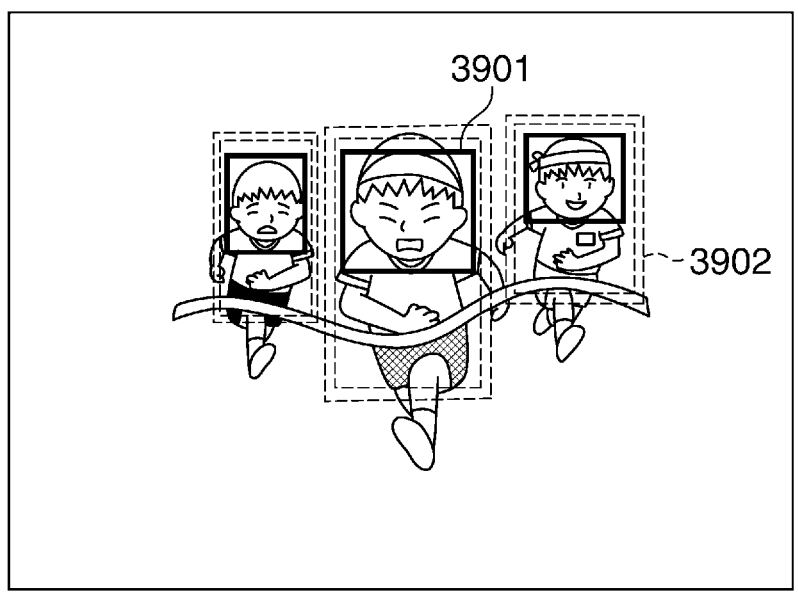

FIGS. 33A and 33B are views useful in explaining an example of display and non-display of a display frame determined by the process described with reference to FIG. 29 and FIGS. 32A and 32B. FIG. 33A illustrates display in a state where the human face and the human body of an object have been detected, and FIG. 33B illustrates display in a state where the size of a face display frame is increased to be larger than the associated threshold value.

Referring to FIG. 33A, it is assumed that the size (Hf×Vf) of the face display frame 3901 is slightly smaller than the threshold value A. In FIG. 33A, a human body display frame 3902 is also displayed together with the face display frame 3901.

At a time point when the size of the face display frame 3901 is increased from the FIG. 33A state to be larger than the threshold value A, the display is performed as illustrated in FIG. 33B. Even when the size of the face display frame 3901 exceeds the threshold value A, the human body display frame 3902 is not immediately made non-display, but the color density of the frame lines thereof is changed stepwise. In the FIG. 33B example, the human body display frame 3902 is depicted in broken lines.

Note that in order to provide continuous display, instead of changing the color density of the frame lines, the width of the frame lines may be varied with time. Further, in a case where the frame lines are depicted in broken lines, the gaps between the segments of each broken line of the frame lines may be changed with time.

Figure 34A:
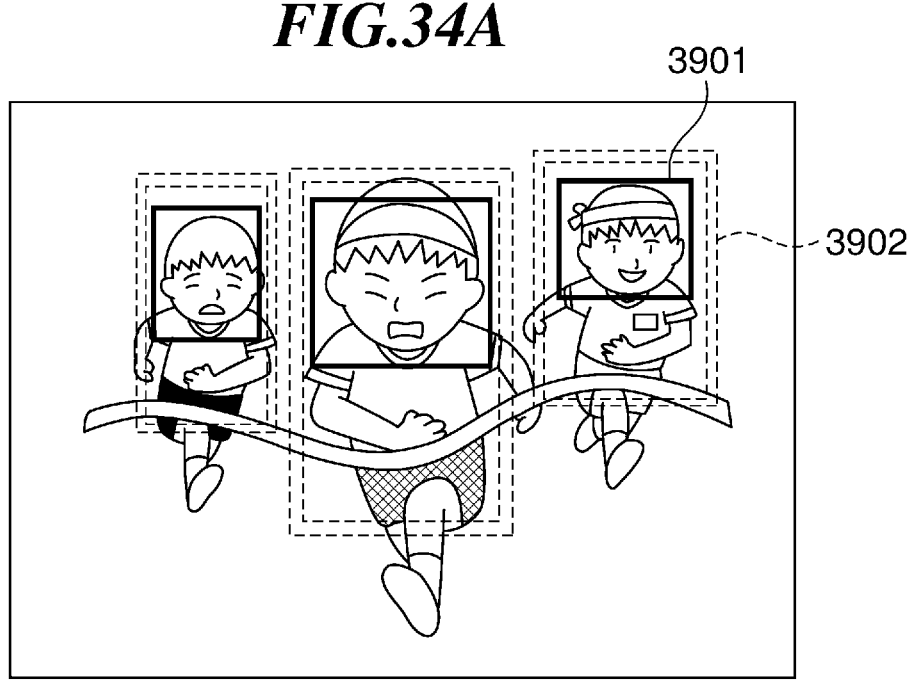
Figure 34B:
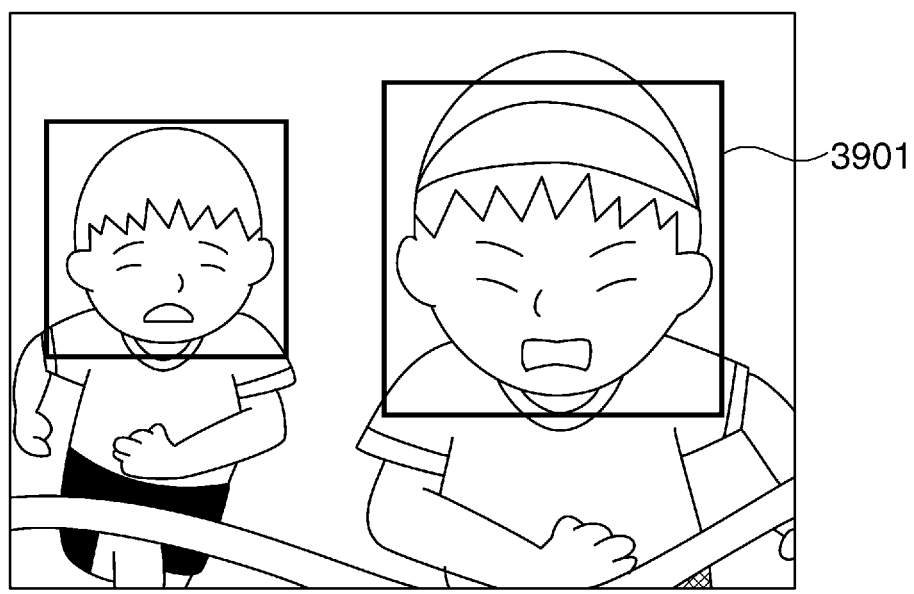
Figure 35:
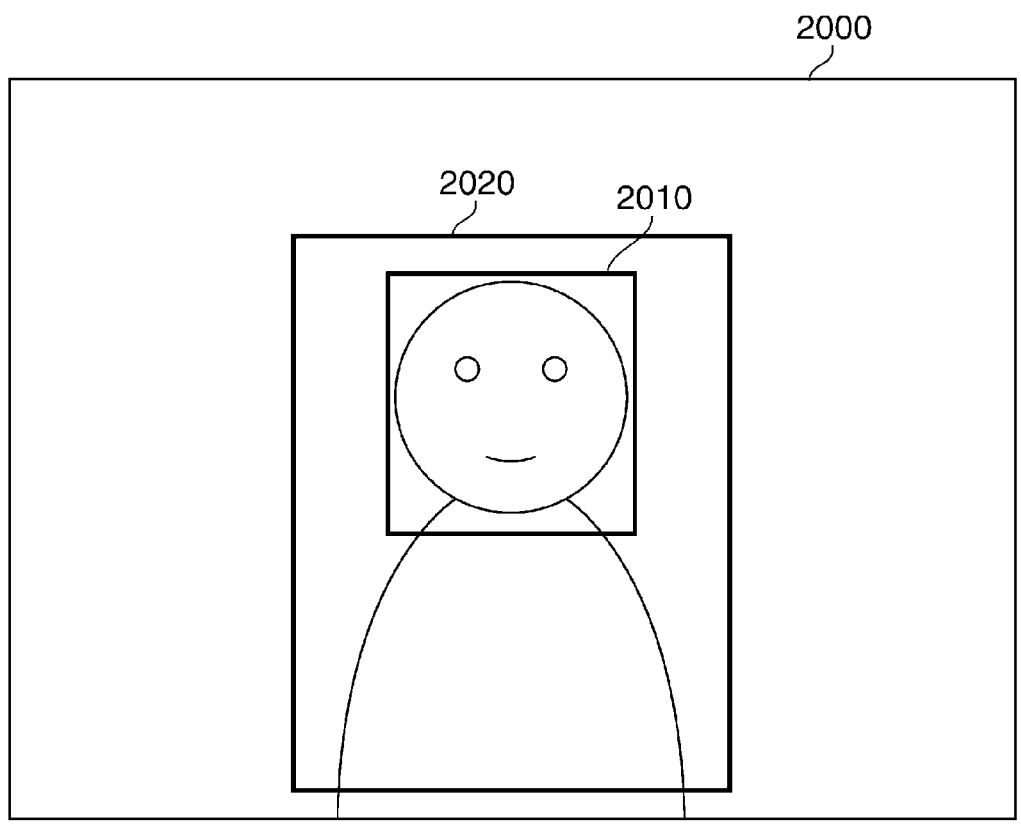
FIG. 35 is a view illustrating how a face display frame and a human body display frame is displayed in the conventional image pickup apparatus provided with the face detecting section and the human body-detecting section.
Figure 36:
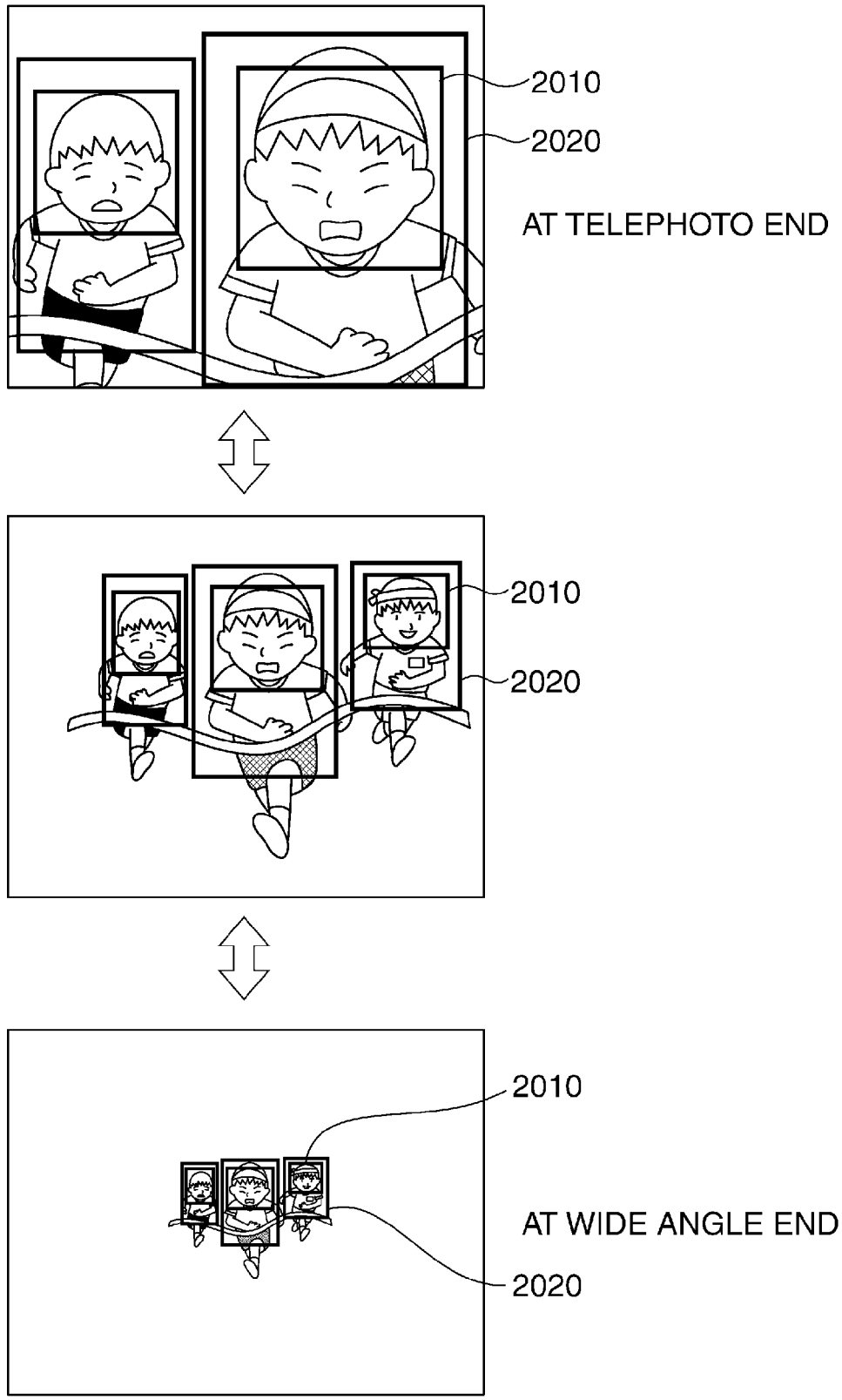
FIG. 36 is a view illustrating how the face display frame and the human body display frame change in the conventional image pickup apparatus when zoom magnification is changed in a state where the face display frame and the human body display frame are consecutively displayed.
Figure 37:
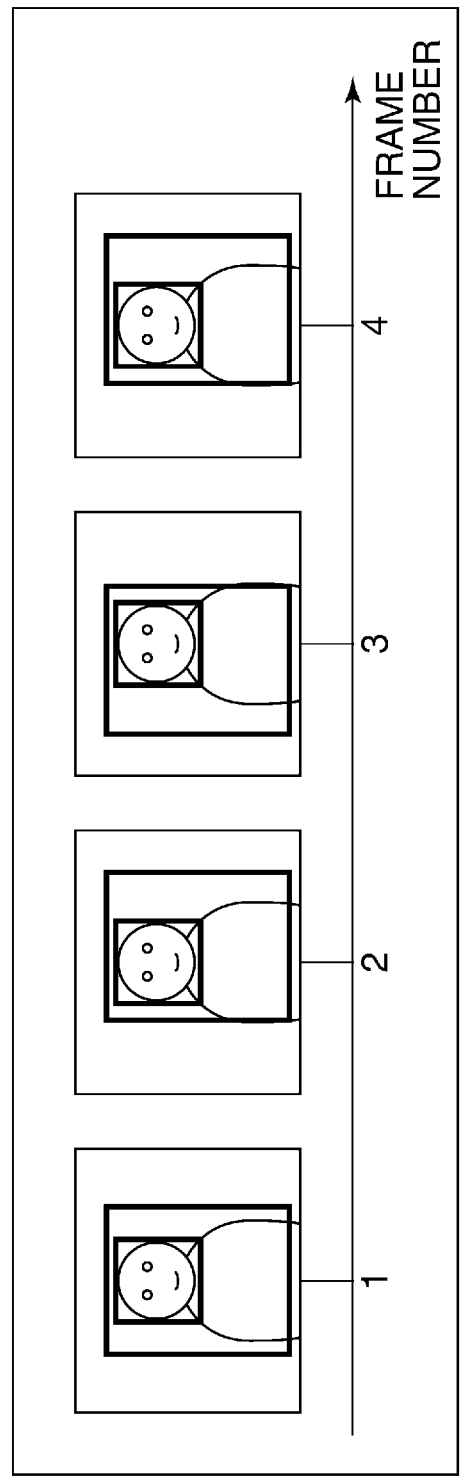
FIG. 37 is a view illustrating how the face display frame and the human body display frame of the object in the image shown in FIG. 35 are displayed as frames of image data are changed.

FIGS. 34A and 34B are views useful in explaining another example of display and non-display of the display frame(s) determined by the process described with reference to FIGS. 32A and 32B. FIG. 34A illustrates display in a state where the size of the face display frame continues to be larger than the threshold value, and FIG. 34B illustrates display at a moment when the human body display frame is made complete non-display.

In FIG. 34A, since the size of the face display frame 3901 continues to be larger than the threshold value A, the frame line color density of the human body display frame 3902 becomes further lower than in the FIG. 33B state.

In FIGS. 33B and 34A, after the size of the face display frame 3901 exceeds the threshold value A, the human body display frame 3902 is displayed with a size adapted to the size of the object while gradually reducing the frame line color density thereof. However, the frame line color density of the human body display frame 3902 may be reduced stepwise while maintaining the size of the face display frame 3901 at the moment the threshold value A was exceeded.

Further, even when the size of the face display frame 3901 does not continue to be increased with time after it has exceeded the threshold value A, the frame line color density of the human body display frame 3902 may be continuously reduced insofar as the face display frame 3901 maintains its state in which the size thereof exceeds the threshold value A.

In FIG. 34B, the human body display frame 3902 has been made complete non-display. In this case, a time period (frame count) required to make the human body display frame 3902 complete non-display after the size of the face display frame 3901 has exceeded the threshold value A may be uniformly set to a predetermined time period or alternatively to a different time period on a shooting mode-by-shooting mode basis.

Thus, even when the size of the face display frame and that of the human body display frame fluctuate in the vicinity of the threshold values, it is possible to prevent the display frame(s) from frequently and repeatedly flickering, so that the user can view the display frame(s) comfortably.

Further, since the switching of a display frame from display to non-display or from non-display to display can be performed stepwise, it is possible to suppress discomfort due to frequent switching of the display frame between display and non-display. This makes it possible for the user to easily perceive a face and a human body of an object by the camera while maintaining high visibility of the display frames.

As described above, according to the fourth embodiment, the face display frame and the human body display frame are selectively made display or non-display according to the size of an object in an image, so that the user can easily perceive each of the display frames according to the size of the object.

As is apparent from the above description, the face detecting section 104, the human body-detecting section 105, and the system controller 50 appearing in FIG. 1 function as a detection unit for detecting an object in an image and an identification unit for identifying a predetermined specific area of the object distinguishably from a remaining area exclusive of the specific area. Further, the system controller 50 functions as a first generation unit for generating a first display frame for enclosing the specific area, a second generation unit for generating a second display frame for enclosing the remaining area, and a display control unit for displaying the first and second display frames together with the image.

Furthermore, the system controller 50, the face detecting section 104, and the human body-detecting section 105 function as a first angle detection unit and a second angle detection. The system controller 50 also functions as a first shooting control unit and a second shooting control unit.

In addition, the face detecting section 104, the human body-detecting section 105, and the system controller 50 function as a detection unit for identifying the predetermined specific area of the object distinguishably from an object area on an image frame-by-image frame basis and obtaining specific area information indicative of the angle, size, and position of the specific area and object area information indicative of the angle, size, and position of the object area.

What is more, the system controller 50 functions a gravity center calculation unit for calculating the center of gravity of the face area and that of the object area based on history information, a position calculation unit for determining a relative position relationship between the position of the face area and that of the object area based on the gravity centers, and a position correction unit for arranging the first and second display frames on the same axis when the relative position relationship is within a predetermined range.

The system controller 50 also functions as a display control unit for determining, according to the area of the specific area, whether or not to display each of the first and second display frames.

Note that in FIG. 1, the system controller 50, the system memory 52, the face detecting section 104, the human body-detecting section 105, the memory controller 15, the memory 32, and the display section 28 form an image display controller.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, the image pickup apparatus or the image display controller may be caused to perform a control method comprising control steps corresponding to the functions of the above-described embodiments. Further, a computer provided in the image pickup apparatus or the image display controller may be caused to execute a program implementing the control method.

In these cases, the control method includes at least a detection step, an identification step, a first generation step, a second generation step, and a display control step. Further, the control method may include at least the detection step, a storage step, the first generation step, the second generation step, and the display control step. Note that the control program is stored e.g. in a computer-readable storage medium.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims priority from Japanese Patent Application No. 2011-023867 filed Feb. 7, 2011, which is hereby incorporated by reference herein in its entirety.

What is claimed is:

1. An image display controller for displaying an image obtained by photographing an object, comprising:
   a detection unit configured to detect the object in the image;
   an identification unit configured to identify a predetermined specific area of the object distinguishably from a remaining area exclusive of the specific area;
   a first generation unit configured to generate a first display frame for enclosing the specific area;
   a second generation unit configured to generate a second display frame for enclosing the remaining area; and
   a display control unit configured to display the first and second display frames on a screen together with the image;
   wherein the specific area is a face area of the object, and the remaining area is a human body area of the object, and
   wherein said second generation unit generates the second display frame in a manner adjacent to the first display frame;
   the image display controller further comprising:
   a first angle detection unit configured to obtain face detection angle information by detecting at least one of a yaw-direction angle indicative of a rotational angle of the face area in a horizontal direction, a roll-direction angle indicative of a rotational angle of the face area in a vertical direction, and a pitch-direction angle indicative of an inclination of the face area with respect to the vertical direction, and
   a second angle detection unit configured to obtain human body detection angle information by detecting at least one of a yaw-direction angle indicative of a rotational angle of the human body area in the horizontal direction, a roll-direction angle indicative of a rotational angle of the human body area in the vertical direction, and a pitch-direction angle indicative of an inclination of the human body area with respect to the vertical direction;
   wherein before displaying the first and second display frames on the screen, said display control unit changes at least one of the yaw-direction angle, the roll-direction angle, and the pitch-direction angle of each of the first and second display frames based on the face detection angle information and the human body detection angle information; and
   wherein at least one of the detection unit, the identification unit, the first generation unit, the second generation unit, the display control unit, the first angle detection unit and the second angle detection unit are implemented, at least in part, by a hardware processor and memory.

2. An image display controller for displaying an image obtained by photographing an object, on a frame-by-frame basis, comprising:
- a detection unit configured to identify a predetermined specific area of the object in association with each frame of the image, distinguishably from an area of the object, and obtain specific area information indicative of at least one of an angle, a size, and a position of the specific area and object area information indicative of at least one of an angle, a size, and a position of the object area;
- a storage unit configured to store the specific area information and the object area information as history information;
- a first generation unit configured to generate a first display frame for enclosing the specific area according to the specific area information;
- a second generation unit configured to generate a second display frame for enclosing the object area according to the object area information; and
- a display control unit configured to correct at least one of the angle, size, and position of the first or second display frame before displaying the first and second display frames on a screen, and then display the first and second display frames together with the image;
- wherein the specific area is a face area of the object,
- wherein the specific area information is indicative of the angle of the specific area, and the object area information is indicative of the angle of the object area,
- wherein when said display control unit determines based on the history information that an angle of the face area relative to the object area is smaller than a predetermined angle threshold value, said display control unit corrects display angles of the respective first and second display frames such that the display angles become equal to each other, and then displays the first and second display frames on the screen; and
- wherein at least one of the detection unit, the storage unit, the first generation unit, the second generation unit and the display control unit are implemented, at least in part, by a hardware processor and memory.

3. An image display controller for displaying an image obtained by photographing an object, on a frame-by-frame basis, comprising:
- a detection unit configured to identify a predetermined specific area of the object in association with each frame of the image, distinguishably from an area of the object, and obtain specific area information indicative of at least one of an angle, a size, and a position of the specific area and object area information indicative of at least one of an angle, a size, and a position of the object area;
- a storage unit configured to store the specific area information and the object area information as history information;
- a first generation unit configured to generate a first display frame for enclosing the specific area according to the specific area information;
- a second generation unit configured to generate a second display frame for enclosing the object area according to the object area information; and
- a display control unit configured to correct at least one of the angle, size, and position of the first or second display frame before displaying the first and second display frames on a screen, and then display the first and second display frames together with the image;
- wherein the specific area is a face area of the object,
- wherein the specific area information is indicative of the position of the specific area, and the object area information is indicative of the position of the object area, and
- wherein said display control unit comprises:
- a gravity center calculation unit configured to calculate a center of gravity of each of the face area and the object area based on the history information,
- a position calculation unit configured to calculate a relative position relationship between the face area and the object area based on the centers of gravity calculated by said gravity center calculation unit, and
- a position correction unit configured to be operable when the relative position relationship is within a predetermined range, to arrange the first and second frames on the same axis.

4. An image pickup apparatus comprising:
- an image display controller as claimed in claim 1;
- an image pickup section configured to receive an optical image including the object;
- a first shooting control unit configured to be operable when a shooting preparation instruction is received, to control said image display controller to display the first and second display frames on the screen; and
- a second shooting control unit configured to be operable when a shooting instruction is received, to record an image read from said image pickup section, as image data.

5. A method of controlling an image display controller for displaying an image obtained by photographing an object, comprising:
- detecting the object in the image;
- identifying a predetermined specific area of the object distinguishably from a remaining area exclusive of the specific area;
- generating a first display frame for enclosing the specific area;
- generating a second display frame for enclosing the remaining area; and
- displaying the first and second display frames on a screen together with the image;
- wherein the specific area is a face area of the object, and the remaining area is a humane body area of the object, and
- wherein the second display frame is generated in a manner adjacent to the first display frame;
- the method further comprising:
- obtaining face detection angle information by detecting at least one of a yaw-direction angle indicative of a rotational angle of the face area in a horizontal direction, a roll-direction angle indicative of a rotational angle of the face area in a vertical direction, and a pitch-direction angle indicative of an inclination of the face area with respect to the vertical direction, and
- obtaining human body detection angle information by detecting at least one of a yaw-direction angle indicative of a rotational angle of the human body area in the horizontal direction, a roll-direction angle indicative of a rotational angle of the human body area in the vertical direction, and a pitch-direction angle indicative of an inclination of the human body area with respect to the vertical direction, and
- wherein before displaying the first and second display frames on the screen, at least one of the yaw-direction angle, the roll-direction angle, and the pitch-direction angle of each of the first and second display frames are changed based on the face detection angle information and the human body detection angle information.

6. A method of controlling an image display controller for displaying an image obtained by photographing an object, on a frame-by-frame basis, comprising:
- identifying a predetermined specific area of the object in association with each frame of the image, distinguishably from an area of the object, and obtaining specific area information indicative of at least one of an angle, a size, and a position of the specific area and object area information indicative of at least one of an angle, a size, and a position of the object area;
- storing the specific area information and the object area information as history information in a memory;
- generating a first display frame for enclosing the specific area according to the specific area information;
- generating a second display frame for enclosing the object area according to the object area information; and
- correcting at least one of the angle, size, and position of the first or second display frame before displaying the first and second display frames on a screen, and then displaying the first and second display frames together with the image;
- wherein the specific area is a face area of the object, and
- wherein the specific area information is indicative of the angle of the specific area, and the object area information is indicative of the angle of the object area;
- the method further comprising determining, based on the history information, if an angle of the face area relative to the object area is smaller than a predetermined angle threshold value;
- wherein when it is determined that an angle of the face area relative to the object area is smaller than a predetermined angle threshold value, correcting display angles of the respective first and second display frames such that the display angles become equal to each other, and then displaying the first and second display frames on the screen.

7. A non-transitory computer-readable storage medium storing a computer-executable control program for causing a computer to execute a method of controlling an image display controller for displaying an image obtained by photographing an object,
- wherein the method comprises:
- detecting the object in the image;
- identifying a predetermined specific area of the object distinguishably from a remaining area exclusive of the specific area;
- generating a first display frame for enclosing the specific area;
- generating a second display frame for enclosing the remaining area; and
- displaying the first and second display frames on a screen together with the image;
- wherein the specific area is a face area of the object, and the remaining area is a humane body area of the object, and
- wherein the second display frame is generated in a manner adjacent to the first display frame;
- the method further comprising:
- obtaining face detection angle information by detecting at least one of a yaw-direction angle indicative of a rotational angle of the face area in a horizontal direction, a roll-direction angle indicative of a rotational angle of the face area in a vertical direction, and a pitch-direction angle indicative of an inclination of the face area with respect to the vertical direction, and
- obtaining human body detection angle information by detecting at least one of a yaw-direction angle indicative of a rotational angle of the human body area in the horizontal direction, a roll-direction angle indicative of a rotational angle of the human body area in the vertical direction, and a pitch-direction angle indicative of an inclination of the human body area with respect to the vertical direction, and
- wherein before displaying the first and second display frames on the screen, at least one of the yaw-direction angle, the roll-direction angle, and the pitch-direction angle of each of the first and second display frames are changed based on the face detection angle information and the human body detection angle information.

8. A non-transitory computer-readable storage medium storing a computer-executable control program for causing a computer to execute a method of controlling an image display controller for displaying an image obtained by photographing an object,
- wherein the method comprises:
- identifying a predetermined specific area of the object in association with each frame of the image, distinguishably from an area of the object, and obtaining specific area information indicative of an angle, a size, and a position of the specific area and object area information indicative of an angle, a size, and a position of the object area;
- storing the specific area information and the object area information as history information in a memory;
- generating a first display frame for enclosing the specific area according to the specific area information;
- generating a second display frame for enclosing the object area according to the object area information; and
- correcting the angle, size, and position of the first or second display frame before displaying the first and second display frames on a screen, and then displaying the first and second display frames together with the image;
- wherein the specific area is a face area of the object, and
- wherein the specific area information is indicative of the angle of the specific area, and the object area information is indicative of the angle of the object area;
- the method further comprising determining, based on the history information, if an angle of the face area relative to the object area is smaller than a predetermined angle threshold value;
- wherein when it is determined that an angle of the face area relative to the object area is smaller than a predetermined angle threshold value, correcting display angles of the respective first and second display frames such that the display angles become equal to each other, and then displaying the first and second display frames on the screen.

9. An image display controller for displaying an image, comprising:
- a processor and a memory configured to:
- detect, from an image obtained by photographing an object, a face area of the object;
- detect, from the image obtained by photographing the object, a body area of the object;
- detect a rotational angle of the face area;
- generate a first frame being indicative of a position of the face area, and a second frame being indicative of a position of the body area; and
- display on a screen the first frame and the second frame as well as the image,
- wherein the first frame is displayed in front of the second frame when the face is oriented forward, and the second frame is displayed in front of the first frame when the face is oriented backward.

10. An image display controller for displaying an image, comprising:
a processor and a memory configured to:
detect, from an image obtained by photographing an object, a face area of the object;
detect, from the image obtained by photographing the object, a body area of the object;
generate a first frame being indicative of a position of the face area, and a second frame being indicative of a position of the body area; and
display on a screen the first frame and the second frame as well as the image,
wherein in a case where a difference between an angle of the face area and an angle of the body area is not greater than a threshold value, the first frame and the second frame are generated at the same angle, respectively.

11. The image display controller according to claim 10, wherein at least one of the first frame and the second frame are generated at a size obtained based on history of a comparison result of a size of the face area and a size of the body area.

12. The image display controller according to claim 10, wherein at least one of the first frame and the second frame are generated at a position obtained based on history of a comparison result of a position of the face area and a position of the body area.

13. The image display controller according to claim 10, wherein in a case where a difference of a position of the face region and a position of the body area is not greater than a threshold value, the first frame and the second frame are generated on an coaxial axis.

14. An image display controller for displaying an image, comprising:
a processor and a memory configured to:
detect, from an image obtained by photographing an object, a face area of the object;
detect, from the image obtained by photographing the object, a body area of the object;
generate a first frame being indicative of a position of the face area, and a second frame being indicative of a position of the body area; and
display on a screen the first frame and the second frame as well as the image,
wherein in a case where the face area and the body area are detected, the first frame is displayed without displaying the second frame when an area of the face area is greater than a predetermined threshold value.

15. An image display controller for displaying an image, comprising:
a processor and a memory configured to:
detect, from an image obtained by photographing an object, a face area of the object;
detect, from the image obtained by photographing the object, a body area of the object;
generate a first frame being indicative of a position of the face area, and a second frame being indicative of a position of the body area; and
display on a screen the first frame and the second frame as well as the image,
wherein in a case where the face area is detected and the body area is detected, the first frame and the second frame are displayed when the area of the body area is greater than a predetermined threshold value, and the second frame is displayed without displaying the first frame when an area of the body area is not greater than the threshold value.

16. An image display controller for displaying an image, comprising:
a processor and a memory configured to:
detect, from an image obtained by photographing an object, a face area of the object;
detect, from the image obtained by photographing the object, a body area of the object;
generate a first frame being indicative of a position of the face area, and a second frame being indicative of a position of the body area; and
display on a screen the first frame and the second frame as well as the image,
wherein in a case where the face area and the body area are detected, a display form of the second frame is changed when an area of the face area is greater than a threshold value.

17. An image display controller for displaying an image, comprising:
a processor and a memory configured to:
detect, from an image obtained by photographing an object, a face area of the object;
detect, from the image obtained by photographing the object, a body area of the object;
generate a first frame being indicative of a position of the face area, and a second frame being indicative of a position of the body area; and
display on a screen the first frame and the second frame as well as the image,
wherein in a case where the face area and the body area of the same object are detected, the second frame is not displayed after a lapse of a predetermined time period when an area of the face area is greater than a predetermined threshold value.

18. A method of controlling an image display controller for displaying an image, the method comprising:
detecting, from an image obtained by photographing an object, a face area of the object;
detecting, from the image obtained by photographing the object, a body area of the object;
detecting a rotational angle of the face area;
generating a first frame being indicative of a position of the face area, and a second frame being indicative of a position of the body area; and
displaying on a screen the first frame and the second frame as well as the image,
wherein the first frame is displayed in front of the second frame when the face is oriented forward, and the second frame is displayed in front of the first frame when the face is oriented backward.

19. A method of controlling an image display controller for displaying an image, the method comprising:
detecting, from an image obtained by photographing an object, a face area of the object;
detecting, from the image obtained by photographing the object, a body area of the object;
generating a first frame being indicative of a position of the face area, and a second frame being indicative of a position of the body area; and
displaying on a screen the first frame and the second frame as well as the image,
wherein in a case where a difference between an angle of the face area and an angle of the body area is not greater than a threshold value, the first frame and the second frame are generated at the same angle, respectively.

20. A method for controlling an image display controller for displaying an image, the method comprising:
detecting, from an image obtained by photographing an object, a face area of the object;

detecting, from the image obtained by photographing the object, a body area of the object;

generating a first frame being indicative of a position of the face area, and a second frame being indicative of a position of the body area; and displaying on a screen the first frame and the second frame as well as the image, wherein in a case where the face area and the body area are detected, the first frame is displayed without displaying the second frame when an area of the face area is greater than a predetermined threshold value.

21. A method of controlling an image display controller for displaying an image, the method comprising:

detecting, from an image obtained by photographing an object, a face area of the object;

detecting, from the image obtained by photographing the object, a body area of the object;

generating a first frame being indicative of a position of the face area, and a second frame being indicative of a position of the body area; and displaying on a screen the first frame and the second frame as well as the image, wherein in a case where the face area is detected and the body area is detected, the first frame and the second frame are displayed when the area of the body area is greater than a predetermined threshold value, and the second frame is displayed without displaying the first frame when an area of the body area is not greater than the threshold value.

22. A method for controlling an image display controller for displaying an image, the method comprising:

detecting, from an image obtained by photographing an object, a face area of the object;

detecting from the image obtained by photographing the object, a body area of the object;

generating a first frame being indicative of a position of the face area, and a second frame being indicative of a position of the body area; and displaying on a screen the first frame and the second frame as well as the image, wherein in a case where the face area and the body area are detected, a display form of the second frame is changed when an area of the face area is greater than a threshold value.

23. A method of controlling an image display controller for displaying an image, the method comprising:

detecting, from an image obtained by photographing an object, a face area of the object;

detecting, from the image obtained by photographing the object, a body area of the object;

generating a first frame being indicative of a position of the face area, and a second frame being indicative of a position of the body area; and displaying on a screen the first frame and the second frame as well as the image, wherein in a case where the face area and the body area of the same object are detected, the second frame is not displayed after a lapse of a predetermined time period when an area of the face area is greater than a predetermined threshold value.

24. A non-transitory computer-readable storage medium storing a program that, when executed by a computer, causes the computer to perform a method of controlling an image display controller for displaying an image, the method comprising:

detecting, from an image obtained by photographing an object, a face area of the object;

detecting, from the image obtained by photographing the object, a body area of the object;

detecting a rotational angle of the face area;

generating a first frame being indicative of a position of the face area, and a second frame being indicative of a position of the body area; and displaying on a screen the first frame and the second frame as well as the image, wherein the first frame is displayed in front of the second frame when the face is oriented forward, and the second frame is displayed in front of the first frame when the face is oriented backward.

25. A non-transitory computer-readable storage medium storing a program that, when executed by a computer, causes the computer to perform a method of controlling an image display controller for displaying an image, the method comprising:

detecting, from an image obtained by photographing an object, a face area of the object;

detecting, from the image obtained by photographing the object, a body area of the object;

generating a first frame being indicative of a position of the face area, and a second frame being indicative of a position of the body area; and displaying on a screen the first frame and the second frame as well as the image, wherein in a case where a difference between an angle of the face area and an angle of the body area is not greater than a threshold value, the first frame and the second frame are generated at the same angle, respectively.

26. A non-transitory computer-readable storage medium storing a program that, when executed by a computer, causes the computer to perform a method for controlling an image display controller for displaying an image, the method comprising:

detecting, from an image obtained by photographing an object, a face area of the object;

detecting, from the image obtained by photographing the object, a body area of the object;

generating a first frame being indicative of a position of the face area, and a second frame being indicative of a position of the body area; and displaying on a screen the first frame and the second frame as well as the image, wherein in a case where the face area and the body area are detected, the first frame is displayed without displaying the second frame when an area of the face area is greater than a predetermined threshold value.

27. A non-transitory computer-readable storage medium storing a program that, when executed by a computer, causes the computer to perform a method of controlling an image display controller for displaying an image, the method comprising:

detecting, from an image obtained by photographing an object, a face area of the object;

detecting, from the image obtained by photographing the object, a body area of the object;

generating a first frame being indicative of a position of the face area, and a second frame being indicative of a position of the body area; and displaying on a screen the first frame and the second frame as well as the image, wherein in a case where the face area is detected and the body area is detected, the first frame and the second frame are displayed when the area of the body area is greater than a predetermined threshold value, and the second frame is displayed without displaying the first frame when an area of the body area is not greater than the threshold value.

28. A non-transitory computer-readable storage medium storing a program that, when executed by a computer, causes the computer to perform a method for controlling an image display controller for displaying an image, the method comprising:

detecting, from an image obtained by photographing an object, a face area of the object;

detecting from the image obtained by photographing the object, a body area of the object;

generating a first frame being indicative of a position of the face area, and a second frame being indicative of a position of the body area; and displaying on a screen the first frame and the second frame as well as the image, wherein in a case where the face area and the body area are detected, a display form of the second frame is changed when an area of the face area is greater than a threshold value.

29. A non-transitory computer-readable storage medium storing a program that, when executed by a computer, causes the computer to perform a method of controlling an image display controller for displaying an image, the method comprising:

detecting, from an image obtained by photographing an object, a face area of the object;

detecting, from the image obtained by photographing the object, a body area of the object;

generating a first frame being indicative of a position of the face area, and a second frame being indicative of a position of the body area; and displaying on a screen the first frame and the second frame as well as the image, wherein in a case where the face area and the body area of the same object are detected, the second frame is not displayed after a lapse of a predetermined time period when an area of the face area is greater than a predetermined threshold value.

* * * * *